United States Patent
Fujibayashi et al.

(10) Patent No.: US 6,894,263 B2
(45) Date of Patent: May 17, 2005

(54) IMAGE READING IMAGING OPTICAL SYSTEM AND IMAGE READING APPARATUS USING THE SAME

(75) Inventors: Kazuo Fujibayashi, Kanagawa (JP); Nobuyuki Tochigi, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/084,928

(22) Filed: Mar. 1, 2002

(65) Prior Publication Data

US 2003/0038228 A1 Feb. 27, 2003

(30) Foreign Application Priority Data

Mar. 5, 2001 (JP) .......................................... 2001-060353
Feb. 19, 2002 (JP) .......................................... 2002-041632

(51) Int. Cl.[7] .............................. H01L 27/00; H01J 3/14; H04N 1/04
(52) U.S. Cl. ..................... 250/208.1; 250/216; 358/482; 359/858
(58) Field of Search ................................. 359/858, 365, 359/859, 730, 726, 627, 633, 856, 857, 861; 250/208.1, 234, 235, 736; 358/505, 513, 474, 482, 483, 484, 475, 496, 497

(56) References Cited

U.S. PATENT DOCUMENTS

| | | | |
|---|---|---|---|
| 4,769,718 A | * | 9/1988 | Imamura |
| 6,088,134 A | * | 7/2000 | Schmidt |
| 6,144,475 A | | 11/2000 | Sheng .......................... 359/196 |
| 6,160,641 A | * | 12/2000 | Kaneko |
| 6,163,400 A | * | 12/2000 | Nanba .......................... 359/365 |
| 6,172,784 B1 | | 1/2001 | Konda .......................... 359/196 |
| 6,637,899 B1 | * | 10/2003 | Sunaga et al. .............. 359/858 |
| 2003/0035232 A1 | * | 2/2003 | Sasaki ........................ 359/859 |

FOREIGN PATENT DOCUMENTS

| | | |
|---|---|---|
| EP | 0730169 A2 * | 9/1996 |
| EP | 0 790 513 A2 | 8/1997 |
| EP | 0 814 596 A2 | 12/1997 |
| EP | 0 908 750 A2 | 4/1999 |
| EP | 0 921 427 A2 | 6/1999 |
| JP | 3-113961 | 5/1991 |
| JP | 8-292371 | 5/1996 |
| JP | 8-292372 | 5/1996 |
| JP | 9-5650 | 1/1997 |

OTHER PUBLICATIONS

European Search Report mailed Jul. 28, 2004.
Office Action dated Nov. 5, 2004, issued in corresponding Chinese Application No. 02121535.9.

* cited by examiner

Primary Examiner—Stephone B. Allen
(74) Attorney, Agent, or Firm—Fitzpatrick, Cella, Harper & Scinto

(57) ABSTRACT

An image reading imaging optical system for imaging image information on a line sensor and reading the image information has an imaging optical element including a plurality of off-axial reflecting surfaces differing in the direction of incidence and the direction of emergence of a reference axis ray from one another and having curvatures.

42 Claims, 24 Drawing Sheets

FIG. 21A
FIG. 21B
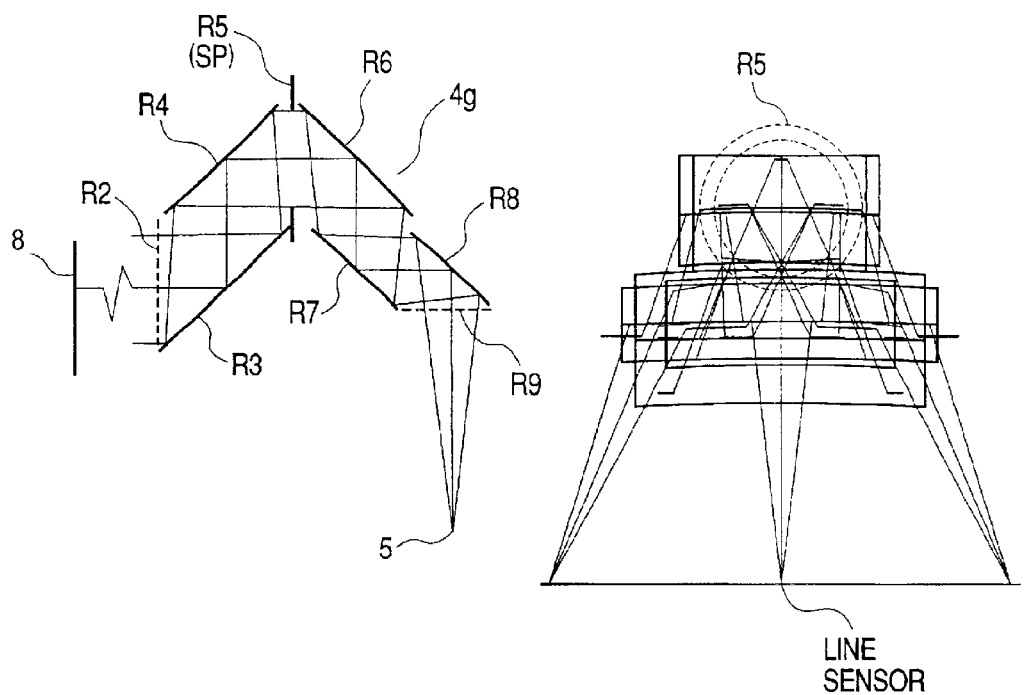
FIG. 21C
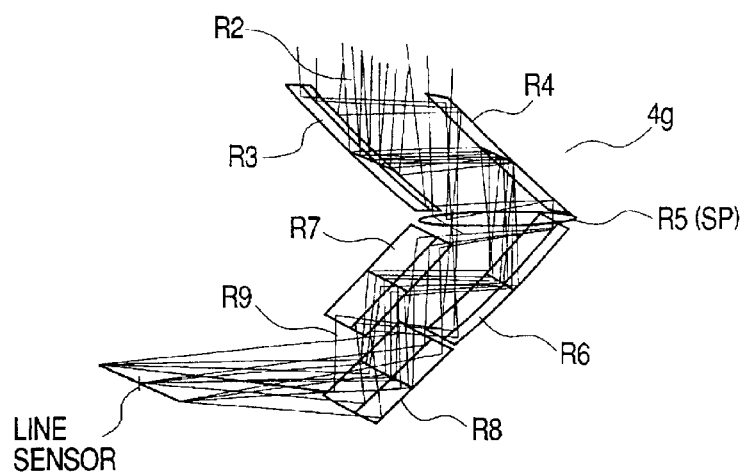

IMAGE READING IMAGING OPTICAL SYSTEM AND IMAGE READING APPARATUS USING THE SAME

BACKGROUND OF THE INVENTION

1. Field of the Invention

This invention relates to an original reading imaging optical system and an image reading apparatus using the same, and particularly is suitable for reading a monochromatic image or a color image using the line sensor of an image scanner, a digital copier, a facsimile apparatus or the like using a compact imaging optical element in which various aberrations are well-balancedly corrected and which has high resolving power.

2. Related Background Art

As an image reading apparatus (image scanner) for reading image information on the surface of an original, a flat bed type image scanner is proposed, for example, in Japanese Patent Application Laid-Open No. 3-113961.

The flat bed type image scanner is such that an imaging lens and a line sensor are fixed and only a reflecting mirror is moved to thereby slit-expose and scan the surface of an original and read image information thereon.

In recent years, in order to achieve the simplification of the structure of the apparatus, it has often become the case that an integral carriage type scanning system in which a mirror, an imaging lens, a line sensor, etc. are made integral with one another to thereby scan the surface of an original is adopted.

FIG. 32 of the accompanying drawings is a schematic view of the essential portions of an image reading apparatus of the integral carriage type scanning system according to the prior art. In FIG. 32, a beam emitted from an illuminating light source 1 illuminates an original 8 directly placed on an original supporting table 2, and the reflected beam from the original 8 has its optical path bent in the interior of a carriage 6 through first, second and third reflecting mirrors 3a, 3b and 3c in the named order, and is imaged on the surface of a line sensor 5 by an imaging lens (imaging optical system) 4. The carriage 6 is moved in the direction of arrow A (sub scanning direction) indicated in FIG. 32 by a sub scanning motor 7 to thereby read the image information of the original 8. The line sensor 5 in FIG. 32 is of a construction in which a plurality of light receiving elements are arranged in one-dimensional direction (main scanning direction).

FIG. 33 of the accompanying drawings is an illustration of the basic construction of the image reading optical system of FIG. 32.

In FIG. 33, the reference numeral 4 designates an imaging optical system, the reference characters 5R, 5G and 5B denote line sensors for the respective colors R(red), G(green) and B(blue) of the line sensor 5, and the reference characters 8R, 8G and 8B designate reading ranges on the surface of the original corresponding to the line sensors 5R, 5G and 5B. In the image reading apparatus shown in FIG. 32, the surface of the stationary original is scanned by the carriage 6, but the carriage scanning is equivalent to the line sensor 5 and the imaging lens being stationary and the surface of the original 8 being moved, as shown in FIG. 33. By the surface of the original being scanned, the same location can be read in different colors at a certain time interval. When in the aforedescribed construction, the imaging lens 4 comprises an ordinary refracting system, on-axis chromatic aberration and chromatic aberration of magnification occur and therefore, relative to the reference line sensor 5G, defocus or positional deviation occurs to line images formed on the line sensors 5B and 5R. Accordingly, when images of the respective colors are superimposed and reproduced, the images become images in which color oozing and misregister are conspicuous. That is, when such performance as high aperture or high resolution is required, the requirement cannot be coped with.

On the other hand, recently, in a non-coaxial optical system as well, it has become apparent that the concept of a reference axis is introduced and a constituent surface is made into an asymmetrical aspherical surface, whereby an optical system in which aberrations have been sufficiently corrected can be constructed. The example, a designing method for it is shown in Japanese Patent Application Laid-Open No. 9-5650, and examples of the design thereof are shown in Japanese Patent Application Laid-Open Nos. 8-292371 and 8-292372.

Such a non-coaxial optical system is called an off-axial optical system (which is an optical system defined as an optical system containing a curved surface (an off-axial curved surface) in which, when considering a reference axis along a ray of light passing through the center of an image and the center of a pupil, a surface normal at the point of intersection of a constituent surface with the reference axis is not on the reference axis, and in this case, the reference axis is of a bent shape). This off-axial optical system is such that the constituent surface thereof generally is non-coaxial and eclipse does not occur even on the reflecting surface thereof and therefore, an optical system using a reflecting surface is easy to construct. It also has the features that the drawing around of an optical path can be effected relatively freely and that an integral type optical system is easy to make by the technique of integrally molding a constituent surface.

On the other hand, high resolution and a high speed are required of an original reading system such as a digital copier and therefore, such system has not yet come to be constituted by an integral type optical system. An imaging lens required in the reading system needs to be bright and high in resolution and therefore, to secure optical performance, it is difficult to make the angle of field great. If the angle of field is narrow, the optical path length will become long as the result.

On the other hand, when the reading of a color image is to be effected, as the resolution becomes higher, the imaging position difference for each color by chromatic aberration, and chromatic aberration such as color misregister in an image field adversely affect optical performance.

SUMMARY OF THE INVENTION

It is an object of the present invention to provide, in an original reading system such as a digital copier of which a high speed and high resolution are required, an original reading imaging optical system which can easily realize an integral carriage type scanning process, and an image reading apparatus using the same.

It is also an object of the present invention to provide, in the reading of a digital color image, an original reading imaging optical system which is free of chromatic aberration and can easily realize an integral carriage type scanning process, and an image reading apparatus using the same.

Also, when generally an off-axial reflecting surface is used as an imaging optical element, a reference axis ray is obliquely incident on and reflected by each off-axial reflecting surface so that an imaged beam may not be intercepted and therefore, asymmetrical aberration occurs originally.

It is an object of the present invention to provide an original reading imaging optical system in which, even if the imaging optical system is constituted by an off-axial reflecting surface, the occurrence of asymmetrical aberration is little and optical performance is not greatly deteriorated, and an image reading apparatus using the same.

In one aspect of the invention, there is provided an image reading imaging optical system for imaging image information on a line sensor and reading the image information, characterized by an imaging optical element including a plurality of off-axial reflecting surfaces differing in the direction of incidence and the direction of emergence of a reference axis ray from one another and having curvatures.

In further aspect of the foregoing image reading imaging optical system, said imaging optical element has the function of changing the direction of emergence to a direction substantially perpendicular or opposite to the direction of incidence of the reference axis ray.

In further aspect of the foregoing image reading imaging optical system, said imaging optical element comprises a plurality of off-axial reflecting surfaces including at least one set of reflecting surfaces intersecting with each other, and has a stop between the off-axial reflecting surfaces intersecting with each other.

In another aspect of the invention, there is provided an image reading apparatus which includes an original supporting table on which an original is placed, an imaging optical element and a line sensor, and in which image information on the surface of the original is imaged on the line sensor by the imaging optical element, and the image information is read by said line sensor, and said imaging optical element has a plurality of off-axial reflecting surfaces differing in the direction of incidence and the direction of emergence of a reference axis ray from one another and having curvatures.

In further aspect of the foregoing image reading imaging optical system, the bending direction of the reference axis ray on each off-axial reflecting surface of said imaging optical element is in a cross section perpendicular to the line direction of said line sensor.

In further aspect of the foregoing image reading imaging optical system, the direction of the reference axis ray emerging from said imaging optical element differs from the direction of the reference axis ray incident on said imaging optical element.

In further aspect of the foregoing image reading imaging optical system, the direction of the reference axis ray emerging from said imaging optical element is substantially orthogonal to the direction of the reference axis ray incident on said imaging optical element.

In further aspect of the foregoing image reading imaging optical system, the direction of the reference axis ray emerging from said imaging optical element is substantially the same direction as the direction of the reference axis ray incident on said imaging optical element.

In further aspect of the foregoing image reading imaging optical system, the direction of the reference axis ray incident on said imaging optical element and the direction of the reference axis ray emerging from said imaging optical element are substantially opposite directions.

In further aspect of the foregoing image reading imaging optical system, said image information is not intermediately imaged in said imaging optical element, but is directly formed on the line sensor.

In further aspect of the foregoing image reading imaging optical system, said imaging optical element has a stop near substantially the center of the optical path between the light incidence surface and the light exit surface thereof.

In further aspect of the foregoing image reading imaging optical system, said stop is formed by the effective surface of an off-axial reflecting surface located near substantially the center of the optical path between the light incidence surface and the light exit surface of said imaging optical element.

In further aspect of the foregoing image reading imaging optical system, an internal medium constituting said imaging optical element is air.

In further aspect of the foregoing image reading imaging optical system, an internal medium constituting said imaging optical element is optically transparent glass or plastic.

In further aspect of the foregoing image reading imaging optical system, when the off-axial reflecting surface for counter-clockwisely deflecting the reference axis ray is defined as a plus deflecting surface, and the off-axial reflecting surface for clockwisely deflecting the reference axis ray is defined as a minus deflecting surface, said imaging optical element has at least one set of constructions in which the plus deflecting surface is continuous or at least one set of constructions in which the minus deflecting surface is continuous.

In further aspect of the foregoing image reading imaging optical system, when the off-axial reflecting surface for counter-clockwisely deflecting the reference axis ray is defined as a plus deflecting surface, and the off-axial reflecting surface for clockwisely deflecting the reference axis ray is defined as a minus deflecting surface, said imaging optical element has at least one set of constructions in which the plus deflecting surface is continuous and at least one set of constructions in which the minus deflecting surface is continuous.

In further aspect of the foregoing image reading imaging optical system, said imaging optical element is comprised of six off-axial reflecting surfaces, and when the off-axial reflecting surface for counter-clockwisely deflecting the reference axis ray is defined as a plus deflecting surface, and the off-axial reflecting surface for clockwisely deflecting the reference axis ray is defined as a minus deflecting surface, said imaging optical element has the same number of plus deflecting surfaces and minus deflecting surfaces, and the off-axial reflecting surface most adjacent to the exit side is disposed on the original side on the incidence reference axis relative to the off-axial reflecting surface most adjacent to the incidence side.

In further aspect of the foregoing image reading imaging optical system, said plus deflecting surfaces and said minus deflecting surfaces are disposed so as to be opposite deflecting surfaces relative to a stop.

In further aspect of the foregoing image reading imaging optical system, the off-axial reflecting surface of said imaging optical element which is most adjacent to the incidence side is designed to have the converging action.

In further aspect of the foregoing image reading imaging optical system, at least one surface of said imaging optical element has a characteristic of cutting infrared light.

In further aspect of the foregoing image reading imaging optical system, said imaging optical element is disposed in a housing along the surface of the original in parallel to a reflecting mirror.

In further aspect of the foregoing image reading imaging optical system, when the effective beam width in a direction perpendicular to the line direction of the line sensor on the exit surface of said imaging optical element is defined as Φs, and the effective beam width in the line direction of the line sensor is defined as Φm, the condition that $$\Phi s < \Phi m$$

is satisfied.

In another aspect of the invention, there is provided an image reading apparatus which includes an original supporting table on which an original is placed, an imaging optical element and a line sensor, and in which image information on the surface of the original is imaged on the line sensor by the imaging optical element and the image information is read by said line sensor, and the image reading apparatus further includes a reflecting mirror and an imaging optical element for reflecting a reference axis ray a plurality of times, and said imaging optical element has the function of changing the direction of emergence to a direction substantially perpendicular or opposite to the direction of incidence of the reference axis ray.

In further aspect of the foregoing image reading imaging optical system, said imaging optical element has a plurality of off-axial reflecting surfaces differing in the direction of incidence and the direction of emergence of the reference axis ray from one another and having curvatures.

In further aspect of the foregoing image reading imaging optical system, the bending direction of the reference axis ray on each off-axial reflecting surface is in a cross section perpendicular to the line direction of said line sensor.

In further aspect of the foregoing image reading imaging optical system, at least two reflecting mirrors are provided.

In further aspect of the foregoing image reading imaging optical system, said imaging optical element is disposed on the side opposite to the surface of said original with respect to said reflecting mirror.

In further aspect of the foregoing image reading imaging optical system, said imaging optical element is disposed in a housing along the surface of said original in parallel to said reflecting mirror.

In still another aspect of the invention, there is provided an image reading apparatus which includes an original supporting table on which an original is placed, an imaging optical element and a line sensor, and in which image information on the surface of the original is imaged on the line sensor and the image information is read by said line sensor, and said imaging optical element includes a plurality of off-axial reflecting surfaces including at least one set of reflecting surfaces intersecting with each other, and has a stop between the off-axial reflecting surfaces intersecting with each other.

In further aspect of the foregoing image reading imaging optical system, the bending direction of a reference axis ray on each off-axial reflecting surface of said imaging optical element is in a cross section perpendicular to the line direction of said line sensor.

In further aspect of the foregoing image reading imaging optical system, the stop in said imaging optical element is disposed near substantially the center of the optical path between the light incidence surface and the light exit surface of the imaging optical element.

In further aspect of the foregoing image reading imaging optical system, said stop differs in the aperture width thereof in a cross section perpendicular to the line direction of the sensor line and the aperture width in a direction parallel to the line direction.

In further aspect of the foregoing image reading imaging optical system, said stop is constructed integrally with the off-axial reflecting surfaces proximate thereto.

In further aspect of the foregoing image reading imaging optical system, said image information is a color image.

BRIEF DESCRIPTION OF THE DRAWINGS

FIGS. 21A, 21B and 21C are schematic views of the essential portions of Embodiment 12 of the image reading imaging optical system of the present invention.

DESCRIPTION OF THE PREFERRED EMBODIMENTS

Figure 1A:
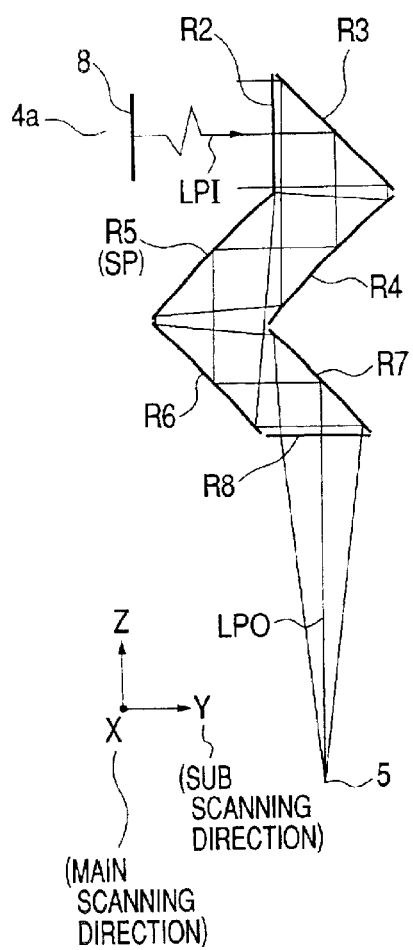
FIGS. 1A, 1B and 1C are schematic views of the essential portions of Embodiment 1 of the image reading imaging optical system of the present invention.
Figure 1B:
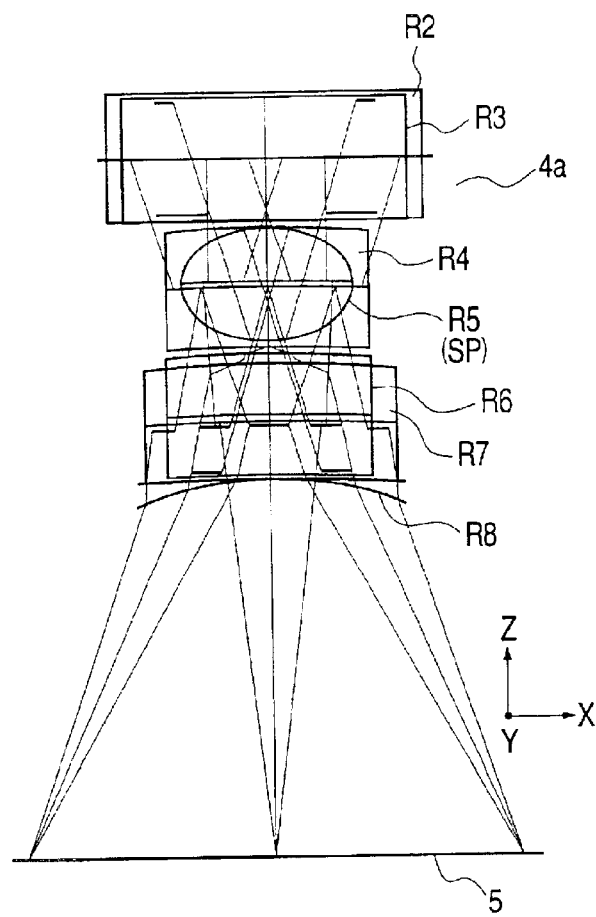
Figure 1C:
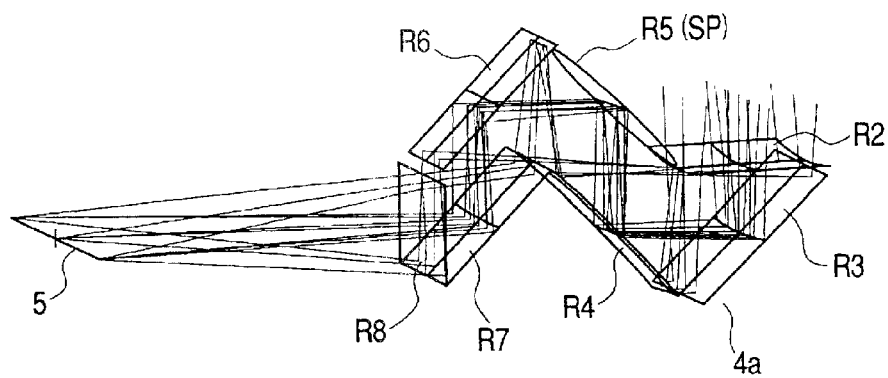

FIGS. 1A to 1C are illustrations of Embodiment 1 of an image reading imaging optical system used in the image reading apparatus of the present invention.

FIG. 1A is a sub scanning cross-sectional view, FIG. 1B is a main scanning cross-sectional view, and FIG. 1C is a perspective view of essential portions.

Figure 2:
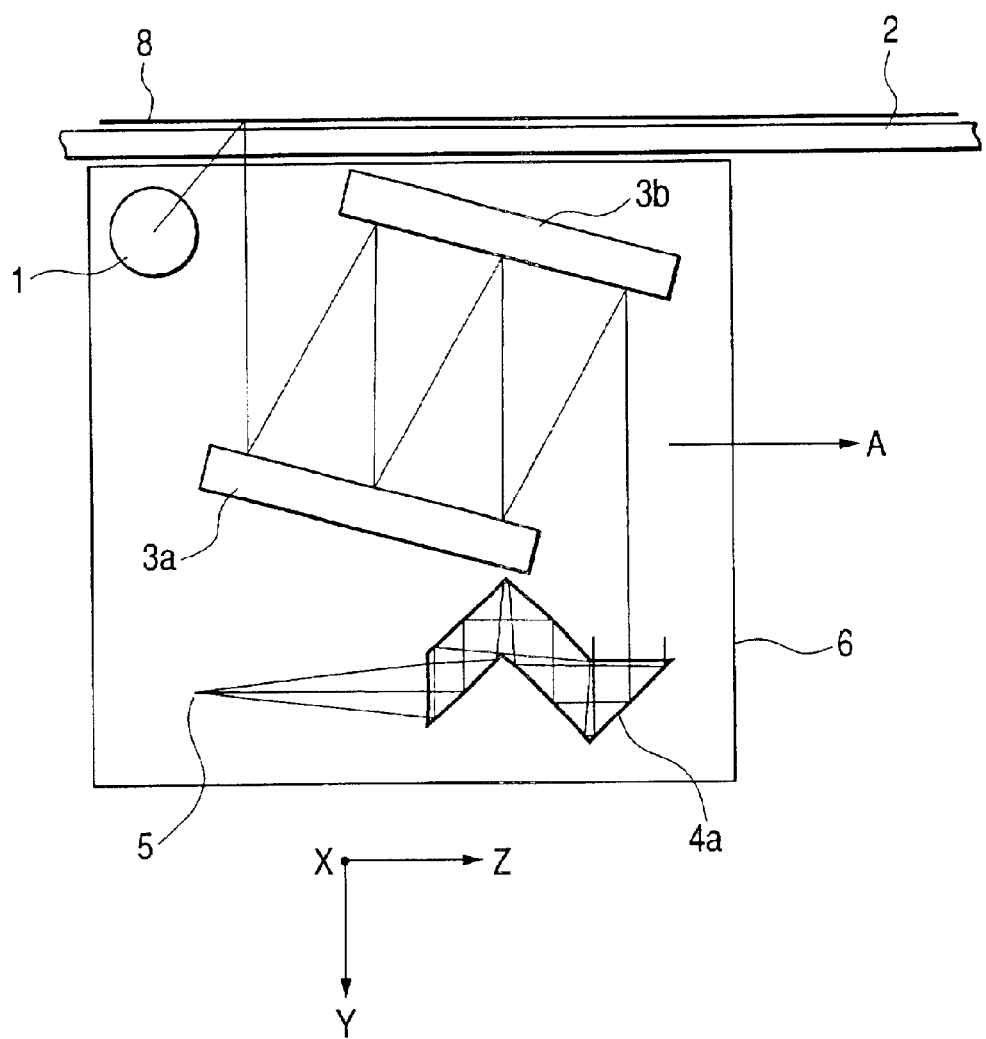
FIG. 2 is a schematic view of the essential portions of Embodiment 1 of the image reading apparatus of the present invention.

FIG. 2 is a schematic view of essential portions when the image reading imaging optical system of FIGS. 1A to 1C is applied to the image reading apparatus of an integral type scanning optical system.

The details of the embodiments of the present invention will hereinafter be described with reference to the drawings.

The imaging optical system (image reading imaging optical system) of the image reading apparatus of the present invention is designed such that the optical path length is short and basically the occurrence of chromatic aberration is little, by the utilization of an imaging optical element chiefly including a plurality of off-axial reflecting surfaces having curvatures. In some cases, the image reading imaging optical system also has a lens, a mirror, etc. In FIGS. 1A to 1C, an imaging optical element 4a has five off-axial reflecting surfaces (R3 to R7) of which the internal medium is optical resin and in which the direction of the incident ray LP1 of a reference axis ray and the direction of the emergent ray LP0 thereof differ from each other and which have curvatures, and has the function of causing an image on an original surface 8 to be imaged on a line sensor 5. Each off-axial reflecting surface adopts a construction for bending an optical path in a cross section in a direction (Y direction) perpendicular to a line in a direction (X direction) in which the sensors of the line sensor 5 are arranged, i.e., a sub scanning cross section (YZ cross section).

Also, the off-axial reflecting surface for deflecting the reference axis ray in a counter-clockwise direction is defined as a plus deflecting surface, and the off-axial reflecting surface for deflecting the reference axis ray in a clockwise direction is defined as a minus deflecting surface. At this time, the imaging optical element 4a of FIGS. 1A and 1B is of an arrangement in which in succession from the original surface 8 side, the surface R3 is a plus deflecting surface, the surface R4 is a plus deflecting surface, the surface R5 is a minus deflecting surface, the surface R6 is a minus deflecting surface and the surface R7 is a plus deflecting surface.

As the result, the direction of the reference axis ray LP0 emerging from an exit surface R8 becomes substantially perpendicular to the direction of the incident reference axis ray LPI. The plus deflecting surfaces continue the arrangement of the deflecting surfaces, and thereafter the minus deflecting surfaces continue it, whereby the optical path travels in a direction substantially orthogonal to the incident ray and therefore, the imaging optical element 4a can assume a spatially efficient disposition.

FIG. 1A shows an optical path in a cross section perpendicular to the line direction (X direction) of the line sensor 5, i.e., a sub scanning cross section, and FIG. 1B shows an optical path in a cross section parallel to the line direction of the line sensor 5, i.e., a main scanning cross section (XZ cross section). FIG. 1C shows a perspective view of the optical paths of the imaging optical element 4a.

As can be seen from FIGS. 1A and 1B, in the main scanning cross section, the beam width widens away from a stop surface SP, but in the sub scanning cross section, the beam width scarcely varies irrespective of each surface. That is, when the effective beam width in a direction perpendicular to the line direction (X direction) of the line sensor 5 on the exit surface R8 of the imaging optical element 4a, i.e., the sub scanning direction (Y direction) is defined as $\Phi s$, and the effective beam width in the line direction of the line sensor 5, i.e., the main scanning direction (X direction) is defined as $\Phi m$, the following condition is satisfied:

$$\Phi s < \Phi m$$

Accordingly, to construct the image reading apparatus compactly, it is preferable to bend the optical path in the sub scanning cross section. By this bending of the optical path, there can be adopted a construction suited for an integral carriage type scanning optical system. In Embodiment 1, the converging power of each off-axial reflecting surface is designed such that positive converging power and negative converging power are alternately arranged so that good imaging performance may be obtained.

In the construction of the reflecting surfaces, to construct them so as not to mutually intercept the optical path, it is unavoidable to secure the spacing between adjacent surfaces greatly to a certain extent. Accordingly, it is preferable to dispose a surface of a different characteristic near them to thereby correct aberrations. Preferably the arrangement of the converging power for that purpose may be such that positive converging power and negative converging power are alternately arranged.

In Embodiment 1, the image on the original surface is designed not to be intermediately imaged in the imaging optical element 4a, but to be directly imaged on the line sensor 5 after having emerged from the imaging optical element 4a. Thereby the curvature of each off-axial reflecting surface can be made gently and therefore it becomes easy to suppress aberrations occurring in each reflecting surface. Because of the construction in which the image on the original surface is not intermediately imaged in the imaging optical element 4a, in the line direction (X direction) of the line sensor 5, the beam widens as it moves away from the stop SP. In Embodiment 1, the stop SP is set on the off-axial reflecting surface near the center of the optical path of the imaging optical element 4a so that the effective beams on the incidence surface R2 and exit surface R8 of the imaging optical element 4a may not become large in the main scanning direction. This also contributes to the compact construction of the imaging optical element 4a.

In addition to the adoption of the above-described construction, the off-axial reflecting surfaces are made into free-form surfaces to thereby secure desired optical performance. Also, in Embodiment 1, the incidence surface R2 and the exit surface R8 are refracting surfaces and this becomes a factor which causes chromatic aberration to occur. So, both surfaces are made into free-form surfaces to thereby suppress the occurrence of chromatic aberration and also effect the correction of the other aberrations than chromatic aberration. In Embodiment 1, the medium between adjacent off-axial reflecting surfaces is formed of optically transparent plastic PMMA. It may also be formed of glass.

Figure 33:
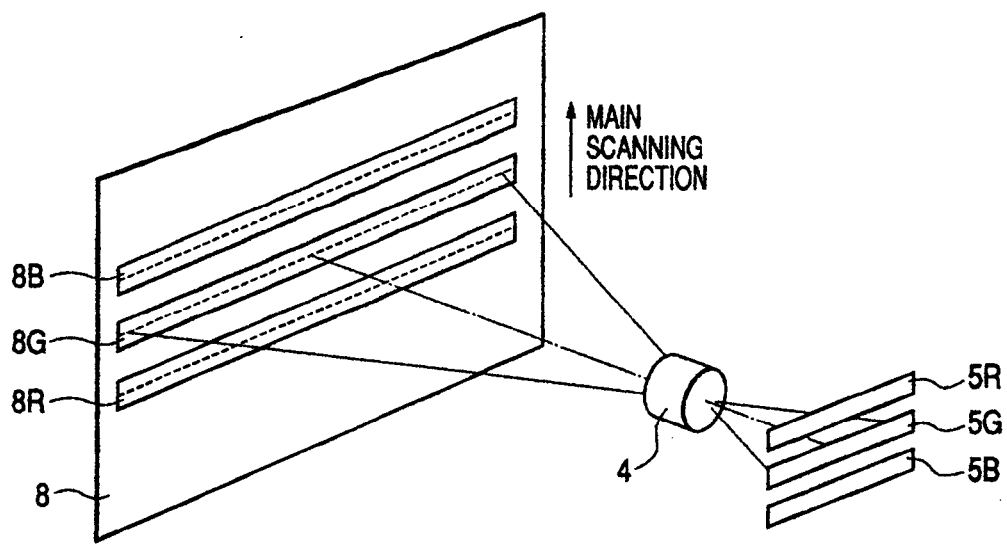
FIG. 33 is a schematic view of essential portions illustrating a color image reading apparatus according to the prior art.

FIG. 2 shows an example of an original reading apparatus for reading a color image or a monochromatic image which is constructed by the use of the imaging optical element 4a of Embodiment 1 shown in FIGS. 1A to 1C. When the image reading apparatus of the present invention takes up a color image as an object, it uses the sensor shown in FIG. 33.

In FIG. 2, the reference numeral 1 designates a light source, the reference numeral 2 denotes an original supporting glass table, the reference characters 3a and 3b designate first and second reflecting mirrors, the reference character 4a denotes the imaging optical element, the reference numeral 5 designates the line sensor comprised of a CCD or the like, and the reference numeral 6 denotes a carriage (housing).

An original 8 placed on the original supporting glass table 2 can be imaged on the line sensor 5 by the imaging optical element 4a through the intermediary of the mirrors 3a and 3b and one line of the original 8 can be read. In order to construct the original reading apparatus compactly, the optical path is folded by the first and second reflecting mirrors 3a and 3b. The imaging optical element 4a also contributes to folding the optical path. By using the imaging optical element 4a, the original reading apparatus of the integral carriage type optical system can be comprised of a few optical parts comprising the two mirrors and the imaging optical element.

Figure 32:
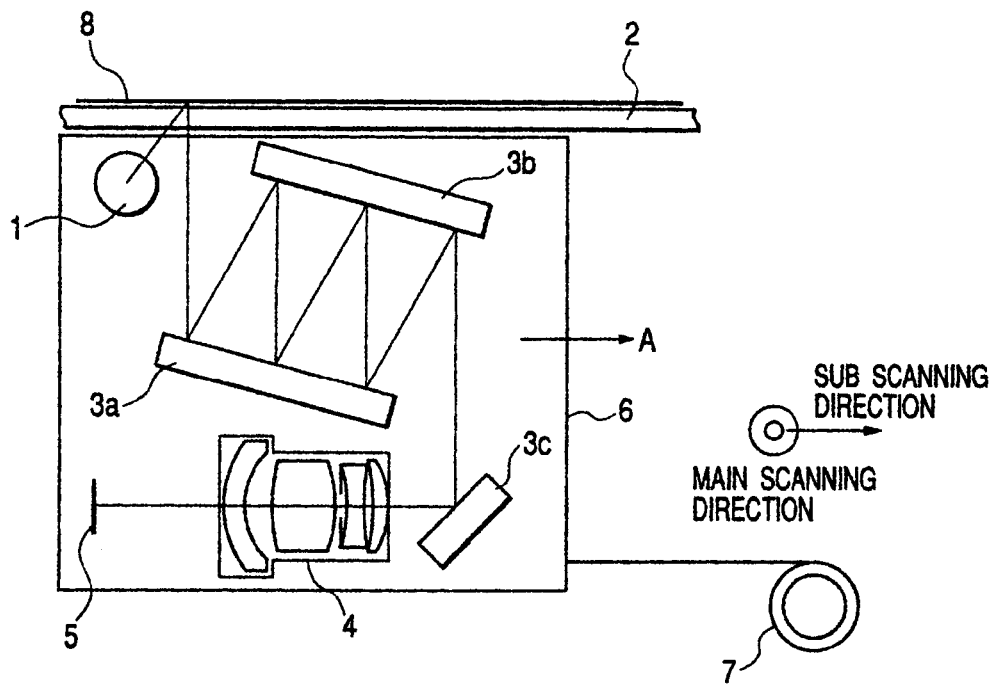
FIG. 32 shows an example of the arrangement of an integral carriage type scanning optical system according to the prior art.

As compared with the conventional construction of FIG. 32, the optical path is bent substantially at a right angle by only the imaging optical element and this corresponds to the adoption of a construction including a mirror in an imaging optical system, and the image reading apparatus can be made into a simple construction. This integral carriage type optical system scans the original 8 and the carriage 6 relative to each other in a direction perpendicular to the line direction (X direction) of the line sensor, i.e., the sub scanning direction (Y direction or A direction) to thereby two-dimensionally read the surface of the original 8.

Figure 3:
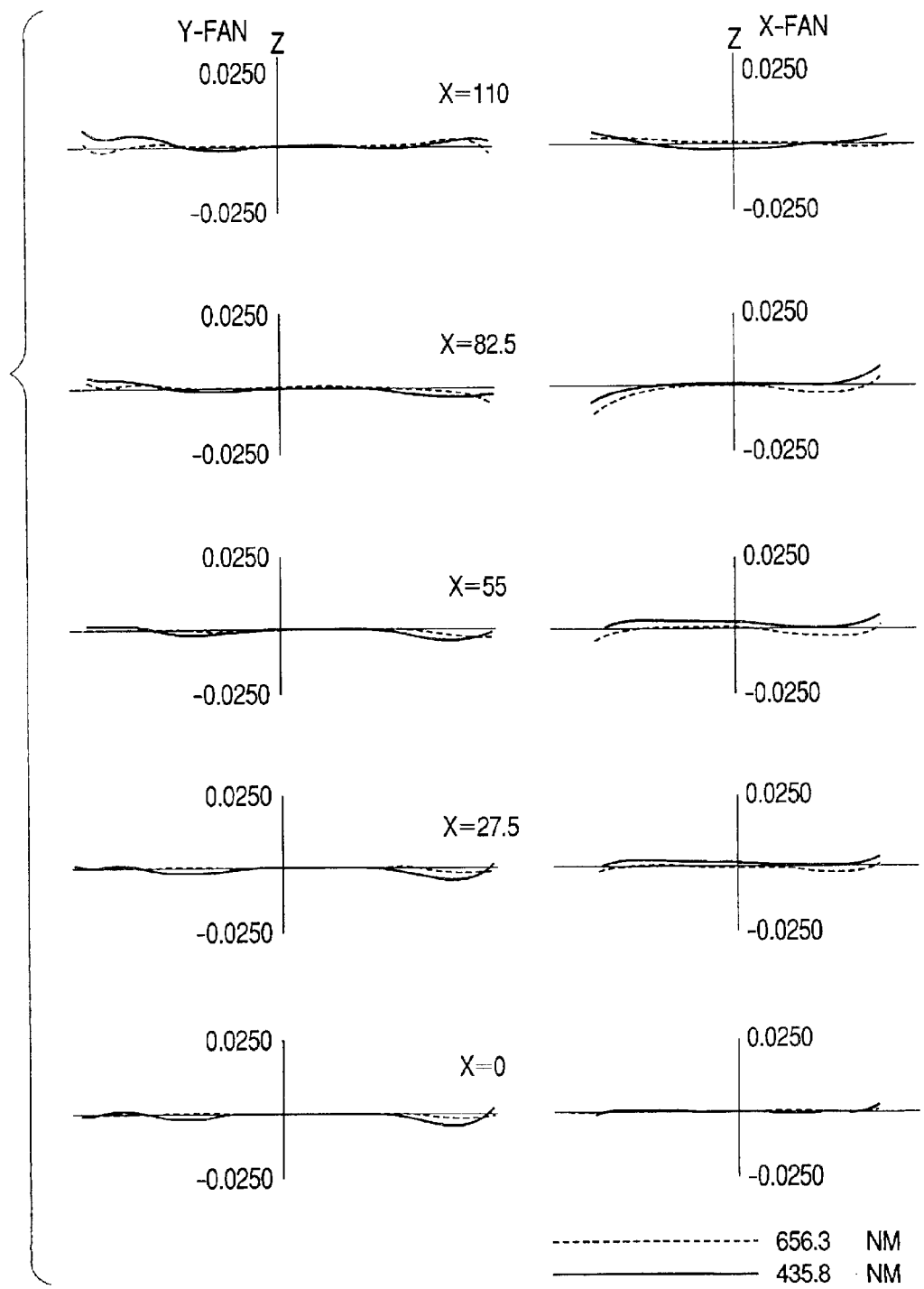
FIG. 3 shows the aberrations of Embodiment 1 of the image reading imaging optical system of the present invention.

FIG. 3 shows the aberrations about five points (image heights) in the line direction of the line sensor in Embodiment 1. In FIG. 3, X is representative of the height on the surface of the original.

Figure 4:
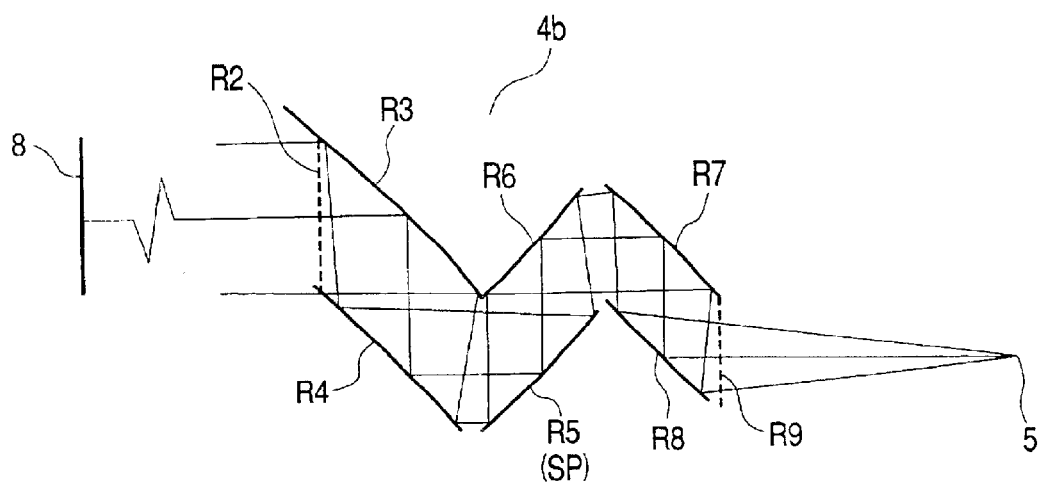
FIG. 4 is a schematic view of the essential portions of Embodiment 2 of the image reading imaging optical system of the present invention.

FIG. 4 is a cross-sectional view of the essential portions of Embodiment 2 of the imaging optical element of the present invention.

The imaging optical element 4b of Embodiment 2 is such that the direction of the exit surface R9 relative to the incidence surface R2 for the reference axis ray is the same, and only off-axial reflecting surfaces having curvatures are comprised of six surfaces (R3 to R8). The medium between adjacent reflecting surfaces is air, and is of a hollow construction in which basically chromatic aberration does not occur. By even number of times of reflection, the direction of the incident ray and the direction of the exit ray become substantially the same direction.

The imaging optical element 4b of FIG. 4 is of an arrangement in which, in succession from the original surface 8 side, the surface R3 is a plus deflecting surface, the surface R4 is a minus deflecting surface, the surface R5 is a minus deflecting surface, the surface R6 is a plus deflecting surface, the surface R7 is a plus deflecting surface, and the surface R8 is a minus deflecting surface.

As the result, the direction of the exit reference axis ray is substantially the same direction as the direction of the incident reference axis ray. The arrangement of the deflecting surfaces is made such that a set in which the minus deflecting surfaces continue and a set in which the plus deflecting surfaces continue are alternately arranged, whereby the optical path travels in a direction substantially parallel to the incident ray and therefore, the imaging optical element 4b can assume a spatially efficient disposition.

In Embodiment 2, as in Embodiment 1, the image of the original is designed not to be intermediately imaged in the imaging optical element 4b, but to be directly formed on the line sensor 5 so that the curvature of each off-axial reflecting surface can be constructed gently. Further, the stop SP is disposed near the center of the optical path of the imaging optical element 4b so that the effective beams on the incidence surface R2 and exit surface R9 of the imaging optical element 4b may not become large.

Figure 5:
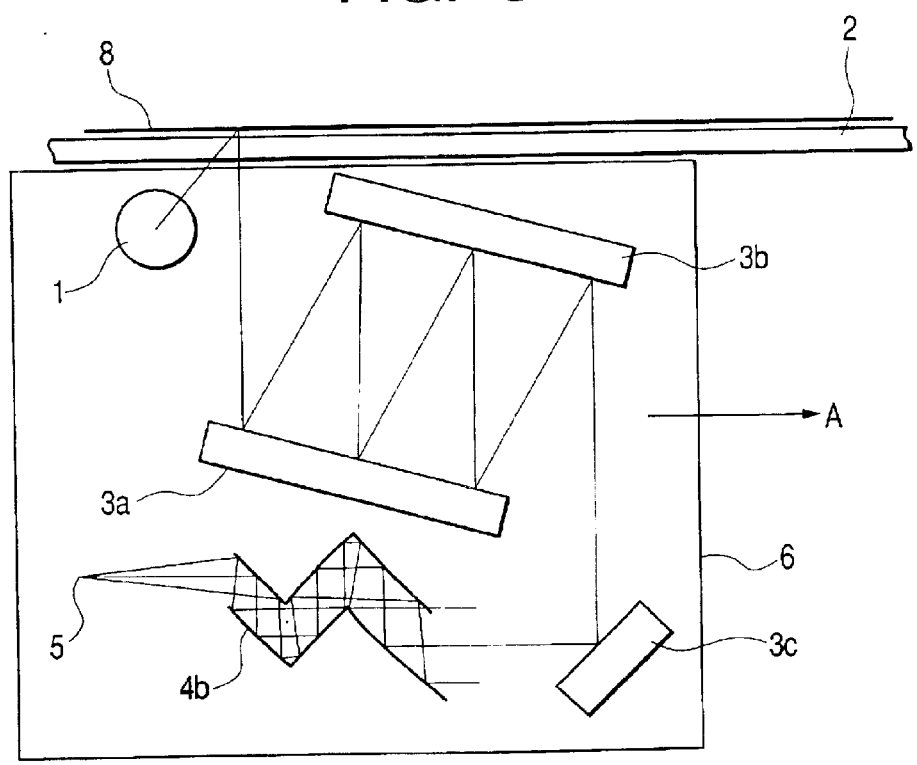
FIG. 5 is a schematic view of the essential portions of Embodiment 2 of the image reading apparatus of the present invention.

FIG. 5 shows an example in which the imaging optical element 4b of Embodiment 2 is applied to an original reading apparatus. Constituent parts in FIG. 5 are substantially similar to those in FIG. 2. The is reference character 3C designates a mirror. In FIG. 5, the conventional imaging lens comprised of a plurality of lenses can be replaced by the imaging optical element 4b comprising a few constituents. The imaging optical element 4b is of a construction free of the occurrence of chromatic aberration and can therefore easily constitute an integral carriage type optical system capable of effecting color reading free of color misregister.

Figure 6:
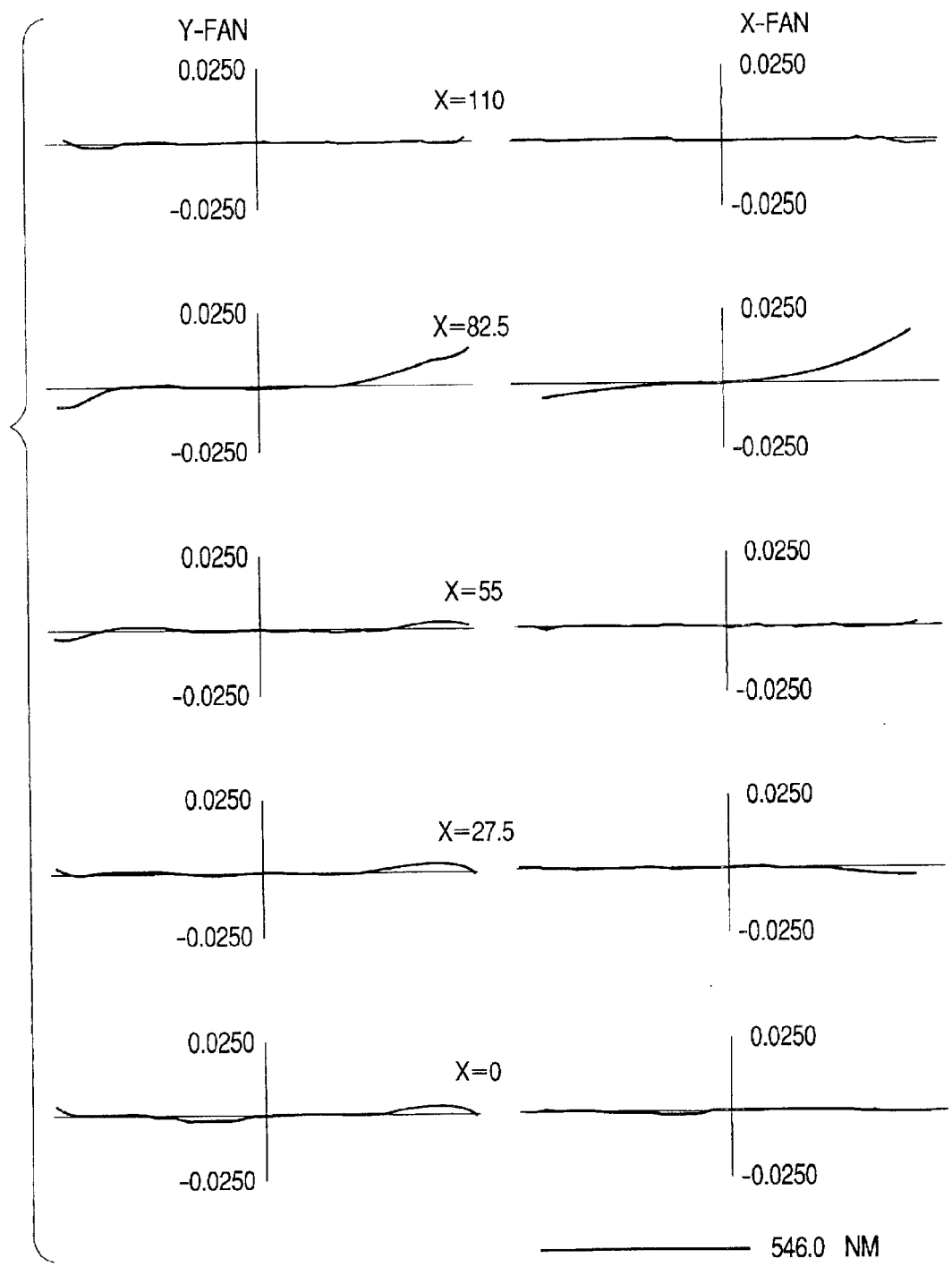
FIG. 6 shows the aberrations of Embodiment 2 of the image reading imaging optical system of the present invention.

FIG. 6 shows aberrations at five points (image heights) in the line direction of the line sensor in Embodiment 2. In FIG. 6, X is representative of the height on the surface of the original.

Figure 7:
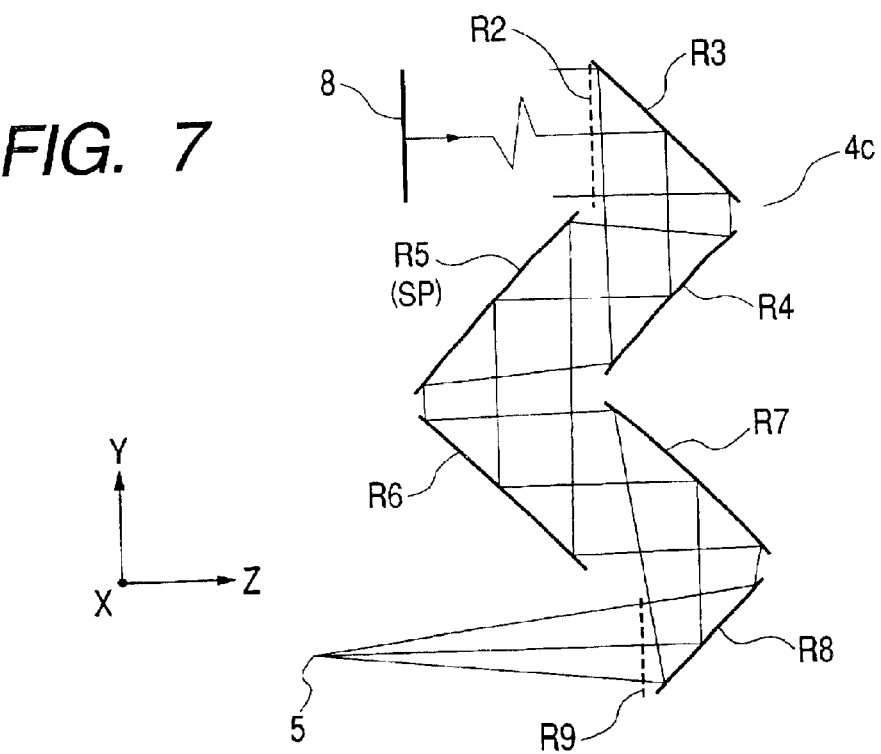
FIG. 7 is a schematic view of the essential portions of Embodiment 3 of the image reading imaging optical system of the present invention.

FIG. 7 is a cross-sectional view of the essential portions of Embodiment 3 of the imaging optical element 4c of the present invention. The imaging optical element of Embodiment 3 is such that reflecting surfaces are six surfaces (R3 to R8) and the medium between adjacent reflecting surfaces is air. Accordingly, the imaging optical element 4c is of a construction in which chromatic aberration does not occur. By an even number of times of reflection, the direction of the exit ray becomes substantially opposite to the direction of the incident ray.

The imaging optical element 4c of FIG. 7 is of an arrangement in which, in succession from the original surface 8 side, the surface R3 is a plus deflecting surface, the surface R4 is a plus deflecting surface, the surface R5 is a minus deflecting surface, the surface R6 is a minus deflecting surface, the surface R7 is a plus deflecting surface, and the surface R8 is a plus deflecting surface. As the result, the direction of the exit reference axis ray is substantially opposite to the direction of the incident reference axis ray. The arrangement of the deflecting surfaces is made such that a set in which the plus deflecting surfaces continue and a set in which the minus deflecting surfaces continue are alternately arranged, whereby the optical path travels in a direction substantially orthogonal to the incident ray and therefore, the imaging optical element 4c can assume a spatially efficient disposition.

In Embodiment 3, as in Embodiment 1, the image of the original is designed not to be intermediately imaged in the imaging optical element 4c, but to be directly formed on the line sensor 5, so that the curvature of each off-axial reflecting surface can be constructed gently. Further, the stop SP is disposed near the center of the optical path of the imaging optical element 4c so that the effective beams on the incidence surface R2 and exit surface R9 of the imaging optical element 4c may not become large.

Figure 8:
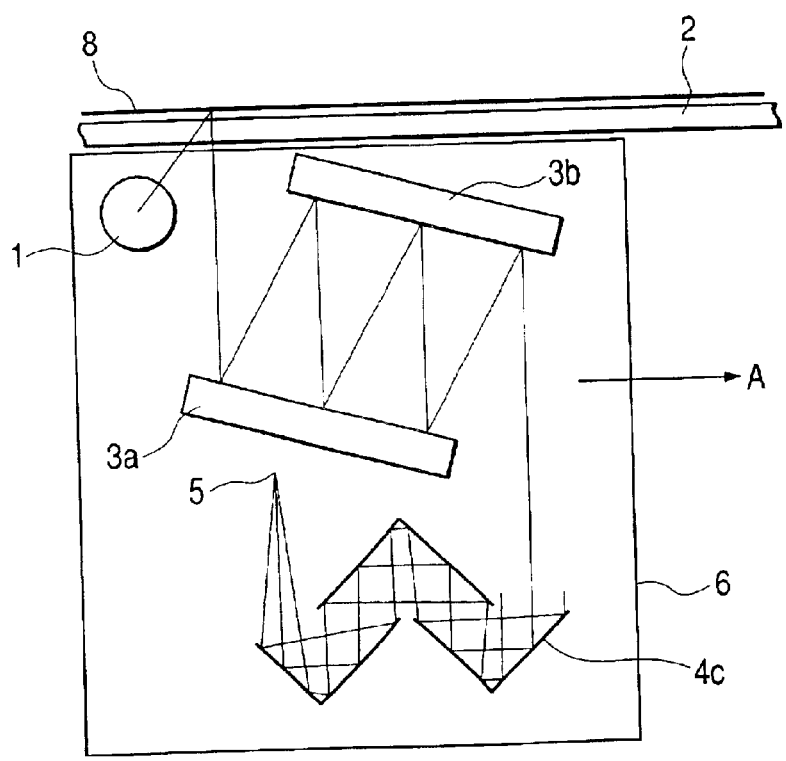
FIG. 8 is a schematic view of the essential portions of Embodiment 3 of the image reading apparatus of the present invention.

FIG. 8 shows an example in which the imaging optical element 4c of Embodiment 3 is applied to an original reading apparatus. Constituent parts in FIG. 8 are substantially similar to those in FIG. 2. In FIG. 8, the imaging optical element 4c is constructed such that the exit ray emerges in a direction opposed to the direction of the incident ray, and this corresponds to the optical path being bent twice, and as in the original reading apparatus of FIG. 2, the reflecting mirrors can be decreased relative to the prior art. Further, as regards the disposition of the line sensor 5, a compact construction becomes possible.

Figure 9:
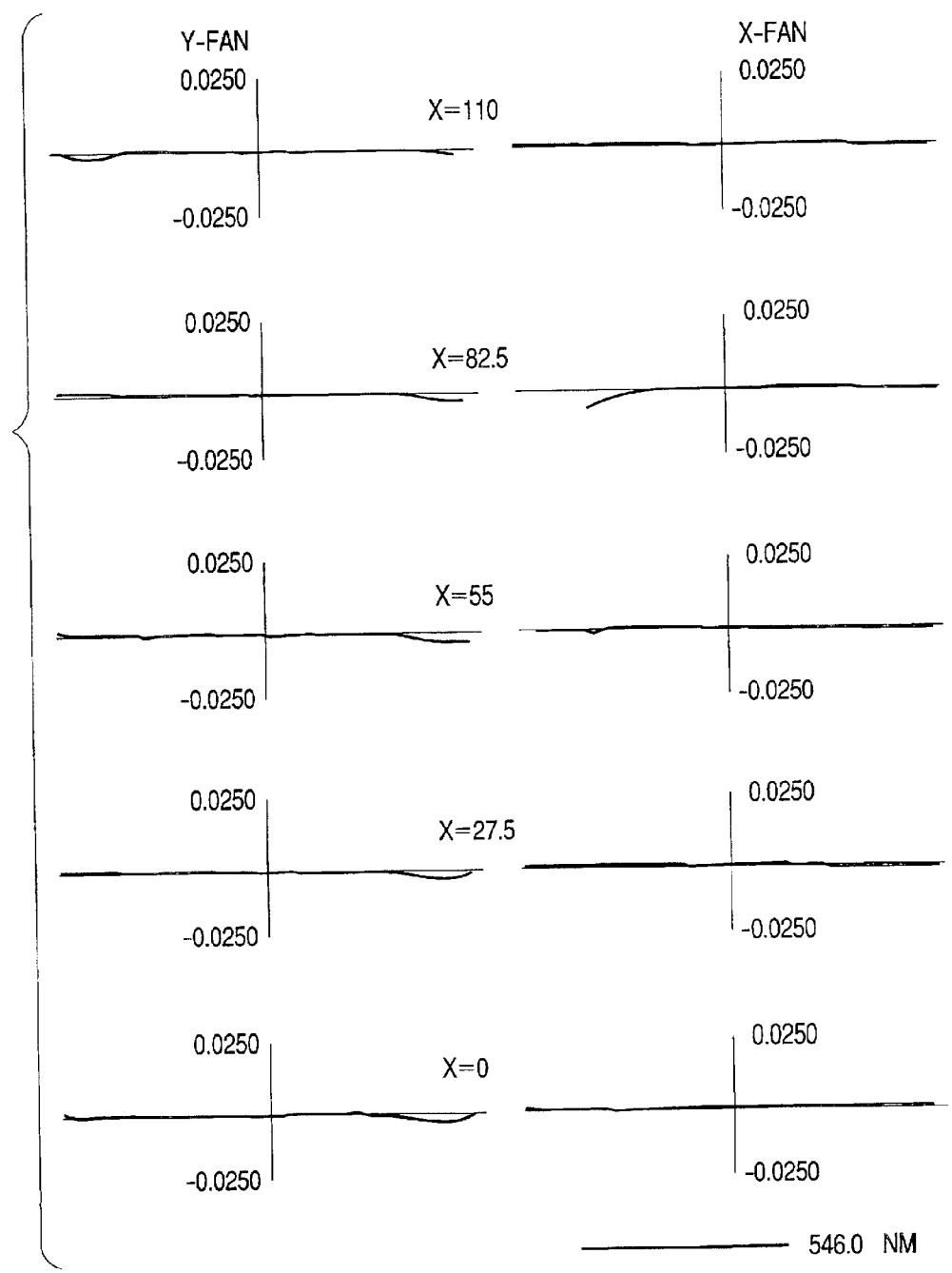
FIG. 9 shows the aberrations of Embodiment 3 of the image reading imaging optical system of the present invention.
Figure 10:
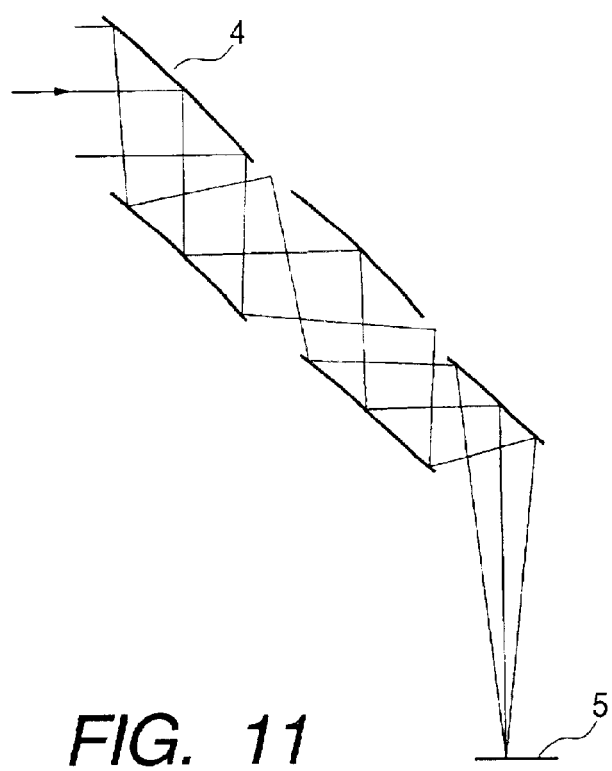
FIG. 10 is a cross-sectional view of the essential portions of Embodiment 4 of the image reading imaging optical system of the present invention.
Figure 11:
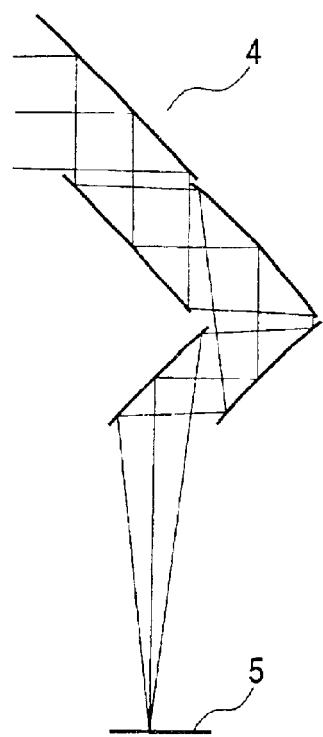
FIG. 11 is a cross-sectional view of the essential portions of Embodiment 5 of the image reading imaging optical system of the present invention.
Figure 12:
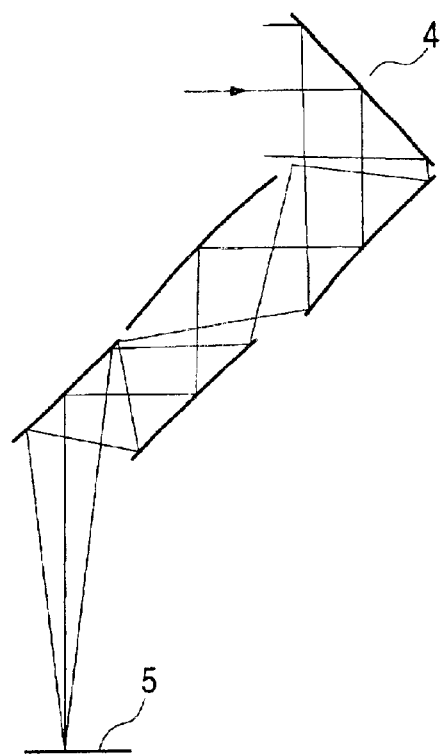
FIG. 12 is a cross-sectional view of the essential portions of Embodiment 6 of the image reading imaging optical system of the present invention.
Figure 13:
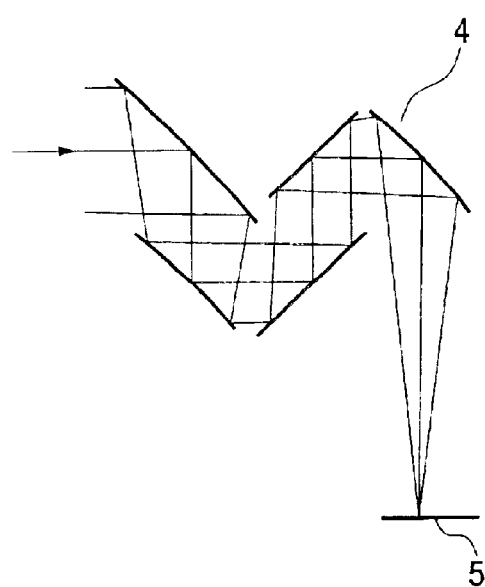
FIG. 13 is a cross-sectional view of the essential portions of Embodiment 7 of the image reading imaging optical system of the present invention.
Figure 14:
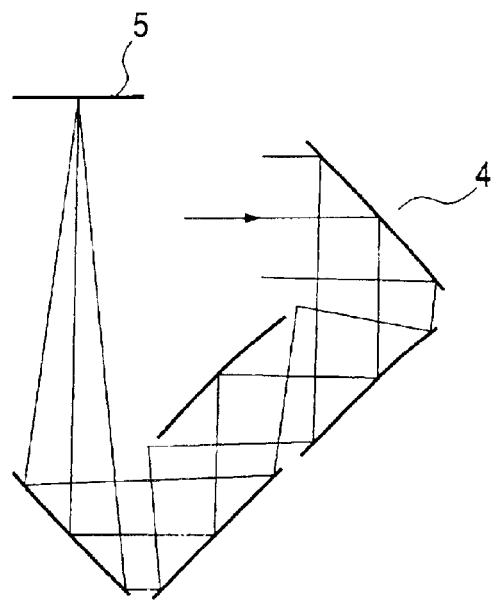
FIG. 14 is a cross-sectional view of the essential portions of Embodiment 8 of the image reading imaging optical system of the present invention.

FIG. 9 shows aberrations at five points (image heights) in the line direction of the line sensor in Embodiment 3. In FIG. 9, X is representative of the height on the surface of the original.

FIGS. 10 to 14 are cross-sectional views of the essential portions of Embodiments 4 to 8 of the imaging optical element of the present invention.

The imaging optical elements of FIGS. 10 to 14 have the imaging action chiefly by a plurality of reflecting surfaces. This is in a case where any of these imaging optical elements has five reflecting surfaces. The configurations of the imaging optical elements shown in FIG. 10 to FIG. 14 are appropriately selected in accordance with the construction of the reflecting mirrors provided in the original reading apparatus so as to accomplish more compact arrangement. Also even in a case where the number of the reflecting surfaces in an imaging optical element is six or more, several configurations of imaging optical elements are conceivable and therefore such configurations can be so selected as to conform to the construction of the original reading apparatus.

Figure 15:
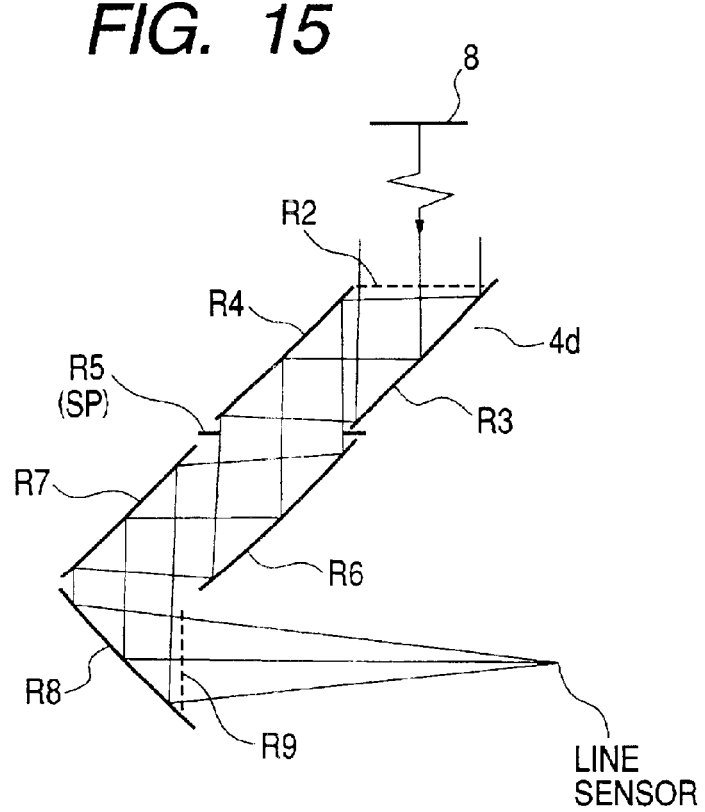
FIG. 15 is a schematic view of the essential portions of Embodiment 9 of the image reading imaging optical system of the present invention.

FIG. 15 is a cross-sectional view of the essential portions of Embodiment 9 of the imaging optical element of the present invention.

Figure 16:
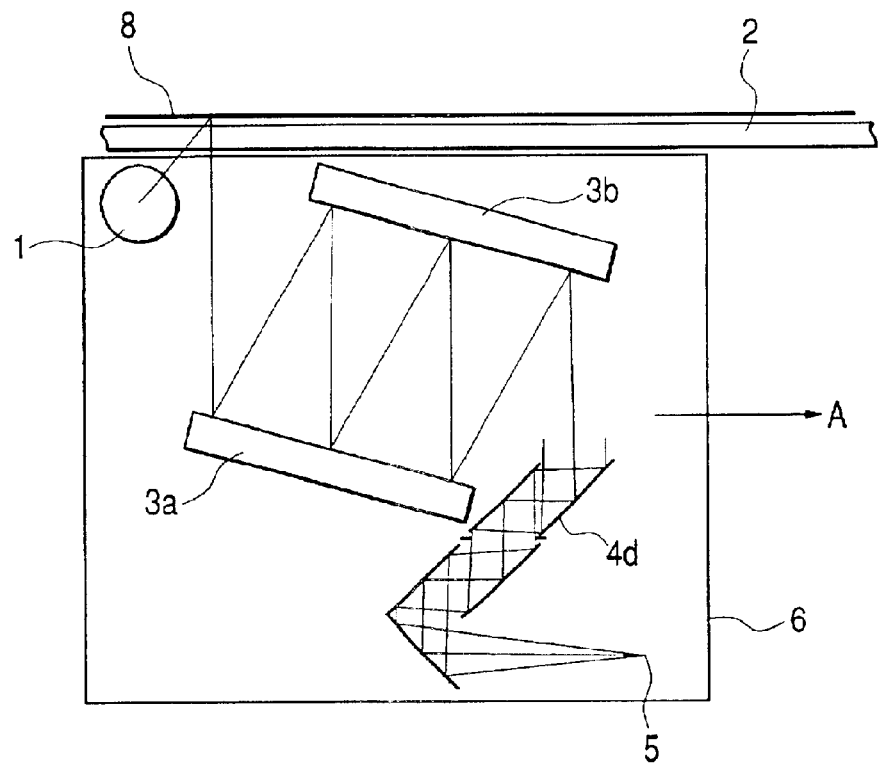
FIG. 16 is a schematic view of the essential portions of Embodiment 9 of the image reading apparatus of the present invention.

FIG. 16 shows an example in which the imaging optical element of Embodiment 9 is applied to an original reading apparatus.

The imaging optical element 4d of Embodiment 9 is such that reflecting surfaces comprise five surfaces (R3, R4, R6 to R8) and the medium between adjacent reflecting surfaces is air. Accordingly, the imaging optical element 4d is of a construction in which chromatic aberration does not occur.

The imaging optical element 4d of FIG. 15 is of an arrangement in which, in succession from the original surface 8 side, the surface R3 is a plus deflecting surface, the surface R4 is a minus deflecting surface, the surface R6 is a plus deflecting surface, the surface R7 is a minus deflecting surface, and the surface R8 is a minus deflecting surface. By this construction, a beam emerging from a reflecting mirror 3b is bent toward the first reflecting mirror side in the imaging optical element 4d, whereafter the beam is made to emerge in a direction opposite to the reflecting mirror.

That is, by an odd number of times of reflection, the direction of the exit reference axis ray becomes substantially perpendicular to the direction of the incident reference axis ray. The beam emerging from the two reflecting mirrors 3a and 3b for repetitively bending the optical path is imaged and is bent in a direction perpendicular to the direction of incidence so as to travel along the optical path in the imaging optical element 4d in a direction opposite to the reflecting mirror, whereby a spatially efficient disposition can be assumed.

In Embodiment 9, as in Embodiment 1, the original image is designed not to be intermediately imaged in the imaging optical element 4d, but to be directly formed on the line sensor 5 to thereby make the curvature of each off-axial reflecting surface gentle. Further, the stop SP is disposed near the center of the optical path of the imaging optical element 4d so that the effective beams on the incidence surface R2 and exit surface R9 of the imaging optical element may not become large. As shown, the imaging optical element 4d has the action of bending the optical path and therefore, an integral carriage type scanning type image reading apparatus can be realized by a simple construction comprising only two reflecting mirrors and an imaging optical element.

Figure 17:
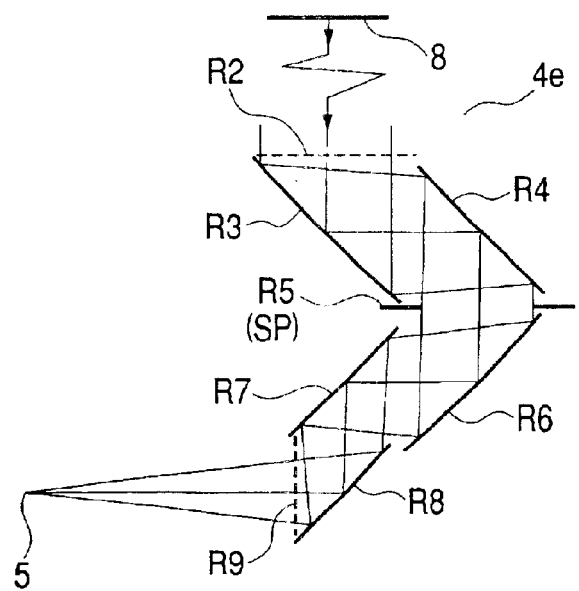
FIG. 17 is a schematic view of the essential portions of Embodiment 10 of the image reading imaging optical system of the present invention.

FIG. 17 is a cross-sectional view of the essential portions of Embodiment 10 of the imaging optical element of the present invention.

Figure 18:
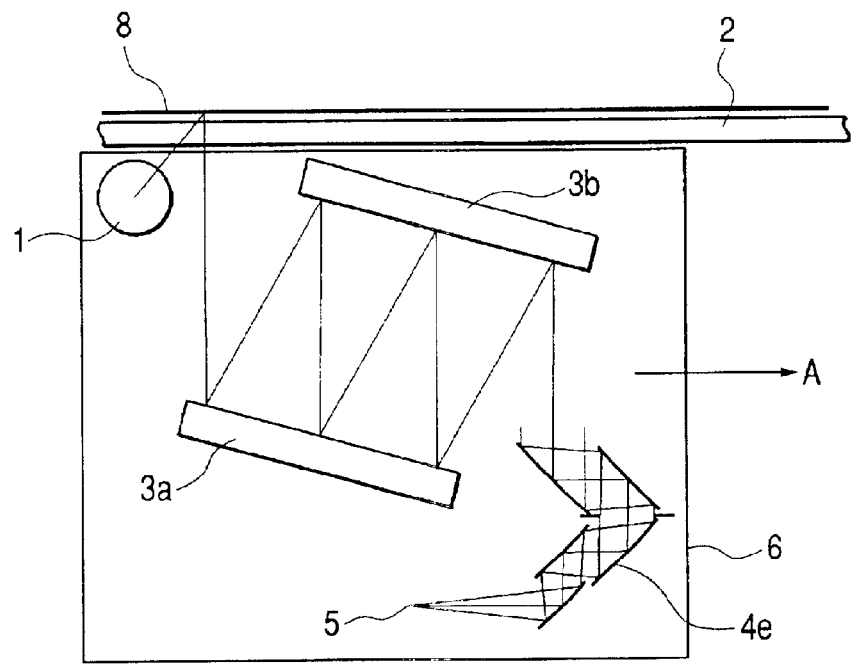
FIG. 18 is a schematic view of the essential portions of Embodiment 10 of the image reading apparatus of the present invention.

FIG. 18 shows an example in which the imaging optical element of Embodiment 10 is applied to an original reading apparatus.

The imaging optical element 4e of Embodiment 10 is such that reflecting surfaces comprise five surfaces (R3, R4, R6 to R8) and the medium between adjacent reflecting surfaces is air. Accordingly, the imaging optical element 4e is of a construction in which chromatic aberration does not occur.

The imaging optical element 4e of FIG. 17 is of an arrangement in which, in succession from the original surface 8 side, the surface R3 is a minus deflecting surface, the surface R4 is a plus deflecting surface, the surface R6 is a plus deflecting surface, the surface R7 is a minus deflecting surface, and the surface R8 is a plus deflecting surface. By this construction, the beam emerging from the reflecting mirror 3b is linearly downwardly directed in the imaging optical element 4e, and thereafter emerges toward the reflecting mirror side.

That is, by an odd number of times of reflection, the direction of the exit reference axis ray is substantially perpendicular to the direction of the incident reference axis ray. The beam emerging from the two reflecting mirrors 3a and 3b for repetitively bending the optical path is imaged by the imaging optical element 4e, and the optical path is bent in a direction substantially orthogonal to the direction of incidence so as to travel toward the reflecting mirrors, whereby a spatially efficient disposition can be assumed.

In Embodiment 10, as in Embodiment 1, the original image is designed not to be intermediately imaged in the imaging optical element 4e, but to be directly formed on the line sensor 5 so that the curvature of each off-axial reflecting surface can be made gentle. Further, the stop SP is disposed near the center of the optical path of the imaging optical element 4e so that the effective beams on the incidence surface R2 and exit surface R9 of the imaging optical element 4e may not become large. As shown, the imaging optical element 4e has the action of bending the optical path and therefore, an integral carriage type scanning type image reading apparatus can be realized by a simple construction comprising only two reflecting mirrors and the imaging optical element 4e.

Figure 19:
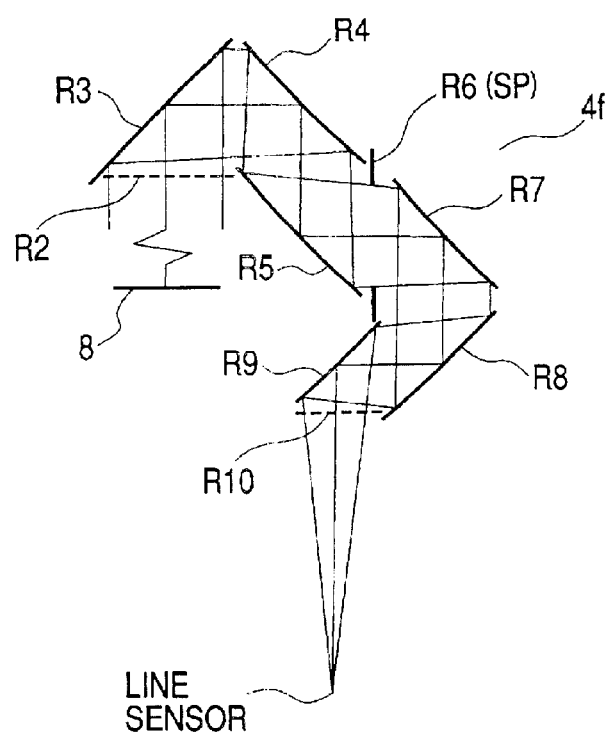
FIG. 19 is a schematic view of the essential portions of Embodiment 11 of the image reading imaging optical system of the present invention.

FIG. 19 is a cross-sectional view of the essential portions of Embodiment 11 of the imaging optical element of the present invention.

Figure 20:
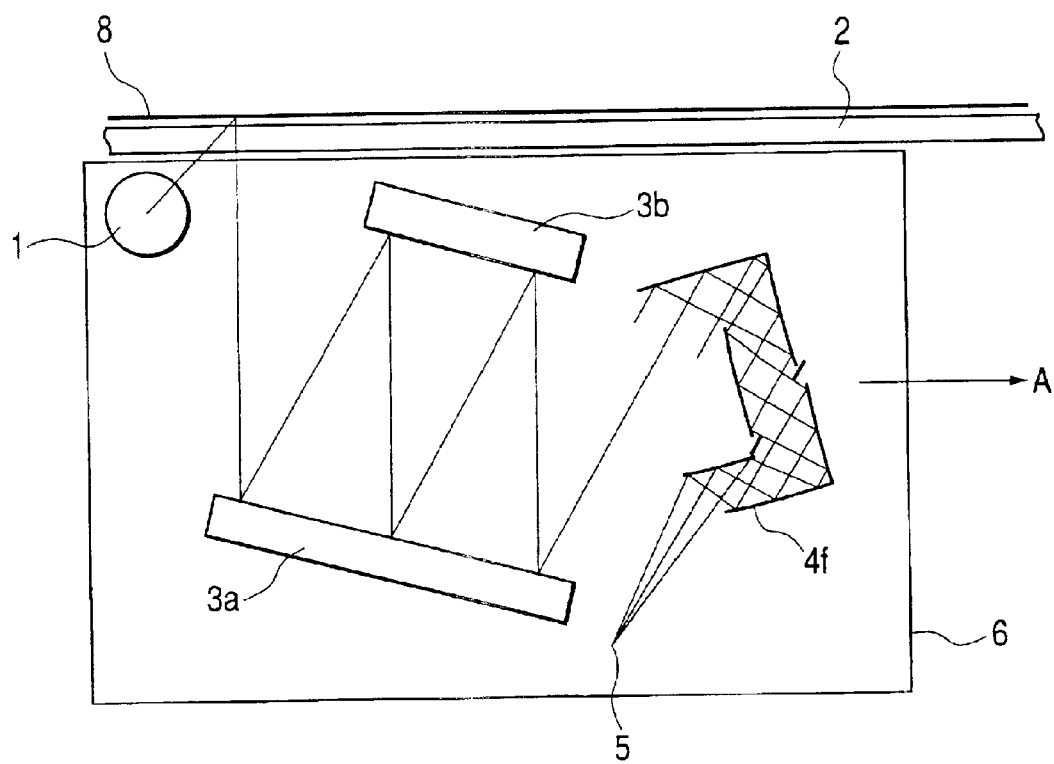
FIG. 20 is a schematic view of the essential portions of Embodiment 11 of the image reading apparatus of the present invention.

FIG. 20 is an example in which the imaging optical element of Embodiment 11 is applied to an original reading apparatus.

The imaging optical element 4f of Embodiment 11 is such that reflecting surfaces comprise six surfaces (R3 to R5, R7 to R9). Also, the medium between adjacent reflecting surfaces in the imaging optical element 4f is air. Accordingly, the imaging optical element 4f is of a construction in which chromatic aberration does not occur.

The imaging optical element 4f of FIG. 19 is of an arrangement in which, in succession from the original surface 8 side, the surface R3 is a plus deflecting surface, the surface R4 is a plus deflecting surface, the surface R5 is a minus deflecting surface, the surface R7 is a plus deflecting surface, the surface R8 is a plus deflecting surface, and the surface R9 is a minus deflecting surface. In FIG. 20, the beam emerging from the reflecting mirror 3a has its optical path bent in the imaging optical element 4f, and thereafter is substantially linearly downwardly directed and emerges.

That is, the direction of the reference axis ray emerging from the imaging optical element 4f is substantially opposite to the direction of the incident reference axis ray. The beam emerging from two reflecting mirrors 3a and 3b for repetitively bending the optical path is imaged by the imaging optical element 4f, and the optical path is reversed and bent so as to travel downwardly, whereby a spatially efficient disposition can be assumed.

In Embodiment 11, as in Embodiment 1, the original image is designed not to be intermediately imaged in the imaging optical element 4f, but to be directly formed on the line sensor 5, and the curvature of each off-axial reflecting surface is made gentle. Further, the stop SP is disposed near the center of the optical path of the imaging optical element 4f so that the effective beams on the incidence surface R2 and exit surface R10 of the imaging optical element 4f may not become large. As shown, the imaging optical element has the action of bending the optical path and therefore, an integral carriage type image reading apparatus can be realized by a simple construction comprising only the two reflecting mirrors 3a and 3b and the imaging optical element 4f. In this construction, the frequency of reflection of the beam by the reflecting mirror 3b can be decreased and therefore, the reflecting mirror 3b can be made small.

The above-described imaging optical elements 4d to 4f use reflecting surfaces which are free-form surfaces to thereby more shorten the distance between the original surface and the imaging optical element than in the conventional imaging optical system, thereby realizing the construction of an integral carriage type optical system.

FIGS. 21A to 21C are cross-sectional views of the essential portions of Embodiment 12 of the imaging optical element of the present invention. The configuration of the imaging optical element of the present embodiment is the same as that of Embodiment 10 of FIG. 17.

Figure 22:
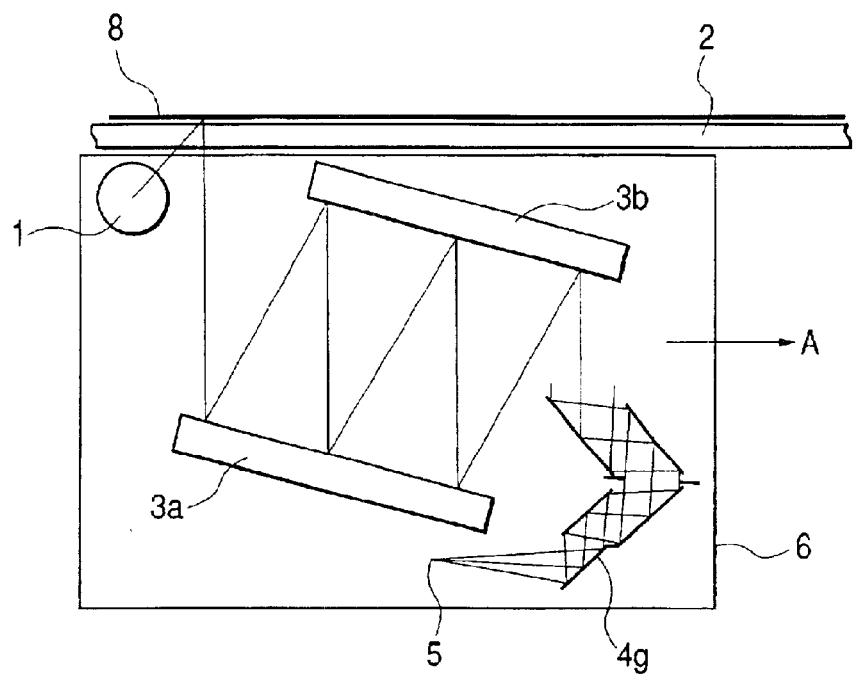
FIG. 22 is a schematic view of the essential portions of Embodiment 12 of the image reading apparatus of the present invention.

FIG. 22 shows an example in which the imaging optical element of Embodiment 12 is applied to an original reading apparatus.

The imaging optical element of FIGS. 21A to 21C has five off-axial reflecting surfaces (R3, R4, R6 to R8) differing in the direction of the incident ray of the reference axis ray and the direction of the exit ray thereof from one another and having curvatures and has the function of imaging the original surface 8 on the line sensor 5. The medium between adjacent reflecting surfaces is air. Accordingly, the imaging optical element 4g is of a construction in which chromatic aberration does not occur. Each off-axial reflecting surface adopts a construction for bending the optical path in a cross section perpendicular to the line direction of the line sensor 5, i.e., the sub scanning cross section.

The imaging optical element 4g of FIGS. 21A to 21C is of an arrangement in which, in succession from the original surface 8 side, the surface R3 is a minus deflecting surface, the surface R4 is a plus deflecting surface, the surface R6 is a plus deflecting surface, the surface R7 is a minus deflecting surface, and the surface R8 is a plus deflecting surface. As the result, the direction of the exit reference axis ray is substantially perpendicular to the direction of the incident reference axis ray.

In FIGS. 21A to 21C, the stop SP is disposed between the second reflecting surface R4 and the third reflecting surface R6 intersecting with each other. FIG. 21A shows the optical path of a cross section perpendicular to the line direction of the line sensor, i.e., the sub scanning cross section, and FIG. 21B shows the optical path of a cross section parallel to the line direction of the line sensor, i.e., the main scanning cross section. FIG. 21C shows a perspective view of the aforementioned optical paths.

In the imaging optical element 4g, the image on the original surface is designed not to be intermediately imaged in the imaging optical element, but to be directly imaged on the line sensor 5 after having emerged from the imaging optical element. Thereby the curvature of each off-axial reflecting surface can be made gentle and therefore, it becomes easy to suppress aberrations occurring in each reflecting surface. However, in the construction of adjacent reflecting surfaces, to construct them so as not to mutually intercept the optical path, it is unavoidable to secure the spacing between the adjacent surfaces large to a certain extent, but because of the construction in which the image on the original surface is not intermediately imaged in the imaging optical element, in the line direction of the line sensor, the beam widens as it goes away from the stop.

In the present embodiment, the stop SP is set near the center of the optical path of the imaging optical element so that the effective beams on the incidence surface and exit surface of the imaging optical element may not become large in the main scanning direction. A beam is always obliquely incident on and reflected by an off-axial reflecting surface and therefore asymmetrical aberration occurs and thus, basically it is preferable to adopt a construction in which the asymmetrical aberration is offset.

So, in the present embodiment, the off-axial reflecting surfaces disposed before and behind the stop S constitute a set of off-axial reflecting surfaces intersecting with each other so as to become substantially symmetrical with respect to the stop. Further, in the construction, the off-axial reflecting surfaces adjacent to the set of off-axial reflecting surfaces intersecting with each other cannot help assuming a disposition parallel to the off-axial reflecting surfaces intersecting with each other, and the adjacent off-axial reflecting surfaces adopt a construction in which they intersect with each other. Accordingly, such disposition of the stop enables the stop to be constructed integrally with one of the off-axial reflecting surfaces intersecting with each other and the off-axial reflecting surface adjacent thereto.

In FIG. 22, the reference numeral 2 designates an original supporting glass table, the reference characters 3a and 3b denote first and second reflecting mirrors, the reference character 4g designates the imaging optical element, and the reference numeral 5 denotes the line sensor comprised of a CCD or the like.

The original 8 placed on the original supporting glass table 2 is imaged on the line sensor 5 by the imaging optical element 4g and one line of the original can be read. In order to construct the original reading apparatus compactly, the optical path is folded by the first and second reflecting mirrors 3a and 3b. The imaging optical element 4g also contributes to folding the optical path. By using the imaging optical element 4g, the original reading apparatus of an integral carriage type optical system can be comprised of a few optical parts comprising the two reflecting mirrors and the imaging optical element.

As compared with the conventional construction, the optical path is bent substantially at a right angle by only the imaging optical element, and this corresponds to the adoption of a construction including a mirror in an imaging optical system, and the image reading apparatus can be simplified in construction. This integral carriage type optical system scans in a direction perpendicular to the line direction of the line sensor, i.e., the sub scanning direction, to thereby two-dimensionally read the original surface.

Figure 23:
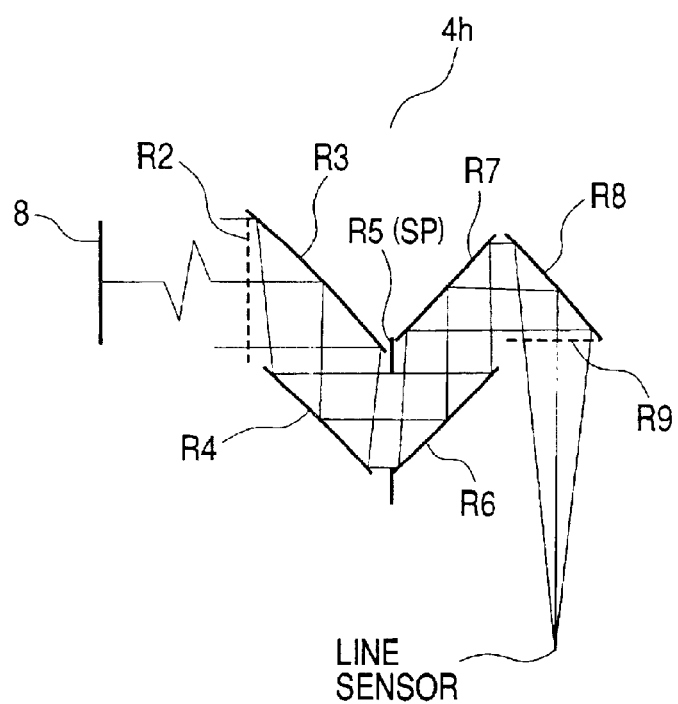
FIG. 23 is a schematic view of the essential portions of Embodiment 13 of the image reading imaging optical system of the present invention.

FIG. 23 is a cross-sectional view of the essential portions of Embodiment 13 of the imaging optical element of the present invention. The configuration of the imaging optical element of the present embodiment is the same as that of Embodiment 10 of FIG. 17.

Figure 24:
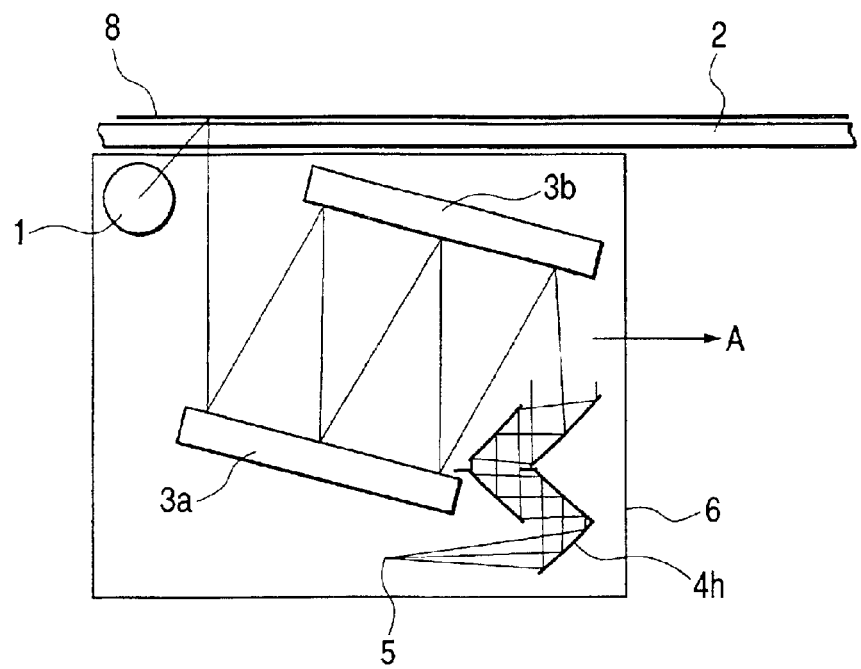
FIG. 24 is a schematic view of the essential portions of Embodiment 13 of the image reading apparatus of the present invention.

FIG. 24 shows an example in which the imaging optical element of Embodiment 13 is applied to an original reading apparatus.

The imaging optical element 4h of the present embodiment has five off-axial reflecting surfaces (R3, R4, R6 to R8), and the medium between adjacent reflecting surfaces is air. Accordingly, this imaging optical element is of a construction in which chromatic aberration does not occur.

The imaging optical element 4h is of an arrangement in which, in succession from the original surface 8 side, the surface R3 is a plus deflecting surface, the surface R4 is a minus deflecting surface, the surface R6 is a minus deflecting surface, the surface R7 is a plus deflecting surface, and the surface R8 is a plus deflecting surface. The direction of the reference axis ray emerging from the imaging optical element 4h is substantially perpendicular to the direction of the incident reference axis ray. In this construction, the stop SP is disposed between the second reflecting surface R4 and the third reflecting surface R6 located to be intersected with each other. The stop SP is disposed near the center of the optical path of the imaging optical element 4h and therefore, the effective beams on the incidence surface and exit surface of the imaging optical element do not become large.

Basically it is preferable to adopt a construction in which asymmetrical aberration is cancelled and therefore, the off-axial reflecting surfaces disposed before and behind the stop SP constitute a set of off-axial reflecting surfaces intersecting with each other so as to be substantially symmetrical with respect to the stop SP.

Figure 25:
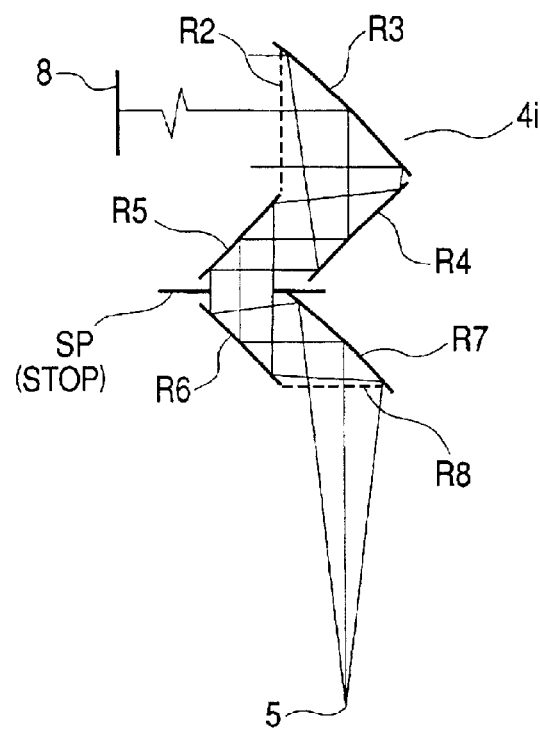
FIG. 25 is a schematic view of the essential portions of Embodiment 14 of the image reading imaging optical system of the present invention.

FIG. 25 is a cross-sectional view of the essential portions of Embodiment 14 of the imaging optical element of the present invention. The configuration of the imaging optical element of the present embodiment is the same as that of Embodiment 1 of FIGS. 1A and 1B.

Figure 26:
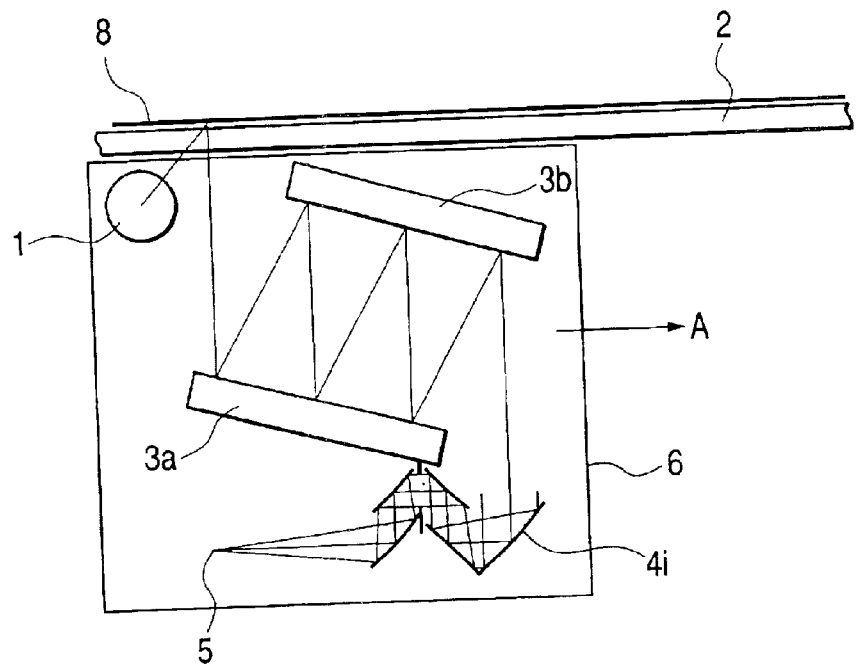
FIG. 26 is a schematic view of the essential portions of Embodiment 14 of the image reading apparatus of the present invention.

FIG. 26 shows an example in which the imaging optical element of Embodiment 14 is applied to an original reading apparatus.

The imaging optical element 4i has five reflecting surfaces (R3 to R7), and the medium between adjacent reflecting surfaces is air. Accordingly, the imaging optical element 4i is of a construction in which chromatic aberration does not occur. The imaging optical element 4i is of an arrangement in which, in succession from the original surface 8 side, the surface R3 is a plus deflecting surface, the surface R4 is a plus deflecting surface, the surface R5 is a minus deflecting surface, the surface R6 is a minus deflecting surface, and the surface R7 is a plus deflecting surface. By this construction, the reference axis ray emerging from the imaging optical element 4i emerges in a direction substantially orthogonal to the direction of incidence. In this construction, the stop SP is disposed between the third reflecting surface R5 and the fourth reflecting surface R6 intersecting with each other.

Further, the stop SP is disposed near the center of the optical path of the imaging optical element 4i so that the effective beams on the incidence surface and exit surface of the imaging optical element may not become large. Basically it is preferable to adopt a construction in which an asymmetrical aberration is cancelled and therefore, the off-axial reflecting surfaces disposed before and behind the stop constitute a set of off-axial reflecting surfaces intersecting with each other so as to be substantially symmetrical with respect to the stop.

Figure 27:
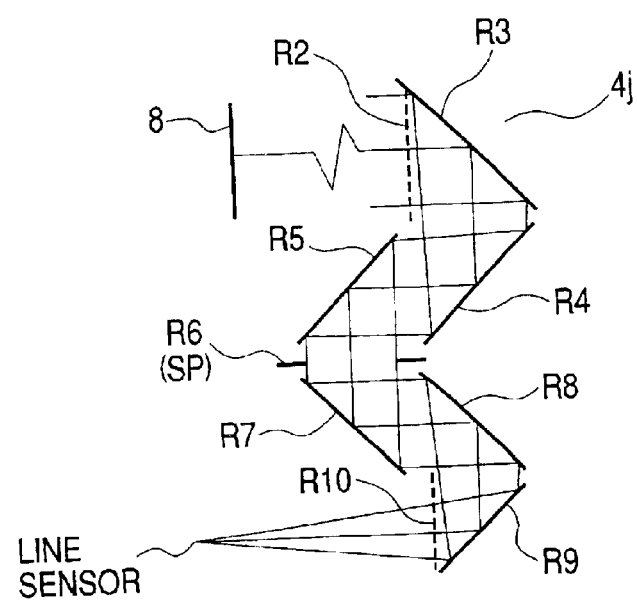
FIG. 27 is a schematic view of the essential portions of Embodiment 15 of the image reading imaging optical system of the present invention.

FIG. 27 is a cross-sectional view of the essential portions of Embodiment 15 of the imaging optical element of the present invention. The configuration of the imaging optical element of the present embodiment is the same as that of Embodiment 3 of FIG. 7.

Figure 28:
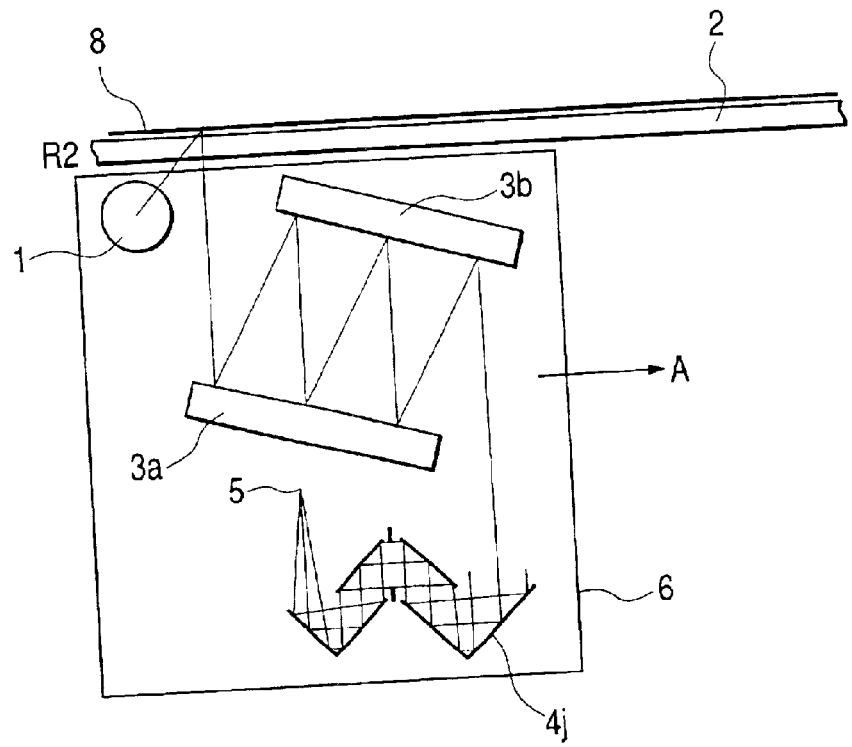
FIG. 28 is a schematic view of the essential portions of Embodiment 15 of the image reading apparatus of the present invention.

FIG. 28 shows an example in which the imaging optical element of Embodiment 15 is applied to an original reading apparatus.

The imaging optical element 4j has six reflecting surfaces (R3 to R5, R7 to R9). It is an imaging optical element in which the medium between adjacent reflecting surfaces is air. Accordingly, the imaging optical element 4j is of a construction in which chromatic aberration does not occur. The imaging optical element 4j is of an arrangement in which, in succession from the original surface 8 side, the surface R3 is a plus deflecting surface, the surface R4 is a plus deflecting surface, the surface R5 is a minus deflecting surface, the surface R7 is a minus deflecting surface, the surface R8 is a plus deflecting surface, and the surface R9 is a plus deflecting surface. By this construction, the incident beam is substantially linearly downwardly directed in the imaging optical element, whereafter the direction of the reference axis ray emerging by an even number of times of reflection is substantially opposite to the direction of the incident reference axis ray.

The original image is designed not to be intermediately imaged in the imaging optical element, but to be directly formed on the line sensor 5 so that the curvature of each off-axial reflecting surface can be made gentle. Further, the stop SP is disposed between the third reflecting surface R5 and the fourth reflecting surface R7 located to be intersected with each other. Since the stop SP is near the center of the optical path of the imaging optical element 4j, the effective beams on the incidence surface and exit surface of the imaging optical element 4j do not become large. Basically it is preferable to adopt a construction in which an asymmetrical aberration is cancelled and therefore, a set of off-axial reflecting surfaces intersecting with each other are designed such that the off-axial reflecting surfaces disposed before and behind the stop become substantially symmetrical with respect to the stop.

Figure 29:
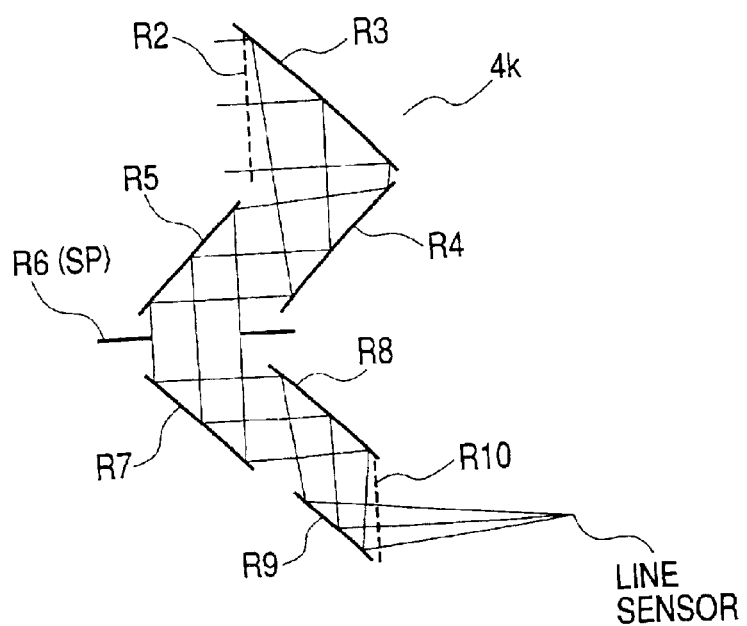
FIG. 29 is a schematic view of the essential portions of Embodiment 16 of the image reading imaging optical system of the present invention.

FIG. 29 is a cross-sectional view of the essential portions of Embodiment 16 of the imaging optical element of the present invention.

Figure 30:
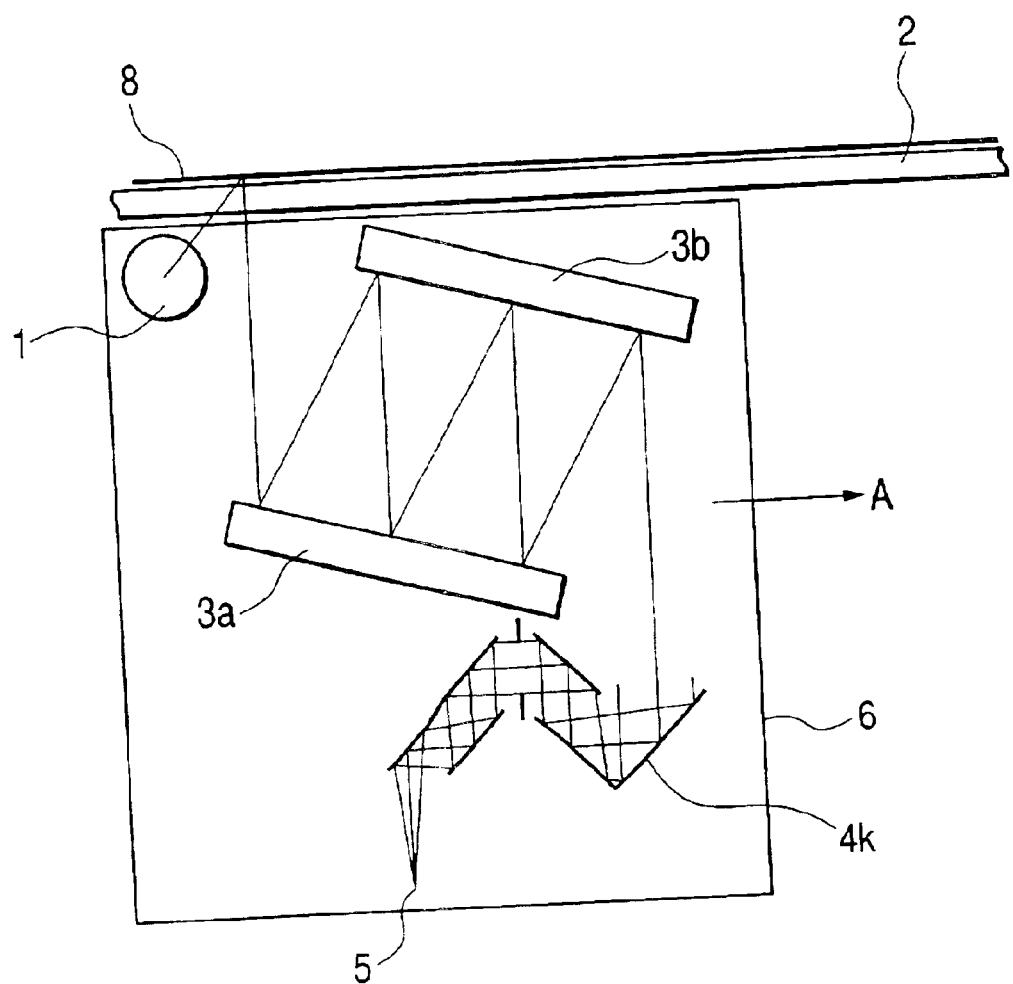
FIG. 30 is a schematic view of the essential portions of Embodiment 16 of the image reading apparatus of the present invention.

FIG. 30 shows an example in which the imaging optical element of Embodiment 16 is applied to an original reading apparatus.

The imaging optical element 4k has six reflecting surfaces (R3 to R5, R7 to R9). It is an imaging optical element in which the medium between adjacent reflecting surfaces is air. Accordingly, the imaging optical element 4k is of a construction in which chromatic aberration does not occur. The imaging optical element 4k is of an arrangement in which, in succession from the original surface 8 side, the surface R3 is a plus deflecting surface, the surface R4 is a plus deflecting surface, the surface R5 is a minus deflecting surface, the surface R7 is a minus deflecting surface, the surface R8 is a plus deflecting surface, and the surface R9 is a minus deflecting surface. By this construction, the incident beam is substantially linearly downwardly directed in the imaging optical element, whereafter the direction of the reference axis ray emerging by even number of times of reflection is substantially the same direction as the direction of the incident reference axis ray.

The original image is designed not to be intermediately imaged in the imaging optical element, but to be directly formed on the line sensor 5 so that the curvature of each off-axial reflecting surface can be made gentle. Further, the stop SP is disposed between the third reflecting surface R5 and the fourth reflecting surface R7 located to be intersected with each other. Since the stop SP is near the center of the optical path of the imaging optical element, the effective beams on the incidence surface and exit surface of the imaging optical element do not become large. Basically it is preferable to adopt a construction in which an asymmetrical aberration is cancelled and therefore, a set of off-axial reflecting surfaces intersecting with each other are designed such that the off-axial reflecting surfaces disposed before and behind the stop SP become substantially symmetrical with respect to the stop. The construction of the original reading apparatus is basically the same as that of Embodiment 1.

Figure 34:
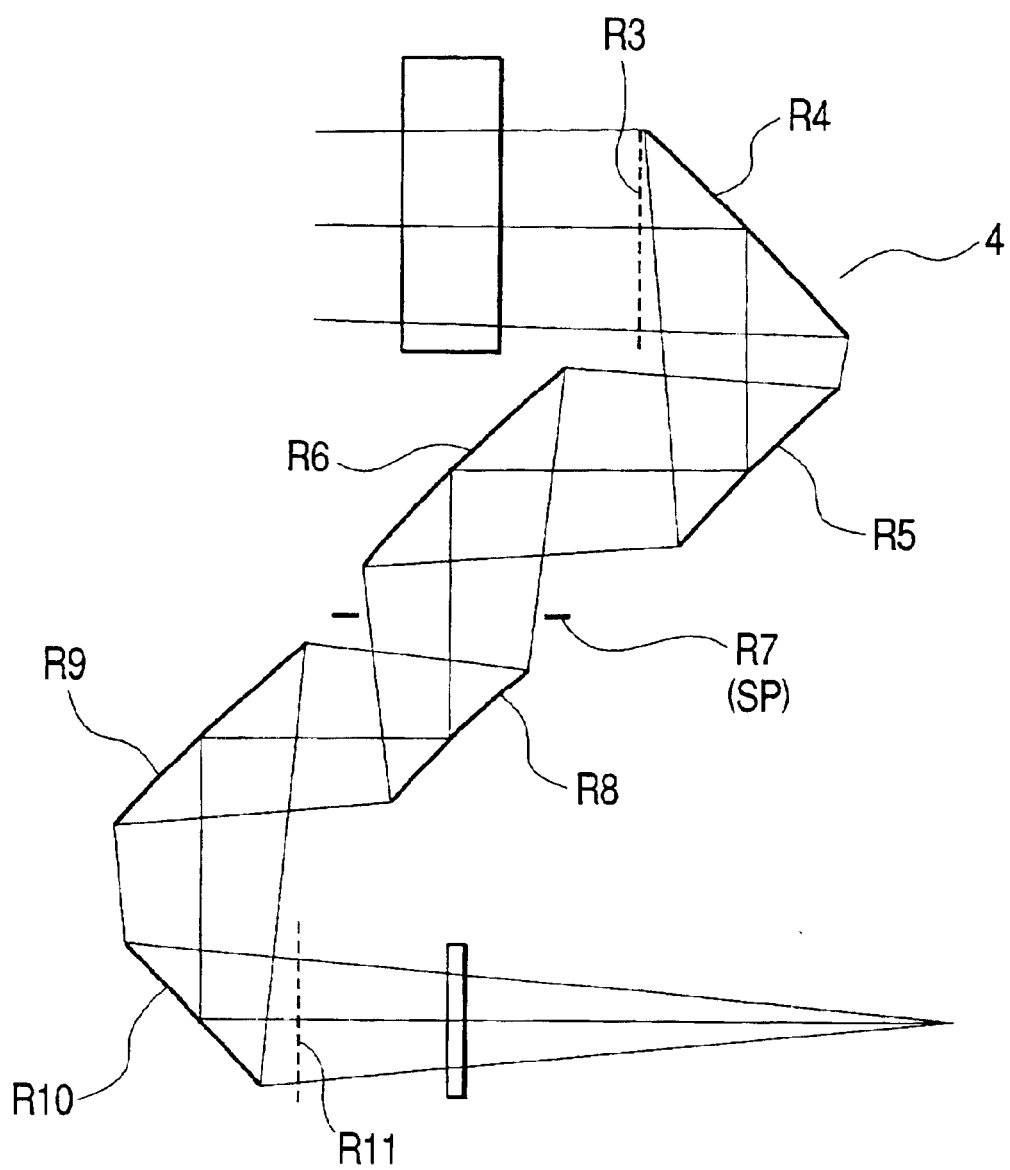
FIG. 34 is a cross-sectional view of the essential portions of Embodiment 17 of the image reading imaging optical system of the present invention.
Figure 35:
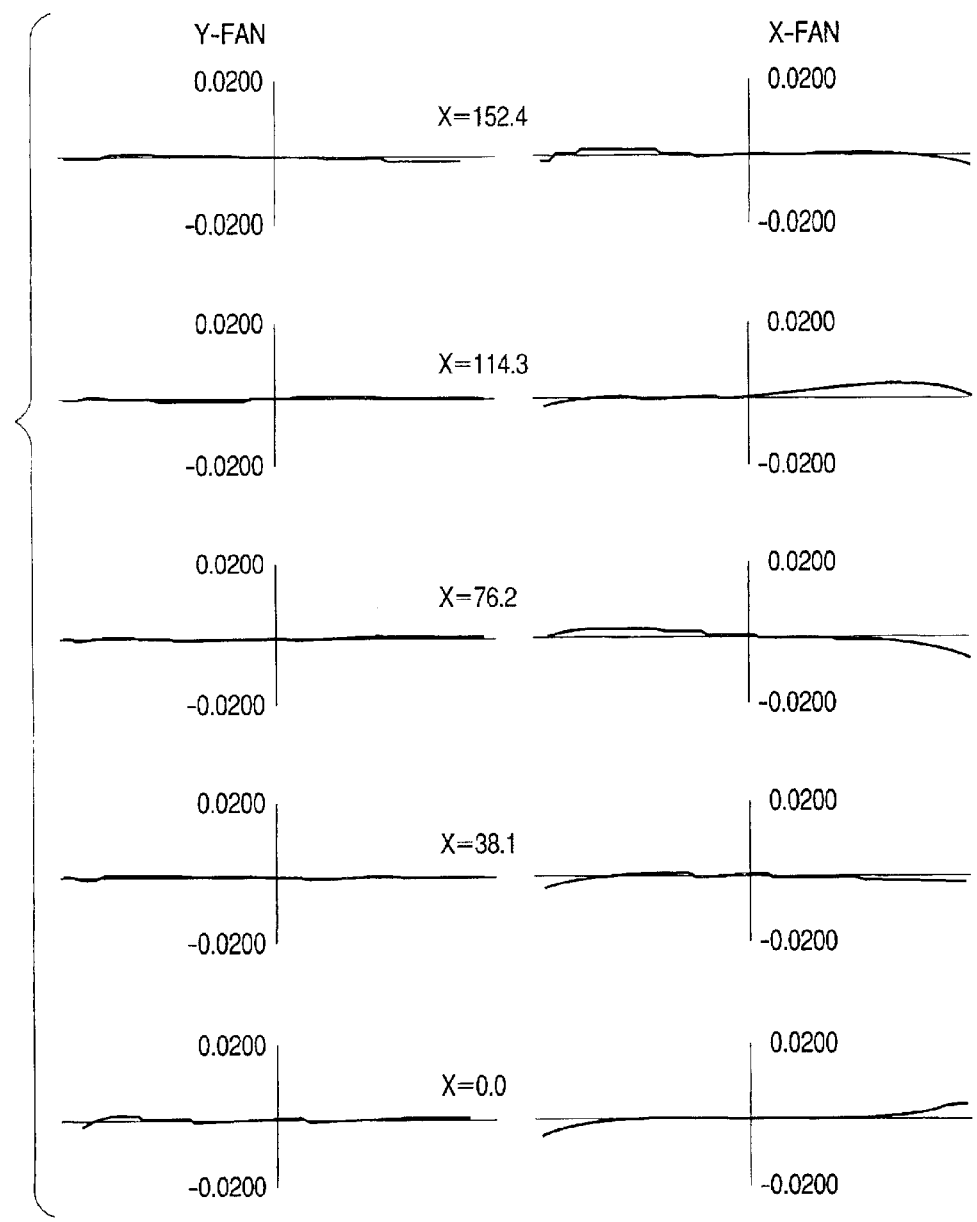
FIG. 35 shows the aberrations of Embodiment 17 of the image reading imaging optical system of the present invention.

FIG. 34 is a cross-sectional view of the essential portions of Embodiment 17 of the imaging optical element of the present invention.

Figure 36:
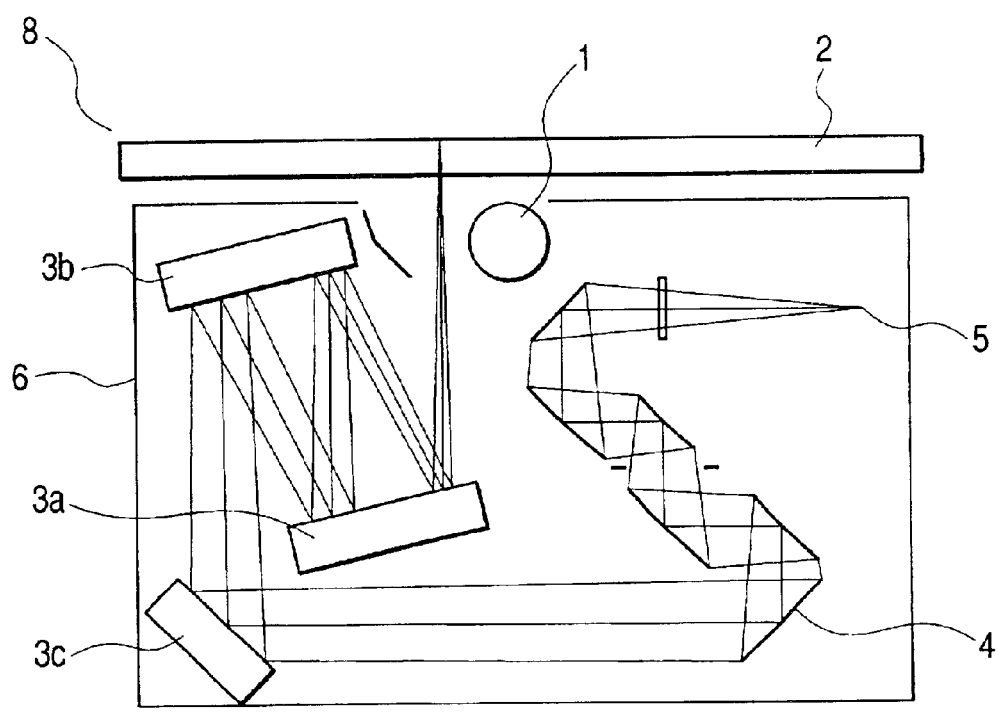
FIG. 36 is a schematic view of the essential portions of Embodiment 17 of the image reading apparatus of the present invention.

FIG. 36 shows an example in which the imaging optical element of Embodiment 17 is applied to an image reading apparatus.

In the imaging optical element 4 of Embodiment 17, the direction of the exit surface R11 relative to the incidence surface R3 for the reference axis ray is the same, and only off-axial reflecting surfaces having curvatures are comprised of six surfaces (R4 to R6, R8 to R10). The medium between adjacent reflecting surfaces is air, and basically the imaging optical element is of a hollow construction in which chromatic aberration does not occur. By an even number of times of reflection, the direction of the incident ray and the direction of the exit ray become substantially the same directions.

The imaging optical element 4 of FIG. 34 is of an arrangement in which, in succession from the original surface 8 side, the surface R4 is a plus deflecting surface, the surface R5 is a plus deflecting surface, the surface R6 is a minus deflecting surface, the surface R8 is a plus deflecting surface, the surface R9 is a minus deflecting surface, and the surface 10 is a minus deflecting surface.

The surface R10 most adjacent to the exit side is disposed more adjacent to the original side on the incidence reference axis than the surface R4 most adjacent to the incidence side. By this disposition, the optical path emerging from the element 4 and leading to the imaging position, i.e., the so-called back focus portion, can be disposed below and substantially in parallel to a portion in which the incident light comes to the surface R4, and it is possible to assume a spatially efficient disposition.

Further, basically it is preferable to adopt a construction in which an asymmetrical aberration is cancelled and therefore, the off-axial reflecting surfaces disposed before and behind the stop SP are of a construction in which the surface R6 is minus, whereas the surface R8 is plus, and the surface R5 is plus, whereas the surface R9 is minus, and the surface R4 is plus, whereas the surface R10 is minus, and when rotated by 18° about the stop, they become the same.

The beam travelling from the surface R4 toward the surface R5 is converged to thereby make the off-axial reflecting surfaces subsequent to the surface R4 small. Further, at least one of these off-axial reflecting surfaces is given the effect of cutting infrared light, whereby the black portion of a color image can be prevented from becoming reddish. As an example of the method of cutting infrared light, mention may be made of making an off-axial reflecting surface by evaporation-depositing or dipping dichroic film.

In FIG. 36, the reference numeral 2 designates an original supporting glass table, the reference characters 3a, 3b and 3c denote first, second and third reflecting mirrors, the reference numeral 4 designates the imaging optical element, and the reference numeral 5 denotes a line sensor comprised of a CCD or the like. An original 8 placed on the original supporting glass table 2 is imaged on the line sensor 5 by the imaging optical element 4, whereby one line of the original can be read. In order to construct the original reading apparatus compactly, the optical path is folded by the first, second and third reflecting mirrors 3a, 3b and 3c. As compared with the prior art, it is not necessary to dispose a lens in parallel to and below the mirrors and therefore, the imaging optical element can be made thin in the direction of depth (the direction vertical to the plane of the drawing sheet of FIG. 36). Further, the CCD or the like is disposed in the sub scanning direction and therefore, there is not the projection of a CCD substrate or the like in the direction of depth and the element can be made thin.

The imaging optical element of the present invention can be applied to optical apparatuses such as a color copier, a monochrome copier and an image scanner. Particularly it is best suited for a color digital copier of which bright F number and a high quality of image free of color misregister are required.

In the embodiments of the present invention, NA on the incidence side is made the same so that on the line sensor, the performance in a cross-sectional direction perpendicular to the line direction of the line sensor, i.e., the subscanning direction, and the performance in a direction parallel to the line direction, i.e., the main scanning direction, may be substantially the same. In order to realize this, in the stop, the aperture width in a cross section perpendicular to the line direction of the line sensor and the aperture width in a direction parallel to the line direction are set so as to differ from each other. This is because the off-axial reflecting surfaces basically differ in curvature in the azimuth direction from each other and therefore the way in which the ray passes through the imaging optical element becomes asymmetrical.

Since it is necessary to dispose the asymmetrical stop with its direction made coincident with the direction of the off-axial reflecting surfaces, it is preferable that the off-axial reflecting surfaces proximate to the stop and the stop be constructed integrally with each other.

The construction of the present invention is applicable to a color copier, a monochrome copier and an image scanner.

According to each of the above-described embodiment, in an image reading apparatus for reading color and monochromatic image information by a line sensor and an imaging optical system, the imaging optical system is constituted by an imaging optical element comprising a plurality of off-axial reflecting surfaces having curvatures, whereby there is realized an integral carriage type optical system which can effect highly definite image reading free of color misregister in the case of a color image and is of a compact construction.

Also, according to each of the above-described embodiments, in a color image reading apparatus for reading an original by a line sensor and an imaging optical system, a reading optical system constituted by an imaging optical element comprising a reflecting mirror for reflecting a reference axis ray a plurality of times and a plurality of off-axial reflecting surfaces having curvatures can realize an integral carriage type optical system by a simple construction. Further, the imaging optical element is comprised substantially of reflecting surfaces and therefore, the integral type optical system can realize highly definite image reading free of color misregister.

Also, according to each of the above-described embodiments, in a color and monochrome image reading apparatus for reading image information by a line sensor and an imaging optical system, the imaging optical system is constituted by an imaging optical element comprising a plurality of off-axial reflecting surfaces having curvatures and the reflecting surfaces and stop of the imaging optical element are appropriately constructed, whereby there can be realized an integral carriage type optical system of high performance which can effect highly definite image reading free of color misregister in the case of a color image.

In order to clarify the constructions and the meanings of the numerical values of the embodiments of the imaging optical element of the present invention, the off-axial optical system used herein and the reference axis which provides a skeleton thereof will be defined as follows.

Definition of the Reference Axis

Generally the optical path of a ray of a reference wavelength from an object surface to an image plane which provides a reference is defined as the reference axis in the optical system. This leaves ambiguity to the way of choosing a ray which provides a reference and therefore, usually the reference ray, i.e., the reference axis, is set by two fundamental rules shown below.

When an axis having, if partially, symmetry exists in an optical system, and aberrations can be arranged in order with good symmetry, a ray passing on the axis having symmetry is regarded as the reference ray.

When generally a symmetry axis does not exist in an optical system or a symmetry axis partially exists but aberrations can be arranged in order with good symmetry, among rays leaving the center of an object surface (the center of a range to be photographed or observed), a ray passing through the optical system in the order of the designated surfaces of the optical system, and passing through the center of a stop defined in the optical system is set as the reference ray.

It is usually the case that the reference axis defined in this manner assumes a bent shape.

Definition of the Off-axial Optical System

A curved surface of which the surface normal does not coincide with the reference axis at a point whereat the reference axis defined as described above is defined as an off-axial curved surface, and an optical system including the off-axial curved surface is defined as an off-axial optical system. (However, when the reference axis is simply bent by a planar reflecting surface, the surface normal again does not coincide with the reference axis, but yet the planar reflecting surface does not spoil the symmetry of aberration and therefore it is excluded from the subject of the off-axial optical system.)

While in the embodiments of the present invention, the reference axis which provides the reference of the optical axis has been set as described above, the way of determining the axis which provides the reference of the optical system can be selected by adopting an axis convenient in optical design, arranging aberrations in order or expressing the shape of each surface constituting the optical system.

Generally, however, the route of a ray passing through the center of an image plane or an observation plane, and one of the center of a stop or an entrance pupil or an exit pupil or the first surface of the optical system and the center of the last surface is set as the reference axis which provides the reference of the optical system.

That is, in the embodiments of the present invention, the route along which a ray passing through the central point of the line sensor 5 (imaging plane) to the center of the image plane (reference axis ray) is reflected by the reflecting surfaces is set as the reference axis. The order of the surfaces is set to the order in which the reference axis ray is subjected to reflection.

Accordingly, the reference axis finally arrives at the center of the image plane while having its direction changed along the order of the surfaces in accordance with the law of reflection.

Tilted surfaces constituting the optical system of each embodiment of the present invention are all basically tilted in the same plane. So, the axes of the absolute coordinate system are defined as follows. (See FIG. 31)

Figure 31:
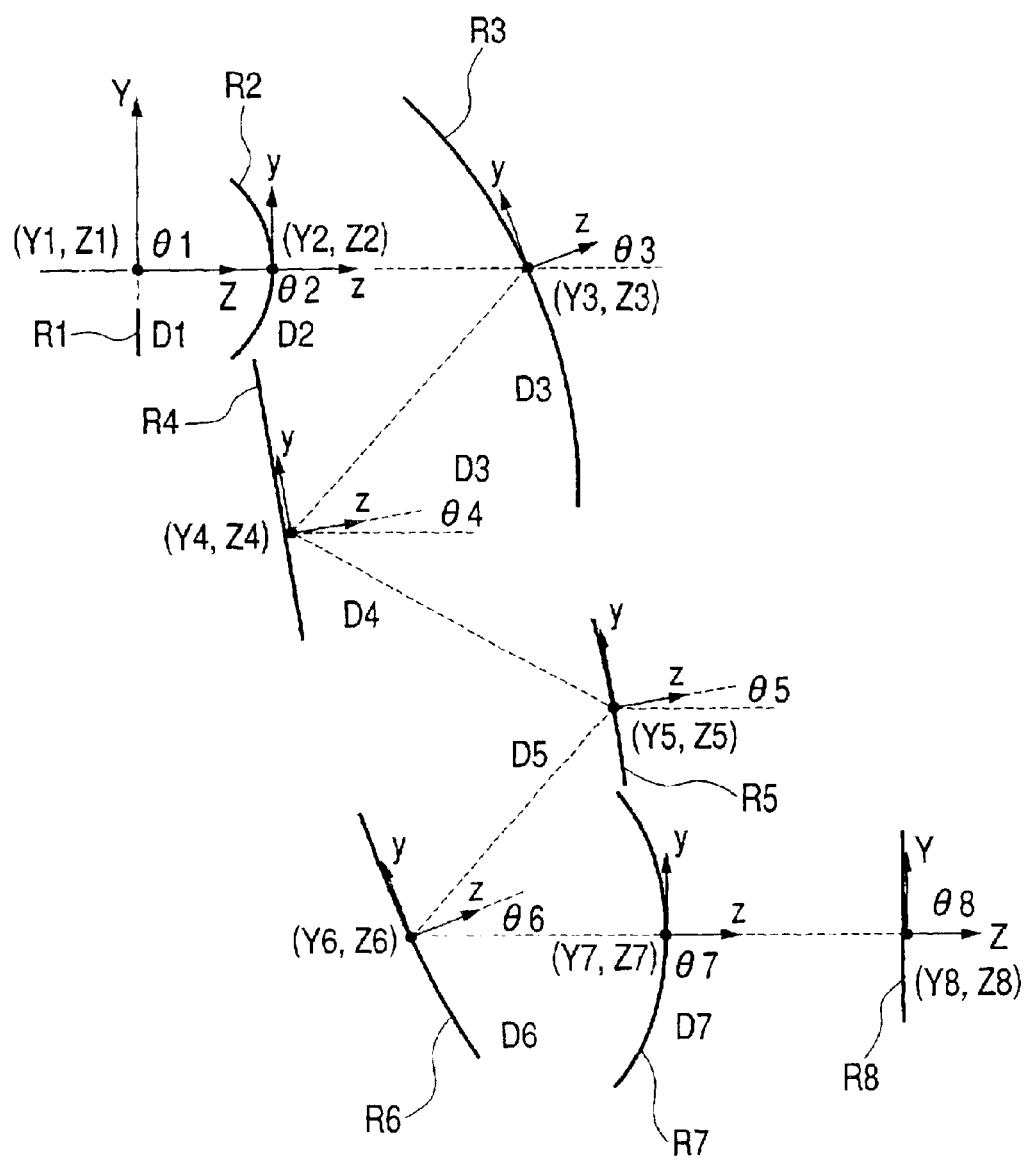
FIG. 31 illustrates the definition of the off-axial optical system of an imaging optical element according to the present invention.

Z-axis: reference axis passing through the origin and going toward the second surface Y-axis: straight line passing through the origin and counter-clockwisely forming an angle of 90° with respect to the Z-axis in the tilt plane (the plane of the drawing sheet of FIG. 31)

X-axis: straight line passing through the origin age and perpendicular to the Z- and Y-axis (straight line perpendicular to the plane of the drawing sheet of FIG. 31)

Also, to represent the surface shape of the ith surface constituting the optical system, it is easier to understand in recognizing the shape to set a local coordinate system in which a point at which the reference axis and the ith surface intersect with each other, and represent the surface shape of that surface by the local coordinate system than to represent the shape of that surface by the absolute coordinate system and therefore, in the embodiments indicating the construction data of the present invention, the surface shape of the ith surface is represented by the local coordinate system.

Also, the tilt angle of the ith surface in YZ plane is represented by an angle $\theta i$ (unit being °) in which a counter-clockwise direction relative to the Z-axis of the absolute coordinate system is positive. Consequently, in the embodiments of the present invention, the origin of the local coordinates of each surface is on YZ plane in FIG. 31.

Also, there is not decentering of the surface in XZ and XY planes. Further, the y- and z-axis of the local coordinates (x, y, z) of the ith surface are inclined by an angle $\theta i$ in YZ plane with respect to the absolute coordinate system (X, Y, Z), and specifically are set as follows.

z-axis: straight line passing through the origin of the local coordinates, and counter-clockwisely forming an angle $\theta i$ in YZ plane with respect to the Z direction of the absolute coordinate system y-axis: straight line passing through the origin of the local coordinates, and counter-clocksisely forming an angle of 90° in YZ plane with respect to z direction x-axis: straight line passing through the origin of the local coordinates, and perpendicular to YZ plane Also, the imaging optical element in each embodiment of the present invention has a rotation-asymmetrical aspherical surface and the shape thereof is indicated by the following expression:

$$z = C_{02}y^2 + C_{20}x^2 + C_{03}y^3 + C_{21}x^2y + C_{04}y^4 + C_{22}x^2y^2 + C_{40}x^4 + C_{05}y^5 + C_{23}x^2y^3 + C_{41}x^4y + C_{06}y^6 + C_{24}x^2y^4 + C_{42}x^4y^2 + C_{60}x^6$$

The spherical surface is of a shape represented by the following expression:

$$z = ((x^2+y^2)/r_i)/(1+(1-(x^2+y^2)/r_i)^{1/2}$$

The above-mentioned curved surface expression has only a term of an even number order regarding x and therefore, the curved surface prescribed by the above-mentioned curved surface expression is of a plane-symmetrical shape having yz plane as a symmetrical plane. Further, when the following conditions are satisfied, it represents a shape symmetrical with respect to xz plane.

$$C_{03} = C_{21} = 0$$

$$C_{02} = C_{20}C_{04} = C_{40} = C_{22}/2$$

$$C_{05} = C_{23} = C_{41} = 0$$

$$C_{60} = C_{06} = C_{24}/3 = C_{42}/3$$

When the above-mentioned conditions are satisfied, it represents a rotation-symmetrical shape. When the above-mentioned conditions are not satisfied, it represents a rotation-asymmetrical shape.

Also, all of the embodiments of the optical system are not coaxial optical systems and therefore, it is difficult to directly calculate a focal length based on a paraxial theory. So, use is made of a converted focal length $f_{eq}$ by the following definition:

$$f_{eq} = h_1/\tan(a_k')$$

In definition, when the number of the reflecting surfaces is an odd number, the sign of the focal length is expressed as being opposite to the ordinary sign.

Here, $h_1$: the incidence height of a ray parallel to the reference axis on the first surface and incident infinitely near the reference axis, $a_k'$: an angle the ray forms with respect to the reference axis when it emerges from the last surface.

Next, in numerical value embodiments, it is to be understood that the sign of the radius of curvature Ri is minus when the center of curvature is on the first surface R1 side along the reference axis indicated by dot-and-dash line travelling from the first surface R1 to the imaging plane, and is plus when the center of curvature is on the imaging plane side.

Also, Di is a scalar amount representing the interval between the origins of the local coordinates between the ith surface and the (i+1)th surface, and $N_{di}$ and $v_{di}$ are the refractive index and Abbe number, respectively, of the medium between the ith surface and the (i+1)th surface.

The effective dimension (X*Y) is the effective dimension in the X-axis direction and the Y-axis direction of the local coordinates of each surface.

Numerical value data will be shown below regarding Embodiments 1 to 3 and 9 to 17 of the present invention described above.

Numerical Embodiment 1

Read Width of Original: 222, Imaging Magnification: −0.1653, NA at Original Side: 0.0187, $f_{eq}$: −34

| i | Yi | Zi | θi | Di | $N_{di}$ | $v_{di}$ | Effective Size (X * Y) | |
|---|---|---|---|---|---|---|---|---|
| 1 | 0.00 | −220.44 | 0.0 | 220.44 | 1.00000 | | | Object Surface (Original Surface) |
| 2 | 0.00 | 0.00 | 0.0 | 4.80 | 1.49171 | 57.4 | 23.1 * 9.4 | Refracting Surface |
| 3 | 0.00 | 4.80 | 45.0 | 9.00 | 1.49171 | 57.4 | 20.7 * 13.0 | Reflecting Surface |
| 4 | −9.00 | 4.80 | 45.0 | 9.60 | 1.49171 | 57.4 | 14.8 * 12.8 | Reflecting Surface |
| 5 | −9.00 | −4.80 | −45.0 | 10.40 | 1.49171 | 57.4 | 10.0 * 13.9 | Reflecting Surface (Stop) |
| 6 | −19.40 | −4.80 | −45.0 | 8.40 | 1.49171 | 57.4 | 15.0 * 12.5 | Reflecting Surface |
| 7 | −19.40 | 3.60 | 45.0 | 4.00 | 1.49171 | 57.4 | 18.3 * 11.3 | Reflecting Surface |
| 8 | −23.40 | 3.60 | 0.0 | 27.42 | 1.49171 | 57.4 | 19.3 * 7.3 | Refracting Surface |
| 9 | −50.82 | 3.60 | | | 1.00000 | | | Image Plane (Sensor Surface) |

Aspherical Shape

R2 Surface

| | | |
|---|---|---|
| $C_{02}$ = −2.9789e−3 | $C_{03}$ = 1.0562e−4 | $C_{04}$ = 1.7462e−4 |
| $C_{05}$ = −2.3567e−5 | $C_{06}$ = −8.7694e−6 | $C_{20}$ = −2.6345e−3 |

-continued

| | | |
|---|---|---|
| $C_{21} = -1.9654e-4$ | $C_{22} = 2.0985e-5$ | $C_{23} = -3.2325e-6$ |
| $C_{24} = -1.5225e-6$ | $C_{40} = -1.3607e-5$ | $C_{41} = 7.6570e-7$ |
| $C_{42} = 9.9798e-8$ | $C_{60} = 3.1988e-8$ | |

R3 Surface

| | | |
|---|---|---|
| $C_{02} = -2.1480e-3$ | $C_{03} = 2.4400e-4$ | $C_{04} = 2.6765e-6$ |
| $C_{05} = -5.6807e-7$ | $C_{06} = -3.1410e-7$ | $C_{20} = -1.9036e-3$ |
| $C_{21} = 9.0398e-5$ | $C_{22} = 3.8180e-6$ | $C_{23} = -1.6067e-6$ |
| $C_{24} = -1.2060e-9$ | $C_{40} = -5.5316e-7$ | $C_{41} = 1.4369e-7$ |
| $C_{42} = -3.0686e-9$ | $C_{60} = 5.2469e-9$ | |

R4 Surface

| | | |
|---|---|---|
| $C_{02} = -6.3716e-3$ | $C_{03} = 2.3535e-4$ | $C_{04} = -2.2599e-6$ |
| $C_{05} = 1.8392e-6$ | $C_{06} = 1.0760e-8$ | $C_{20} = -4.4929e-3$ |
| $C_{21} = 3.8336e-4$ | $C_{22} = 2.5288e-5$ | $C_{23} = -2.67715e-6$ |
| $C_{24} = -2.2107e-7$ | $C_{40} = -1.6080e-6$ | $C_{41} = 1.4510e-7$ |
| $C_{42} = 2.6110e-8$ | $C_{60} = -2.4164e-8$ | |

R5 Surface

| | | |
|---|---|---|
| $C_{02} = -7.4735e-3$ | $C_{03} = -7.3808e-5$ | $C_{04} = -1.4600e-6$ |
| $C_{05} = -2.2939e-7$ | $C_{06} = -5.2718e-8$ | $C_{20} = -8.7526e-3$ |
| $C_{21} = -1.6764e-5$ | $C_{22} = 9.5058e-6$ | $C_{23} = -1.2307e-7$ |
| $C_{24} = -8.0893e-8$ | $C_{40} = 4.0064e-7$ | $C_{41} = 6.8219e-7$ |
| $C_{42} = 5.3009e-8$ | $C_{60} = -1.1033e-8$ | |

R6 Surface

| | | |
|---|---|---|
| $C_{02} = -2.2655e-3$ | $C_{03} = 2.5665e-4$ | $C_{04} = -3.0938e-5$ |
| $C_{05} = -1.4458e-6$ | $C_{06} = -8.3242e-9$ | $C_{20} = -1.0043e-3$ |
| $C_{21} = -3.6644e-4$ | $C_{22} = 1.7245e-5$ | $C_{23} = 3.2807e-7$ |
| $C_{24} = -1.0209e-7$ | $C_{40} = 4.1304e-6$ | $C_{41} = 1.0709e-6$ |
| $C_{42} = 4.0904e-8$ | $C_{60} = 5.1888e-9$ | |

R7 Surface

| | | |
|---|---|---|
| $C_{02} = -3.3233e-3$ | $C_{03} = 5.0613e-4$ | $C_{04} = -1.1412e-5$ |
| $C_{05} = -2.4643e-6$ | $C_{06} = 1.5095e-7$ | $C_{20} = -5.5907e-3$ |
| $C_{21} = -1.3299e-4$ | $C_{22} = 1.5152e-5$ | $C_{23} = 1.4412e-6$ |
| $C_{24} = 3.3475e-7$ | $C_{40} = 4.0220e-6$ | $C_{41} = -4.1994e-7$ |
| $C_{42} = -7.3342e-8$ | $C_{60} = 2.8181e-8$ | |

R8 Surface

| | | |
|---|---|---|
| $C_{02} = -2.0078e-2$ | $C_{03} = 8.18062e-4$ | $C_{04} = 1.7886e-4$ |
| $C_{05} = 2.7529e-5$ | $C_{06} = 6.2066e-6$ | $C_{20} = -1.6884e-2$ |
| $C_{21} = -3.8863e-4$ | $C_{22} = -3.5054e-5$ | $C_{23} = -5.5015e-6$ |
| $C_{22} = 5.5839e-6$ | $C_{40} = -2.2877e-5$ | $C_{41} = -4.7857e-6$ |
| $C_{42} = -3.1740e-7$ | $C_{60} = 1.1182e-7$ | |

Numerical Embodiment 2
Read Width of original: 222, Imaging Magnification: −0.1653, NA at original Side: 0.0187, $f_{eq}$: 41.6

| i | Yi | Zi | θi | Di | $N_{di}$ | Effective Size (X * Y) | |
|---|---|---|---|---|---|---|---|
| 1 | 0.00 | −238.56 | 0.0 | 238.56 | 1. | | Object Surface (Original Surface) |
| 2 | 0.00 | 0.00 | 0.0 | 6.80 | 1. | 37.6 * 16.8 | Transmitting Surface |
| 3 | 0.00 | 6.80 | 45.0 | 9.50 | 1. | 35.6 * 16.8 | Reflecting Surface |
| 4 | −9.50 | 6.80 | −45.0 | 8.00 | 1. | 18.6 * 12.5 | Reflecting Surface |
| 5 | −9.50 | 14.80 | −45.0 | 8.00 | 1. | 8.1 * 9.0 | Reflecting Surface (Stop) |
| 6 | −1.50 | 14.80 | 45.0 | 7.20 | 1. | 15.9 * 9.4 | Reflecting Surface |
| 7 | −1.50 | 22.00 | 45.0 | 7.20 | 1. | 23.4 * 9.7 | Reflecting Surface |
| 8 | −8.70 | 22.00 | −45.0 | 5.00 | 1. | 24.9 * 8.7 | Reflecting Surface |
| 9 | −8.70 | 27.00 | 0.0 | 16.44 | 1. | 28.1 * 5.1 | Transmitting Surface |
| 10 | −8.70 | 43.44 | | | 1. | | Image Plane (Sensor Surface) |

Aspherical Shape

R3 Surface

| | | |
|---|---|---|
| $C_{02} = -5.7442e-3$ | $C_{03} = 2.4771e-4$ | $C_{04} = -6.6994e-7$ |
| $C_{05} = 2.3519e-7$ | $C_{06} = 9.1306e-9$ | $C_{20} = -8.0122e-3$ |
| $C_{21} = 1.4778e-4$ | $C_{22} = -5.9973e-6$ | $C_{23} = 1.6237e-7$ |

-continued

| | | |
|---|---|---|
| $C_{24} = -1.9675e{-}8$ | $C_{40} = 2.6142e{-}8$ | $C_{41} = 4.7468e{-}10$ |
| $C_{42} = 9.6616e{-}11$ | $C_{60} = -8.8382e{-}10$ | |

R4 Surface

| | | |
|---|---|---|
| $C_{02} = -7.3438e{-}3$ | $C_{03} = 8.3463e{-}4$ | $C_{04} = -1.0717e{-}5$ |
| $C_{05} = 3.9674e{-}7$ | $C_{06} = -6.0573e{-}8$ | $C_{20} = -9.9018e{-}3$ |
| $C_{21} = 8.4968e{-}5$ | $C_{22} = -4.6718e{-}7$ | $C_{23} = -2.5933e{-}6$ |
| $C_{24} = 1.9199e{-}7$ | $C_{40} = -6.7688e{-}6$ | $C_{41} = 4.8523e{-}7$ |
| $C_{42} = -4.6662e{-}8$ | $C_{60} = -2.7055e{-}8$ | |

R5 Surface

| | | |
|---|---|---|
| $C_{02} = -4.2699e{-}3$ | $C_{03} = -3.8900e{-}4$ | $C_{04} = 4.4021e{-}5$ |
| $C_{05} = -9.6222e{-}8$ | $C_{06} = 3.8576e{-}7$ | $C_{20} = -3.9951e{-}3$ |
| $C_{21} = -5.2587e{-}4$ | $C_{22} = 4.5333e{-}5$ | $C_{23} = -4.1085e{-}6$ |
| $C_{24} = 3.4840e{-}7$ | $C_{40} = -1.1388e{-}5$ | $C_{41} = 3.9818e{-}7$ |
| $C_{42} = 6.8919e{-}9$ | $C_{60} = -1.5466e{-}9$ | |

R6 Surface

| | | |
|---|---|---|
| $C_{02} = -6.8815e{-}3$ | $C_{03} = -1.7608e{-}3$ | $C_{04} = -9.0668e{-}5$ |
| $C_{05} = -1.8681e{-}6$ | $C_{06} = 1.7803e{-}7$ | $C_{20} = 1.2113e{-}3$ |
| $C_{21} = -8.6697e{-}4$ | $C_{22} = -6.8378e{-}5$ | $C_{23} = -3.3468e{-}6$ |
| $C_{24} = -1.5663e{-}7$ | $C_{40} = -1.0460e{-}5$ | $C_{41} = -1.8794e{-}6$ |
| $C_{42} = -1.3160e{-}7$ | $C_{60} = -3.5402e{-}8$ | |

R7 Surface

| | | |
|---|---|---|
| $C_{02} = -7.3105e{-}3$ | $C_{03} = -2.4918e{-}4$ | $C_{04} = -3.9441e{-}6$ |
| $C_{05} = 1.3150e{-}6$ | $C_{06} = -6.6461e{-}8$ | $C_{20} = -1.1248e{-}2$ |
| $C_{21} = -9.1503e{-}5$ | $C_{22} = -1.5167e{-}5$ | $C_{23} = 9.0871e{-}8$ |
| $C_{24} = 1.9344e{-}7$ | $C_{40} = 2.2341e{-}6$ | $C_{41} = -1.0184e{-}7$ |
| $C_{42} = -4.0580e{-}8$ | $C_{60} = 6.0658e{-}9$ | |

R8 Surface

| | | |
|---|---|---|
| $C_{02} = 1.5693e{-}3$ | $C_{03} = 4.7237e{-}4$ | $C_{04} = 3.4671e{-}5$ |
| $C_{05} = 4.9653e{-}6$ | $C_{06} = -7.4511e{-}7$ | $C_{20} = -5.1051e{-}3$ |
| $C_{21} = 5.9517e{-}5$ | $C_{22} = -1.8425e{-}5$ | $C_{23} = -1.0409e{-}6$ |
| $C_{24} = 1.3118e{-}7$ | $C_{40} = 5.1683e{-}7$ | $C_{41} = -9.0297e{-}8$ |
| $C_{42} = 1.5252e{-}8$ | $C_{60} = 9.5374e{-}9$ | |

Numerical Embodiment 3
Width of Original: 222, Imaging Magnification: −0.1653,
NA at original Side: 0.0187, $f_{eq}$: 36.7

| i | Yi | Zi | θ1 | Di | $N_{di}$ | Effective Size (X * Y) | |
|---|---|---|---|---|---|---|---|
| 1 | 0.00 | −211.00 | 0.0 | 211.00 | 1. | | Object Surface (Original Surface) |
| 2 | 0.00 | 0.00 | 0.0 | 5.00 | 1. | 33.6 * 9.2 | Transmitting Surface |
| 3 | 0.00 | 5.00 | 45.0 | 10.30 | 1. | 29.5 * 12.8 | Reflecting Surface |
| 4 | −10.30 | 5.00 | 45.0 | 11.30 | 1. | 18.3 * 12.0 | Reflecting Surface |
| 5 | −10.30 | −6.30 | −45.0 | 11.50 | 1. | 9.6 * 13.8 | Reflecting Surface (Stop) |
| 6 | −21.80 | −6.30 | −45.0 | 12.50 | 1. | 19.4 * 14.2 | Reflecting Surface |
| 7 | −21.80 | 6.20 | 45.0 | 10.00 | 1. | 27.8 * 13.9 | Reflecting Surface |
| 8 | −31.80 | 6.20 | 45.0 | 6.00 | 1. | 31.9 * 9.6 | Reflecting Surface |
| 9 | −31.80 | 0.20 | 0.0 | 19.00 | 1. | 32.4 * 5.6 | Transmitting Surface |
| 10 | −31.80 | −18.80 | | | 1. | | Image Plane (Sensor Surface) |

Aspherical Shape

R3 Surface

| | | |
|---|---|---|
| $C_{02} = -2.4010e{-}3$ | $C_{03} = 1.1320e{-}4$ | $C_{04} = -8.3702e{-}7$ |
| $C_{05} = 8.2198e{-}7$ | $C_{06} = -4.7624e{-}8$ | $C_{20} = -9.0931e{-}4$ |
| $C_{21} = 1.0622e{-}4$ | $C_{22} = -9.0082e{-}6$ | $C_{23} = 2.8992e{-}7$ |
| $C_{24} = -1.5224e{-}8$ | $C_{40} = -4.8672e{-}7$ | $C_{41} = -3.9414e{-}8$ |
| $C_{42} = 3.9786e{-}9$ | $C_{60} = -1.9739e{-}10$ | |

R4 Surface

| | | |
|---|---|---|
| $C_{02} = -5.7894e{-}3$ | $C_{03} = 8.0244e{-}4$ | $C_{04} = -1.2590e{-}5$ |
| $C_{05} = -2.3273e{-}6$ | $C_{06} = -1.2782e{-}7$ | $C_{20} = -4.0612e{-}3$ |
| $C_{21} = 3.8984e{-}4$ | $C_{22} = -1.2270e{-}5$ | $C_{23} = -1.3566e{-}6$ |
| $C_{24} = -1.5134e{-}7$ | $C_{40} = -4.6238e{-}6$ | $C_{41} = -1.5878e{-}7$ |

-continued

| | | |
|---|---|---|
| $C_{42} = 6.4425e-9$ | $C_{60} = 2.8316e-9$ | |
| R5 Surface | | |
| $C_{02} = -4.7063e-3$ | $C_{03} = 4.8880e-5$ | $C_{04} = -4.9287e-6$ |
| $C_{05} = 2.5216e-7$ | $C_{06} = -7.4539e-9$ | $C_{20} = -7.3560e-3$ |
| $C_{21} = 1.4807e-4$ | $C_{22} = 1.1067e-5$ | $C_{23} = -3.0590e-7$ |
| $C_{24} = -4.7628e-8$ | $C_{40} = 1.3587e-6$ | $C_{41} = 1.7458e-7$ |
| $C_{42} = 1.4999e-8$ | $C_{60} = 5.5182e-10$ | |
| R6 Surface | | |
| $C_{02} = -2.1158e-3$ | $C_{03} = -1.4437e-4$ | $C_{04} = 2.7604e-6$ |
| $C_{05} = -1.1028e-7$ | $C_{06} = -3.4801e-8$ | $C_{20} = -4.4008e-4$ |
| $C_{21} = -2.9915e-5$ | $C_{22} = 1.0467e-5$ | $C_{23} = 2.3590e-7$ |
| $C_{24} = 1.6139e-9$ | $C_{40} = 5.7331e-6$ | $C_{41} = 4.2237e-7$ |
| $C_{42} = 1.0250e-8$ | $C_{60} = 1.7197e-9$ | |
| R7 Surface | | |
| $C_{02} = -6.5251e-3$ | $C_{03} = 3.3432e-5$ | $C_{04} = -5.3544e-6$ |
| $C_{05} = 3.5433e-7$ | $C_{06} = -1.6452e-8$ | $C_{20} = 5.4648e-3$ |
| $C_{21} = 2.6306e-5$ | $C_{22} = -2.5859e-6$ | $C_{23} = -1.5205e-7$ |
| $C_{24} = 4.4744e-8$ | $C_{40} = 2.0926e-6$ | $C_{41} = 4.8040e-8$ |
| $C_{42} = -7.4440e-9$ | $C_{60} = 3.5214e-9$ | |
| R8 Surface | | |
| $C_{02} = -2.1803e-3$ | $C_{03} = 1.2655e-4$ | $C_{04} = -2.9430e-5$ |
| $C_{05} = -1.0966e-6$ | $C_{06} = 6.5709e-8$ | $C_{20} = 2.0507e-3$ |
| $C_{21} = 8.0305e-5$ | $C_{22} = -1.2759e-5$ | $C_{23} = 6.0378e-7$ |
| $C_{24} = 1.3627e-7$ | $C_{40} = -2.0631e-6$ | $C_{41} = 8.3233e-8$ |
| $C_{42} = -2.1609e-8$ | $C_{60} = -1.7335e-10$ | |

Numerical Embodiment 9
Read Width of Original: 222, Imaging Magnification: $-0.1649$, NA at Original Side: 0.0187, $f_{eq}$: $-38.8$

| i | Yi | Zi | θi | Di | $N_{di}$ | Effective Size (X * Y) | |
|---|---|---|---|---|---|---|---|
| 1 | 0.00 | -217.50 | 0.0 | 227.50 | 1. | | Object Surface (Original Surface) |
| 2 | 0.00 | 0.00 | 0.0 | 5.00 | 1. | 30.3 * 8.9 | Transmitting Surface |
| 3 | 0.00 | 5.00 | 45.0 | 9.50 | 1. | 27.9 * 13.5 | Reflecting Surface |
| 4 | -9.50 | 5.00 | -45.0 | 5.00 | 1. | 13.4 * 11.9 | Reflecting Surface |
| 5 | -9.50 | 10.00 | 0.0 | 6.00 | 1. | 8.2 * 9.0 | Transmitting Surface (Stop) |
| 6 | -9.50 | 16.00 | 45.0 | 10.50 | 1. | 15.6 * 14.1 | Reflecting Surface |
| 7 | -20.00 | 16.00 | -45.0 | 10.00 | 1. | 22.9 * 12.2 | Reflecting Surface |
| 8 | -20.00 | 26.00 | -45.0 | 5.00 | 1. | 28.5 * 12.6 | Reflecting Surface |
| 9 | -15.00 | 26.00 | 0.0 | 25.00 | 1. | 29.6 * 7.6 | Transmitting Surface |
| 10 | 10.00 | 26.00 | | | 1. | | Image Plane (Sensor Surface) |

Aspherical Shape

R3 Surface

| | | |
|---|---|---|
| $C_{02} = -2.3768e-3$ | $C_{03} = 5.1145e-5$ | $C_{04} = -1.8547e-6$ |
| $C_{20} = -7.0111e-3$ | $C_{21} = 1.8558e-4$ | $C_{22} = 1.3075e-6$ |
| $C_{40} = -5.7256e-7$ | | |

R4 Surface

| | | |
|---|---|---|
| $C_{02} = -3.0863e-3$ | $C_{03} = 1.2705e-4$ | $C_{04} = -7.8544e-6$ |
| $C_{20} = -1.2171e-2$ | $C_{21} = 2.0905e-5$ | $C_{22} = 2.5253e-6$ |
| $C_{40} = -9.7513e-6$ | | |

R6 Surface

| | | |
|---|---|---|
| $C_{02} = -4.3326e-3$ | $C_{03} = 3.8979e-5$ | $C_{04} = -2.1266e-6$ |
| $C_{20} = -7.6579e-3$ | $C_{21} = -2.6482e-4$ | $C_{22} = 1.1806e-5$ |
| $C_{40} = -5.1469e-6$ | | |

R7 Surface

| | | |
|---|---|---|
| $C_{02} = -3.2687e-3$ | $C_{03} = 3.3262e-5$ | $C_{04} = 4.5318e-6$ |
| $C_{20} = 2.7881e-3$ | $C_{21} = -1.8228e-5$ | $C_{22} = 9.3375e-6$ |
| $C_{40} = -1.2044e-6$ | | |

-continued

R8 Surface $C_{02} = -5.3385e-3$     $C_{03} = -1.2928e-5$     $C_{04} = 3.4083e-6$
$C_{20} = -4.8503e-3$     $C_{21} = 4.9994e-5$      $C_{22} = -5.3966e-6$
$C_{40} = 1.8097e-6$ Numerical Embodiment 10
Read Width of Original: 222, Imaging Magnification: −0.1647, NA at Original Side: 0.0187, $f_{eq}$−37.9

| i | Yi | Zi | θi | Di | $N_{di}$ | Effective Size (X * Y) | |
|---|------|--------|------|--------|----|-----------|---------------------------|
| 1 | 0.00 | −233.54 | 0.0 | 233.54 | 1. | | Object Surface (Original Surface) |
| 2 | 0.00 | 0.00 | 0.0 | 5.00 | 1. | 26.8 * 9.4 | Transmitting Surface |
| 3 | 0.00 | 5.00 | −45.0 | 10.50 | 1. | 22.3 * 13.4 | Reflecting Surface |
| 4 | 10.50 | 5.00 | 45.0 | 5.00 | 1. | 15.2 * 11.1 | Reflecting Surface |
| 5 | 10.50 | 10.00 | 0.0 | 5.00 | 1. | 9.7 * 8.3 | Transmitting Surface (Stop) |
| 6 | 10.50 | 15.00 | 45.0 | 9.00 | 1. | 12.7 * 12.1 | Reflecting Surface |
| 7 | 1.50 | 15.00 | −45.0 | 7.50 | 1. | 17.6 * 9.0 | Reflecting Surface |
| 8 | 1.50 | 22.50 | 45.0 | 5.00 | 1. | 24.5 * 8.1 | Reflecting Surface |
| 9 | −3.50 | 22.50 | 0.0 | 16.17 | 1. | 27.1 * 4.5 | Transmitting Surface |
| 10 | −19.67 | 22.50 | | | 1. | | Image Plane (Sensor Surface) |

Aspherical Shape

R3 Surface $C_{02} = -3.9970e-3$     $C_{03} = -5.1427e-5$     $C_{04} = -1.0984e-6$
$C_{20} = -3.0789e-5$     $C_{21} = -2.2585e-4$     $C_{22} = 1.6637e-6$
$C_{40} = 4.8584e-6$
R4 Surface $C_{02} = -5.4782e-3$     $C_{03} = -7.4478e-5$     $C_{04} = 9.7319e-6$
$C_{20} = 5.1369e-3$      $C_{21} = -3.6238e-4$     $C_{22} = -8.6823e-6$
$C_{40} = 6.2243e-7$
R6 Surface $C_{02} = -6.2734e-3$     $C_{03} = 3.8880e-5$      $C_{04} = 6.4718e-6$
$C_{20} = -6.5071e-3$     $C_{21} = 1.6088e-4$      $C_{22} = -5.8896e-6$
$C_{40} = -3.2072e-6$
R7 Surface $C_{02} = -2.3922e-3$     $C_{03} = -3.2812e-4$     $C_{04} = 7.5676e-8$
$C_{20} = -4.8178e-3$     $C_{21} = 3.7897e-4$      $C_{22} = -1.4111e-5$
$C_{40} = -9.2105e-6$
R8 Surface $C_{02} = -3.2644e-3$     $C_{03} = -5.1667e-4$     $C_{04} = 1.8927e-5$
$C_{20} = -4.2423e-3$     $C_{21} = -1.0882e-5$     $C_{22} = -2.0946e-5$
$C_{40} = 7.1399e-7$ Numerical Embodiment 11
Read Width of Original: 222, Imaging Magnification: −0.1749, NA at Original Side: 0.0187, $f_{eq}$: 38.4

| i | Yi | Zi | θi | Di | $N_{di}$ | Effective size (X * Y) | |
|---|------|--------|------|--------|----|-----------|---------------------------|
| 1 | 0.00 | −212.23 | 0.0 | 212.23 | 1. | | Object Surface (Original Surface) |
| 2 | 0.00 | 0.00 | 0.0 | 5.00 | 1. | 34.4 * 8.9 | Transmitting Surface |
| 3 | 0.00 | 5.00 | 45.0 | 9.50 | 1. | 31.1 * 13.0 | Reflecting Surface |
| 4 | −9.50 | 5.00 | 45.0 | 9.00 | 1. | 18.9 * 11.0 | Reflecting Surface |
| 5 | −9.50 | −4.00 | −45.0 | 5.00 | 1. | 14.3 * 11.5 | Reflecting Surface |
| 6 | −14.50 | −4.00 | 0.0 | 5.00 | 1. | 9.3 * 7.3 | Transmitting Surface (Stop) |
| 7 | −19.50 | −4.00 | 45.0 | 9.00 | 1. | 12.3 * 9.5 | Reflecting Surface |
| 8 | −19.50 | −13.00 | 45.0 | 7.50 | 1. | 20.2 * 10.0 | Reflecting Surface |

-continued

| | | | | | | |
|---|---|---|---|---|---|---|
| 9 | −12.00 | −13.00 | −45.0 | 5.00 | 1. | 23.0 * 7.3 Reflecting Surface |
| 10 | −12.00 | −18.00 | 0.0 | 17.77 | 1. | 26.2 * 4.0 Transmitting Surface |
| 11 | 12.00 | −35.77 | | | 1. | Image Plane (Sensor Surface) |

Aspherical Shape

R3 Surface $C_{02} = -3.5436e-3$  $C_{03} = 7.0417e-5$  $C_{04} = -2.8147e-6$
$C_{20} = -1.4891e-3$  $C_{21} = 4.0236e-5$  $C_{22} = 5.2032e-8$
$C_{40} = 2.7294e-8$ R4 Surface $C_{02} = -4.8426e-3$  $C_{03} = 1.2702e-4$  $C_{04} = -5.7706e-6$
$C_{20} = -5.4450e-3$  $C_{21} = 2.5363e-4$  $C_{22} = -2.9344e-6$
$C_{40} = -9.2465e-6$ R5 Surface $C_{02} = -4.1294e-3$  $C_{03} = 1.9232e-4$  $C_{04} = -2.0532e-6$
$C_{20} = -1.0196e-2$  $C_{21} = 1.9100e-4$  $C_{22} = 4.1731e-6$
$C_{40} = 5.8741e-6$ R7 Surface $C_{02} = -3.4497e-3$  $C_{03} = 3.3613e-4$  $C_{04} = 2.3493e-6$
$C_{20} = -1.1953e-3$  $C_{21} = 6.2801e-5$  $C_{22} = 1.2506e-5$
$C_{40} = -1.5388e-6$ R8 Surface $C_{02} = -6.5017e-3$  $C_{03} = 3.1224e-4$  $C_{04} = 7.3823e-6$
$C_{20} = -6.3660e-3$  $C_{21} = 1.0528e-4$  $C_{22} = -7.8242e-6$
$C_{40} = -1.5287e-6$ R9 Surface $C_{02} = -5.0330e-4$  $C_{03} = 3.8280e-4$  $C_{04} = -1.2474e-5$
$C_{20} = -7.9714e-4$  $C_{21} = 1.2684e-4$  $C_{22} = -2.8871e-5$
$C_{40} = -5.9100e-6$ Numerical Embodiment 12
Read Width of Original: 222, Imaging Magnification: −0.1653, NA at Original Side: 0.0187, $f_{eq}$: −38.0

| i | Yi | Zi | θi | Di | $N_{di}$ | Effective size (X * Y) | |
|---|---|---|---|---|---|---|---|
| 1 | 0.00 | −234.47 | 0.0 | 234.47 | 1. | | Object Surface (Original Surface) |
| 2 | 0.00 | 0.00 | 0.0 | 5.00 | 1. | 26.5 * 9.3 | Transmitting Surface |
| 3 | 0.00 | 5.00 | −45.0 | 10.50 | 1. | 22.1 * 13.3 | Reflecting Surface |
| 4 | 10.50 | 5.00 | 45.0 | 5.00 | 1. | 15.0 * 11.1 | Reflecting Surface |
| 5 | 10.50 | 10.00 | 0.0 | 5.00 | 1. | 9.8 * 8.2 | Transmitting Surface (Stop) |
| 6 | 10.50 | 15.00 | 45.0 | 9.00 | 1. | 12.8 * 11.8 | Reflecting Surface |
| 7 | 1.50 | 15.00 | −45.0 | 7.50 | 1. | 17.2 * 8.6 | Reflecting Surface |
| 8 | 1.50 | 22.50 | 45.0 | 5.00 | 1. | 24.1 * 7.4 | Reflecting Surface |
| 9 | −3.50 | 22.50 | 0.0 | 15.53 | 1. | 26.9 * 4.0 | Transmitting Surface |
| 10 | −19.03 | 22.50 | | | | | Image Plane (Sensor Surface) |

Aspherical Shape

R3 Surface $C_{02} = -4.0198e-3$  $C_{03} = -4.3312e-5$  $C_{04} = 1.6186e-6$
$C_{05} = -2.0989e-8$  $C_{06} = 8.9768e-9$  $C_{20} = 2.8439e-4$
$C_{21} = -1.5619e-4$  $C_{22} = 2.2172e-6$  $C_{23} = 2.2829e-7$
$C_{24} = 3.9202e-8$  $C_{40} = 4.0661e-6$  $C_{41} = 1.4412e-7$
$C_{42} = 2.2936e-8$  $C_{60} = 5.7706e-10$ R4 Surface $C_{02} = -5.4417e-3$  $C_{03} = -7.3877e-5$  $C_{04} = 1.0743e-5$
$C_{05} = -2.4521e-8$  $C_{06} = 1.1018e-8$  $C_{20} = 5.2872e-3$
$C_{21} = -2.7535e-4$  $C_{22} = -5.4940e-6$  $C_{23} = 8.5892e-8$
$C_{24} = 3.7137e-8$  $C_{40} = -5.9045e-7$  $C_{41} = 9.1078e-8$
$C_{42} = 2.8573e-8$  $C_{60} = 1.3710e-9$ -continued R6 Surface $C_{02} = -6.3295e-3$        $C_{03} = 2.7750e-5$         $C_{04} = 4.712e-6$
$C_{05} = -1.2480e-9$        $C_{06} = 4.0127e-9$         $C_{20} = -6.9688e-3$
$C_{21} = 1.3190e-4$         $C_{22} = -1.0478e-5$        $C_{23} = -3.2445e-7$
$C_{24} = -2.8006e-10$       $C_{40} = -6.3309e-6$        $C_{41} = -1.9653e-7$
$C_{42} = -3.5731e-9$        $C_{60} = -1.6195e-8$ R7 Surface $C_{02} = -2.3617e-3$        $C_{03} = -3.0217e-4$        $C_{04} = 4.2638e-6$
$C_{05} = -4.3632e-7$        $C_{06} = -2.5691e-8$        $C_{20} = -4.1060e-3$
$C_{21} = -2.8981e-4$        $C_{22} = -1.3951e-5$        $C_{23} = -4.2753e-7$
$C_{24} = 7.0819e-9$         $C_{40} = -1.1548e-5$        $C_{41} = 2.7378e-7$
$C_{42} = 2.6827e-8$         $C_{60} = -5.3341-8$ R8 Surface $C_{02} = -3.0337e-3$        $C_{03} = -4.9544e-4$        $C_{04} = 3.1402e-5$
$C_{05} = 4.8603e-7$         $C_{06} = -2.9443e-7$        $C_{22} = -2.5940e-3$
$C_{21} = -1.1772e-5$        $C_{22} = -1.2226e-5$        $C_{23} = -3.7638e-7$
$C_{22} = 3.7445e-8$         $C_{40} = 6.4273e-7$         $C_{41} = 2.1664e-6$
$C_{42} = 8.9223e-9$         $C_{60} = -1.2288e-8$ Numerical Embodiment 13
Read Width of Original: 222, Imaging Magnification: −0.1653, NA at Original Side: 0.0187, $f_{eq}$: −37.69

| i | Yi | Zi | θi | Di | $N_{di}$ | Effective Size (X * Y) | |
|---|-----|------|------|------|----|-------------|---|
| 1 | 0.00 | −220.44 | 0.0 | 220.14 | 1. | | Object Surface (Original Surface) |
| 2 | 0.00 | 0.00 | 0.0 | 4.80 | 1. | 26.43 * 8.61 | Transmitting Surface |
| 3 | 0.00 | 4.80 | 45.0 | 9.10 | 1. | 22.67 * 12.49 | Reflecting Surface |
| 4 | −9.10 | 4.80 | −45.0 | 4.60 | 1. | 13.7 * 9.25 | Reflecting Surface |
| 5 | −9.10 | 9.40 | 0.0 | 3.70 | 1. | 8.52 * 6.4 | Transmitting Surface (Stop) |
| 6 | −9.10 | 13.10 | −45.0 | 8.80 | 1. | 11.58 * 9.09 | Reflecting Surface |
| 7 | −0.30 | 13.10 | 45.0 | 7.50 | 1. | 17.93 * 8.46 | Reflecting Surface |
| 8 | −0.30 | 20.60 | 45.0 | 4.50 | 1. | 24.11 * 8.43 | Reflecting Surface |
| 9 | −4.80 | 20.60 | 0.0 | 19.60 | 1. | 26.06 * 4.76 | Transmitting Surface |
| 10 | −24.40 | 20.60 | | | 1. | | Image Plane (Sensor Surface) |

Aspherical Shape

R3 Surface $C_{02} = -5.4809e-3$        $C_{03} = 3.4337e-5$         $C_{04} = -3.6004e-6$
$C_{05} = 2.6877e-7$         $C_{06} = -2.4954e-8$        $C_{20} = -1.9618e-3$
$C_{21} = 5.1735e-5$         $C_{22} = 3.6712e-6$         $C_{23} = -1.6683e-8$
$C_{24} = -2.2272e-8$        $C_{40} = 1.9458e-6$         $C_{41} = -1.2257e-7$
$C_{42} = 9.7772e-9$         $C_{60} = -2.9597e-9$ R4 Surface $C_{02} = -6.4075e-3$        $C_{03} = 5.6236e-5$         $C_{04} = -1.1591e-5$
$C_{05} = 1.1804e-6$         $C_{06} = -1.4678e-7$        $C_{20} = 1.5647e-3$
$C_{21} = 1.2100e-4$         $C_{22} = 1.0886e-5$         $C_{23} = -7.7632e-8$
$C_{24} = -7.7304e-8$        $C_{40} = -2.2614e-6$        $C_{41} = 5.2751e-7$
$C_{42} = 6.0420e-8$         $C_{60} = -1.8242e-8$ R6 Surface $C_{02} = -2.5558e-3$        $C_{03} = -9.2337e-6$        $C_{04} = -1.0277e-5$
$C_{05} = 1.2682e-6$         $C_{06} = 3.1807e-7$         $C_{20} = -4.5515e-3$
$C_{21} = -1.1623e-4$        $C_{22} = 2.5157e-5$         $C_{23} = 1.4727e-6$
$C_{24} = -3.7813e-8$        $C_{40} = -6.2042e-6$        $C_{41} = 5.0551e-7$
$C_{42} = -2.1435e-7$        $C_{60} = -2.8678e-9$ R7 Surface $C_{02} = -1.6417e-3$        $C_{03} = -1.6584e-4$        $C_{04} = -4.9779e-5$
$C_{05} = -6.6672e-7$        $C_{06} = 3.5971e-7$         $C_{20} = 5.8301e-4$
$C_{21} = -3.4856e-4$        $C_{22} = 1.3360e-5$         $C_{23} = 2.5606e-6$
$C_{24} = 7.2100e-8$         $C_{40} = -3.4302e-6$        $C_{41} = 8.9415e-7$
$C_{42} = -3.5448e-8$        $C_{60} = -9.6893e-$ -continued R8 Surface $C_{02} = -6.2829e-3$     $C_{03} = -7.2993e-5$     $C_{04} = -3.6153e-5$
$C_{05} = -8.4251e-7$     $C_{06} = -1.1745e-7$     $C_{20} = -4.3172e-3$
$C_{21} = -2.2609e-4$     $C_{22} = -1.0428e-5$     $C_{23} = 9.3647e-7$
$C_{24} = 1.5891e-7$      $C_{40} = 4.3128e-6$      $C_{41} = 4.2867e-7$
$C_{42} = 3.4859e-8$      $C_{60} = -3.8820e-9$ Numerical Embodiment 14
Read Width of Original: 222, Imaging Magnification: −0.1653, NA at Original Side: 0.0187, $f_{eq}$: −39.96

| i | Yi | Zi | θi | Di | $N_{di}$ | Effective Size (X * Y) | |
|---|---|---|---|---|---|---|---|
| 1 | 0.00 | 205.31 | 0.0 | 205.31 | 1. | | Object Surface (Original Surface) |
| 2 | 0.00 | 0.00 | 0.0 | 4.50 | 1. | 31.65 * 8.33 | Transmitting Surface |
| 3 | 0.00 | 4.50 | 45.0 | 8.80 | 1. | 28.04 * 12.02 | Reflecting Surface |
| 4 | −8.80 | 4.50 | 45.0 | 7.50 | 1. | 18.81 * 8.41 | Reflecting Surface |
| 5 | −8.80 | −3.00 | −45.0 | 3.60 | 1. | 13.17 * 7.11 | Reflecting Surface |
| 6 | −12.40 | −3.00 | 0.0 | 3.60 | 1. | 9.08 * 5.06 | Transmitting Surface (Stop) |
| 7 | −16.00 | −3.00 | −45.0 | 7.20 | 1. | 11.34 * 7.07 | Reflecting Surface |
| 8 | −16.00 | 4.20 | 45.0 | 5.00 | 1. | 16.11 * 9.31 | Reflecting Surface |
| 9 | −21.00 | 4.20 | 0.0 | 19.93 | 1. | 20.22 * 5.39 | Transmitting Surface |
| 10 | −40.93 | 4.20 | | | 1. | | Image Plane (Sensor Surface) |

Aspherical Shape

R3 Surface $C_{02} = -7.7942e-3$     $C_{03} = 1.5340e-4$     $C_{04} = -7.6742e-6$
$C_{05} = 3.2773e-7$      $C_{06} = 1.0105e-8$     $C_{20} = -1.0191e-3$
$C_{21} = 6.2260e-5$      $C_{22} = -9.2241e-7$    $C_{23} = -3.0462e-8$
$C_{24} = 8.8061e-10$     $C_{40} = 2.0586e-6$     $C_{41} = -1.3894e-7$
$C_{42} = 8.3907e-9$      $C_{60} = -2.4566e-9$ R4 Surface $C_{02} = -7.2728e-3$     $C_{03} = -4.2030e-4$    $C_{04} = -2.0491e-5$
$C_{05} = -4.8447e-7$     $C_{06} = -9.7181e-8$    $C_{20} = -9.2280e-4$
$C_{21} = 3.2208e-4$      $C_{22} = 8.2382e-6$     $C_{23} = -2.5361e-6$
$C_{24} = -3.8347e-7$     $C_{40} = -6.7741e-6$    $C_{41} = -3.9460e-7$
$C_{42} = -8.1632e-8$     $C_{60} = -1.0713e-8$ R5 Surface $C_{02} = 3.1883e-3$      $C_{03} = -6.1203e-4$    $C_{04} = 3.8105e-5$
$C_{05} = -2.7815e-6$     $C_{06} = -3.0068e-6$    $C_{20} = -6.3341e-3$
$C_{21} = 4.8749e-4$      $C_{22} = 2.9794e-5$     $C_{23} = 1.0729e-6$
$C_{24} = -1.0564e-7$     $C_{40} = -6.1451e-6$    $C_{41} = 9.1215e-7$
$C_{42} = 7.5611e-8$      $C_{60} = 2.1232e-8$ R7 Surface $C_{02} = -8.5808e-3$     $C_{03} = -4.5399e-4$    $C_{04} = -1.1286e-5$
$C_{05} = -1.5372e-5$     $C_{06} = -1.5145e-6$    $C_{20} = 6.6006e-3$
$C_{21} = 2.2227e-4$      $C_{22} = 3.3610e-5$     $C_{23} = 2.7141e-6$
$C_{24} = -4.5924e-9$     $C_{40} = 4.0853e-6$     $C_{41} = 9.0088e-7$
$C_{42} = 1.8614e-7$      $C_{60} = -6.3950e-8$ R8 Surface $C_{02} = -1.3035e-2$     $C_{03} = -1.2855e-4$    $C_{04} = -7.7104e-6$
$C_{05} = -2.9888e-6$     $C_{06} = 3.1345e-7$     $C_{20} = 1.5832e-3$
$C_{21} = 1.3213e-4$      $C_{22} = -6.4279e-6$    $C_{23} = 1.1227e-7$
$C_{24} = -5.6333e-8$     $C_{40} = 1.1344e-5$     $C_{41} = 1.1861e-6$
$C_{42} = 1.0745e-7$      $C_{60} = 1.9480e-8$ Numerical Embodiment 15
Read Width of Original: 222, Imaging Magnification: −0.1653, NA at Original Side: 0.0187, $f_{eq}$: 37.55

| i | Yi | Zi | θ1 | Di | $N_{di}$ | Effective Size (X * Y) | |
|---|---|---|---|---|---|---|---|
| 1 | 0.00 | −210.46 | 0.0 | 210.46 | 1 | | Object Surface (Original Surface) |
| 2 | 0.00 | 0.00 | 0.0 | 5.00 | 1. | 38.53 * 8.49 | Transmitting Surface |
| 3 | 0.00 | 5.00 | 45.0 | 9.50 | 1. | 35.27 * 12.55 | Reflecting Surface |
| 4 | −9.50 | 5.00 | 45.0 | 9.00 | 1. | 24.18 * 10.4 | Reflecting Surface |
| 5 | −9.50 | −4.00 | −45.0 | 5.00 | 1. | 14.25 * 9.06 | Reflecting Surface |
| 6 | −14.50 | −4.00 | 0.0 | 4.50 | 1. | 7.69 * 6.20 | Transmitting Surface (Stop) |
| 7 | −19.00 | −4.00 | −45.0 | 8.50 | 1. | 12.36 * 8.67 | Reflecting Surface |
| 8 | −19.00 | 4.50 | 45.0 | 7.50 | 1. | 21.0 * 9.22 | Reflecting Surface |
| 9 | −26.50 | 4.50 | 45.0 | 6.00 | 1. | 26.31 * 7.30 | Reflecting Surface |
| 10 | −26.50 | −1.50 | 0.0 | 14.54 | 1. | 28.93 * 3.57 | Transmitting Surface |
| 11 | −26.50 | −16.04 | | | 1. | | Image Plane (Sensor Surface) |

Aspherical Shape

R3 Surface $C_{02}$ = −3.9738e−3     $C_{03}$ = 1.6304e−4     $C_{04}$ = −9.0512e−6
$C_{05}$ = 4.8201e−7     $C_{06}$ = −9.1019e−9    $C_{20}$ = −2.0427e−3
$C_{21}$ = 5.8600e−5     $C_{22}$ = −1.3077e−6    $C_{23}$ = −8.2015e−8
$C_{24}$ = 2.1265e−9     $C_{40}$ = 4.6160e−7     $C_{41}$ = −5.6157e−8
$C_{42}$ = 3.0888e−9     $C_{60}$ = −3.8991e−10

R4 Surface $C_{02}$ = −2.4559e−3    $C_{03}$ = 2.3458e−4     $C_{04}$ = −4.8400e−6
$C_{05}$ = −5.9899e−7    $C_{06}$ = 1.8301e−8     $C_{20}$ = 1.4498e−3
$C_{21}$ = 1.5853e−4     $C_{22}$ = 8.3292e−6     $C_{23}$ = −6.0265e−7
$C_{24}$ = −8.1035e−8    $C_{40}$ = −1.3827e−6    $C_{41}$ = −2.4613e−7
$C_{42}$ = −2.2512e−8    $C_{60}$ = 1.7109e−9

R5 Surface $C_{02}$ = 9.3479e−4     $C_{03}$ = 6.3740e−5     $C_{04}$ = 1.5280e−5
$C_{05}$ = −1.0233e−6    $C_{06}$ = −2.1499e−7    $C_{20}$ = −2.4899e−3
$C_{21}$ = 7.1857e−5     $C_{22}$ = 2.5366e−5     $C_{23}$ = 8.7311e−7
$C_{24}$ = −1.0984e−7    $C_{40}$ = 1.0442e−6     $C_{41}$ = 4.7624e−7
$C_{42}$ = 3.0322e−8     $C_{60}$ = 1.0869e−8

R7 Surface $C_{02}$ = −1.3077e−3    $C_{03}$ = −9.5358e−6    $C_{04}$ = 1.1644e−6
$C_{05}$ = 4.6743e−7     $C_{06}$ = −2.1897e−7    $C_{20}$ = −6.2673e−4
$C_{21}$ = −9.9277e−5    $C_{22}$ = 1.1316e−5     $C_{23}$ = 9.8104e−8
$C_{24}$ = −1.0288e−7    $C_{40}$ = 5.8473e−6     $C_{41}$ = 3.7217e−7
$C_{42}$ = 6.2029e−8     $C_{60}$ = −1.1077e−8

R8 Surface $C_{02}$ = −6.9421e−3    $C_{03}$ = 4.5103e−5     $C_{04}$ = −8.8717e−6
$C_{05}$ = 5.3705e−7     $C_{06}$ = −2.0675e−8    $C_{20}$ = −5.6496e−3
$C_{21}$ = −8.7333e−5    $C_{22}$ = −8.6811e−7    $C_{23}$ = −1.1882e−6
$C_{24}$ = 1.2747e−8     $C_{40}$ = 2.6056e−6     $C_{41}$ = 2.4906e−7
$C_{42}$ = 2.0119e−8     $C_{60}$ = 3.0389e−9

R9 Surface $C_{02}$ = 2.2767e−4     $C_{03}$ = 7.4454e−5     $C_{04}$ = −5.2296e−6
$C_{05}$ = −2.9920e−7    $C_{06}$ = 5.3685e−8     $C_{20}$ = 3.5672e−3
$C_{21}$ = −2.9519e−5    $C_{22}$ = −3.1213e−6    $C_{23}$ = −1.0428e−6
$C_{24}$ = 1.3648e−7     $C_{40}$ = −2.3563e−6    $C_{41}$ = 1.9318e−7
$C_{42}$ = −1.6040e−8    $C_{60}$ = 5.8956e−10

Numerical Embodiment 16
Read Width of Original: 222, Imaging Magnification: −0.1653, NA at Original Side: 0.0187, $f_{eq}$: 43.13

| i | Yi | Zi | θi | Di | $N_{di}$ | Effective Size (X * Y) | |
|---|---|---|---|---|---|---|---|
| 1 | 0.00 | −239.61 | 0.0 | 239.61 | 1. | | Object Surface (Original Surface) |
| 2 | 0.00 | 0.00 | 0.0 | 5.00 | 1. | 37.4 * 9.81 | Transmitting Surface |
| 3 | 0.00 | 5.00 | 45.0 | 10.30 | 1. | 34.57 * 14.31 | Reflecting Surface |
| 4 | −10.30 | 5.00 | 45.0 | 10.00 | 1. | 23.88 * 10.99 | Reflecting Surface |
| 5 | −10.30 | −5.00 | −45.0 | 5.50 | 1. | 16.08 * 9.26 | Reflecting Surface |
| 6 | −15.80 | −5.00 | 0.0 | 6.00 | 1. | 9.78 * 6.47 | Transmitting Surface (Stop) |
| 7 | −21.80 | −5.00 | −45.0 | 9.00 | 1. | 13.96 * 9.07 | Reflecting Surface |
| 8 | −21.80 | 4.00 | 45.0 | 8.00 | 1. | 20.74 * 8.98 | Reflecting Surface |
| 9 | −29.80 | 4.00 | −45.0 | 6.00 | 1. | 24.27 * 6.20 | Reflecting Surface |
| 10 | −29.80 | 10.00 | 0.0 | 10.39 | 1. | 28.99 * 2.49 | Transmitting Surface |
| 11 | −29.80 | 20.39 | | | 1. | | Image Plane (Sensor Surface) |

Aspherical Shape

R3 Surface $C_{02}$ = −4.8976e−3  $C_{03}$ = 1.5273e−4  $C_{04}$ = −1.0530e−5
$C_{05}$ = 3.6681e−7  $C_{06}$ = −2.8231e−9  $C_{20}$ = −1.9499e−3
$C_{21}$ = 5.0580e−5  $C_{22}$ = −8.2125e−7  $C_{23}$ = 3.0451e−8
$C_{24}$ = −4.1110e−10  $C_{40}$ = 8.7459e−7  $C_{41}$ = −1.7593e−8
$C_{42}$ = −3.2845e−10  $C_{60}$ = 8.5468e−11

R4 Surface $C_{02}$ = −3.7198e−3  $C_{03}$ = 2.0137e−4  $C_{04}$ = −1.3162e−5
$C_{05}$ = −1.5142e−6  $C_{06}$ = 2.9707e−8  $C_{20}$ = 3.2871e−4
$C_{21}$ = 2.1569e−4  $C_{22}$ = 3.8014e−6  $C_{23}$ = 2.2547e−7
$C_{24}$ = 4.1087e−8  $C_{40}$ = −3.4195e−6  $C_{41}$ = 8.5940e−9
$C_{42}$ = 2.1575e−9  $C_{60}$ = −2.6763e−9

R5 Surface $C_{02}$ = 8.9718e−4  $C_{03}$ = 5.5441e−5  $C_{04}$ = 1.7587e−5
$C_{05}$ = −8.9855e−7  $C_{06}$ = −1.0873e−7  $C_{20}$ = −4.5083e−3
$C_{21}$ = 1.9520e−4  $C_{22}$ = 1.6063e−5  $C_{23}$ = 1.3767e−6
$C_{24}$ = 7.1130e−8  $C_{40}$ = −5.0059e−6  $C_{41}$ = −1.1423e−7
$C_{42}$ = −1.4689e−8  $C_{60}$ = 2.2482e−9

R7 Surface $C_{02}$ = −7.3920e−4  $C_{03}$ = 2.8734e−5  $C_{04}$ = 3.9706e−6
$C_{05}$ = 5.2045e−7  $C_{06}$ = −6.1714e−8  $C_{20}$ = 1.4253e−3
$C_{21}$ = −1.0230e−4  $C_{22}$ = 1.0728e−6  $C_{23}$ = 9.0333e−7
$C_{24}$ = −1.0870e−7  $C_{40}$ = −4.7496e−6  $C_{41}$ = −3.4478e−7
$C_{42}$ = 1.4200e−8  $C_{60}$ = −2.8621e−9

R8 Surface $C_{02}$ = −7.1121e−3  $C_{03}$ = 3.1998e−5  $C_{04}$ = −1.0329e−5
$C_{05}$ = −6.1094e−7  $C_{06}$ = 1.4211e−7  $C_{20}$ = −5.8559e−3
$C_{21}$ = −1.4938e−4  $C_{22}$ = −9.6136e−6  $C_{23}$ = 5.3107e−7
$C_{24}$ = −2.5542e−7  $C_{40}$ = −1.7990e−6  $C_{41}$ = 1.3608e−7
$C_{42}$ = 2.5650e−8  $C_{60}$ = 1.0580e−8

R9 Surface $C_{02}$ = −7.3487e−4  $C_{03}$ = 2.4984e−6  $C_{04}$ = −9.0385e−6
$C_{05}$ = −2.8895e−6  $C_{06}$ = 7.8261e−7  $C_{20}$ = −3.0120e−3
$C_{21}$ = −6.6311e−5  $C_{22}$ = −1.6804e−5  $C_{23}$ = 1.5172e−6
$C_{24}$ = −4.4455e−7  $C_{40}$ = −5.2507e−6  $C_{41}$ = 2.1385e−8
$C_{42}$ = 9.5273e−9  $C_{60}$ = 1.7378e−8

Numerical Embodiment 17
Read Width of Original: 305, Imaging Magnification: −0.22028, NA at Original Side: 0.0201, $f_{eq}$: 49.00

| i | Yi | Zi | θ1 | Di | $N_{di}$ | Effective Size (X * Y) | |
|---|------|--------|------|--------|-----|-------------|---|
| 1 | 0.00 | −199.00 | 0.0 | 4.00 | 1.5 | | Object Surface (Original Surface) |
| 2 | 0.00 | −195.00 | 0.0 | 195.00 | 1.0 | | Transmitting Surface |
| 3 | 0.00 | 0.00 | 0.0 | 10.00 | 1.0 | | Transmitting Surface |
| 4 | 0.00 | 10.00 | 45.0 | 10.00 | 1.0 | 55.9 * 19.8 | Reflecting Surface |
| 5 | −10.00 | 10.00 | −45.0 | 12.00 | 1.0 | 30.7 * 12.7 | Reflecting Surface |
| 6 | −10.00 | −2.00 | −45.0 | −6.00 | 1.0 | 19.2 * 11.3 | Reflecting Surface |
| 7 | −16.00 | −2.00 | 0.0 | −5.00 | 1.0 | | Transmitting Surface (Stop) |
| 8 | −21.00 | −2.00 | −45.0 | 10.00 | 1.0 | 15.1 * 8.8 | Reflecting Surface |
| 9 | −21.00 | −12.00 | −45.0 | −11.50 | 1.0 | 36.2 * 11.5 | Reflecting Surface |
| 10 | −32.50 | −12.00 | 45.0 | 10.00 | 1.0 | 49.1 * 10.5 | Reflecting Surface |
| 11 | −32.50 | −2.00 | 0.0 | 0.70 | 1.5 | | Transmitting Surface |
| 12 | −32.50 | −1.30 | 0.0 | 19.70 | 1.0 | | Transmitting Surface |
| 13 | −32.50 | 18.40 | | | 1.0 | | Image Plane (Sensor Surface) |

Aspherical Shape

R4 Surface $C_{02} = -4.6370e-3$  $C_{03} = 4.7956e-5$  $C_{04} = -3.8778e-7$
$C_{05} = -2.6373e-8$  $C_{06} = -4.1368e-10$  $C_{20} = -2.2522e-3$
$C_{21} = 4.6045e-5$  $C_{22} = -6.4075e-7$  $C_{23} = -3.6626e-9$
$C_{24} = 9.5021e-10$  $C_{40} = 8.0691e-8$  $C_{41} = -1.2313e-9$
$C_{42} = -1.0275e-10$  $C_{60} = -4.4066e-12$ R5 Surface $C_{02} = -7.9557e-3$  $C_{03} = -1.9354e-5$  $C_{04} = -1.7661e-7$
$C_{05} = -2.7155e-7$  $C_{06} = -1.7098e-8$  $C_{20} = -2.9139e-3$
$C_{21} = 2.2513e-4$  $C_{22} = 1.1500e-6$  $C_{23} = 1.9226e-7$
$C_{24} = 1.0393e-8$  $C_{40} = -3.1571e-6$  $C_{41} = 2.1718e-10$
$C_{42} = -3.2272e-9$  $C_{60} = -2.2044e-10$ R6 Surface $C_{02} = -7.3984e-3$  $C_{03} = -8.9040e-5$  $C_{04} = -3.3142e-6$
$C_{05} = -1.1728e-7$  $C_{06} = -1.2995e-8$  $C_{20} = -1.0503e-2$
$C_{21} = 4.4162e-5$  $C_{22} = -5.6571e-7$  $C_{23} = 2.8155e-7$
$C_{24} = 6.6068e-9$  $C_{40} = -1.7855e-6$  $C_{41} = -1.8879e-8$
$C_{42} = -3.4977e-10$  $C_{60} = -3.6874e-10$ R8 Surface $C_{02} = -1.2363e-2$  $C_{03} = -2.3209e-4$  $C_{04} = -2.2229e-5$
$C_{05} = -3.5502e-7$  $C_{06} = -1.5995e-7$  $C_{20} = -1.2225e-2$
$C_{21} = 6.9852e-5$  $C_{22} = -1.4608e-5$  $C_{23} = 1.2372e-6$
$C_{24} = 6.2157e-8$  $C_{40} = 2.0029e-6$  $C_{41} = 3.8246e-7$
$C_{42} = -2.3096e-8$  $C_{60} = -1.3092e-8$ R9 surface $C_{02} = -7.9876e-3$  $C_{03} = 2.8932e-5$  $C_{04} = -2.1422e-6$
$C_{05} = 1.5135e-7$  $C_{06} = -2.6037e-9$  $C_{20} = -6.9135e-3$
$C_{21} = 1.1755e-4$  $C_{22} = -1.7268e-6$  $C_{23} = 2.3870e-7$
$C_{24} = -1.0577e-9$  $C_{40} = 8.1403e-7$  $C_{41} = 2.7851e-8$
$C_{42} = -1.6593e-9$  $C_{60} = -1.0464e-11$ R10 Surface $C_{02} = 8.2240e-4$  $C_{03} = 1.3187e-4$  $C_{04} = -6.7315e-6$
$C_{05} = 2.9663e-7$  $C_{06} = -4.2567e-9$  $C_{20} = 4.3524e-3$
$C_{21} = 4.4682e-5$  $C_{22} = 3.6473e-6$  $C_{23} = 5.7219e-8$
$C_{24} = 1.4368e-9$  $C_{40} = -7.9626e-7$  $C_{41} = -1.5383e-8$
$C_{42} = 1.2792e-19$  $C_{60} = 2.5752e-19$ According to the present invention, in an original reading system such as a digital copier of which a high speed and high resolution are required, there can be achieved an original reading imaging optical system which can easily realize an integral carriage type scanning process, and an image reading apparatus using the same.

Besides, according to the present invention, in the reading of a digital color image, there can be achieved an original reading imaging optical system which is free of chromatic aberration and can easily realize an integral carriage type scanning process, and an image reading apparatus using the same.

Besides, according to the present invention, there can be achieved an original reading imaging optical system which, even if an imaging optical system is comprised of off-axial reflecting surfaces, suffers little from the occurrence of an asymmetrical aberration and is not greatly deteriorated in optical performance, and an image reading apparatus using the same.

What is claimed is:

1. An image reading imaging optical system for imaging image information on a line sensor and reading the image information, the system comprising:
   an image optical element including a plurality of off-axial reflecting surfaces differing in the direction of incidence and the direction of emergence of a reference axis ray from one another and having curvatures, wherein the plurality of off-axial reflecting surfaces include at least one set of reflecting surfaces intersecting with each other, and a stop is located between the off-axial reflecting surfaces intersecting with each other; and
   an angle of field, wherein the angle of field is an angle defined between a principle ray of an off-axis light beam and a principle ray of an on-axis light beam.

2. An image reading imaging optical system according to claim 1, wherein said imaging optical element has the function of changing the direction of emergence of the reference axis ray to a direction substantially perpendicular or opposite to the direction of incidence of the reference axis ray.

3. An image reading apparatus comprising:
   an original supporting table upon which an original is placed;
   an imaging optical element for imaging image information on the surface of the original on a line sensor; and
   a line sensor for reading the image information,
   wherein said imaging optical element has a plurality of off-axial reflecting surfaces differing in the direction of incidence and the direction of emergence of a reference axis ray from one another and having curvatures,
   wherein the apparatus has an angle of field, wherein the angle of field is an angle defined between a principle ray of an off-axis light beam and a principle ray of an on-axis light beam, and
   wherein the bending direction of the reference axis ray on each off-axial reflecting surface of said imaging optical element is in a cross section perpendicular to the line direction of said line sensor.

4. An image reading apparatus according to claim 3, wherein the direction of the reference axis ray emerging from said imaging optical element is substantially orthogonal to the direction of the reference axis ray incident on said imaging optical element.

5. An image reading apparatus according to claim 3, wherein the direction of the reference axis ray emerging from said imaging optical element is substantially the same direction as the direction of the reference axis ray incident on said imaging optical element.

6. An image reading apparatus according to claim 3 wherein the direction of the reference axis ray incident on said imaging optical element and the direction of the reference axis ray emerging from said imaging optical element are substantially opposite directions.

7. An image reading apparatus according to claim 3, wherein an internal medium constituting said imaging optical element is air.

8. An image reading apparatus according to claim 3, wherein an internal medium constituting said imaging optical element is optically transparent glass or plastic.

9. An image reading apparatus according to claim 3, wherein when an off-axial reflecting surface for counter-clockwisely deflecting the reference axis ray is defined as a plus deflecting surface, and an off-axial reflecting surface for clockwisely deflecting the reference axis ray is defined as a minus deflecting surface, said imaging optical element has at least one set of constructions in which the plus deflecting surface is continuous or at least one set of constructions in which the minus deflecting surface is continuous.

10. An image reading apparatus according to claim 3, wherein when an off-axial reflecting surface for counter-clockwisely deflecting the reference axis ray is defined as a plus deflecting surface, and an off-axial reflecting surface for clockwisely deflecting the reference axis ray is defined as a minus deflecting surface, said imaging optical element has at least one set of constructions in which the plus deflecting surface is continuous and at least one set of constructions in which the minus deflecting surface is continuous.

11. An image reading apparatus according to claim 3, wherein said imaging optical element is comprised of six off-axial reflecting surfaces, and when an off-axial reflecting surface for counter-clockwisely deflecting the reference axis ray is defined as a plus deflecting surface, and an off-axial reflecting surface for clockwisely deflecting the reference axis ray is defined as a minus deflecting surface, said imaging optical element has the same number of plus deflecting surfaces and minus deflecting surfaces, and the off-axial reflecting surface most adjacent to the exit side is disposed on the original side on the incidence reference axis relative to the off-axial reflecting surface most adjacent to the incidence side.

12. An image reading apparatus according to claim 11, wherein the plus deflecting surfaces and the minus deflecting surfaces are disposed so as to be opposite deflecting surfaces relative to a stop.

13. An image reading apparatus according to claim 11, wherein an off-axial reflecting surface of said imaging optical element which is most adjacent to the incidence side is designed to have a converging action.

14. An image reading apparatus according to claim 11, wherein at least one off-axial reflecting surface of said imaging optical element cuts infrared light.

15. An image reading apparatus according to claim 11, wherein said imaging optical element is disposed in a housing along the surface of the original in parallel to a reflecting mirror.

16. An image reading apparatus comprising:
   an original supporting table upon which an original is placed;
   an imaging optical element for imaging image information on the surface of the original on a line sensor; and
   a line sensor for reading the image information,
   wherein said imaging optical element has a plurality of off-axial reflecting surfaces differing in the direction of incidence and the direction of emergence of a reference axis ray from one another and having curvatures,
   wherein the apparatus has an angle of field, wherein the angle of field is an angle defined between a principle ray of an off-axis light beam and a principle ray of an on-axis light beam, and
   wherein said image information is not intermediately imaged in said imaging optical element, but is directly formed on said line sensor.

17. An image reading apparatus according to claim 16, wherein said imaging optical element has a stop near substantially the center of the optical path between a light incidence surface and a light exit surface thereof.

18. An image reading apparatus according to claim 17, wherein the stop is formed by an effective surface of an off-axial reflecting surface located near substantially the center of the optical path between the light incidence surface and the light exit surface of said imaging optical element.

19. An image reading apparatus comprising:
an original supporting table upon which an original is placed;
an imaging optical element for imaging image information on the surface of the original on a line sensor; and
a line sensor for reading the image information,
wherein said imaging optical element has a plurality of off-axial reflecting surfaces differing in the direction of incidence and the direction of emergence of a reference axis ray from one another and having curvatures,
wherein the apparatus has an angle of field, wherein the angle of field is an angle defined between a principle ray of an off-axis light beam and a principle ray of an on-axis light beam, and
wherein when an effective beam width in a direction perpendicular to the line direction of the line sensor on the exit surface of said imaging optical element is defined as Φs, and an effective beam width in the line direction of the line sensor is defined as Φm, $$\Phi s < \Phi m.$$

20. An image reading apparatus according to any one of claims 3, 16, or 19, wherein said image information is a color image.

21. An image reading apparatus comprising:
an original supporting table on which an original having image information on a surface thereof is placed;
an imaging optical element for causing the image information on the surface of the original to be imaged on a line sensor, the imaging optical element having a plurality of off-axial reflecting surfaces differing in the direction of incidence and the direction of emergence of a reference axis ray from one another and having curvatures;
a line sensor for reading the image information; and
a reflecting mirror,
wherein said reflecting mirror and said imaging optical element reflect the reference axis ray a plurality of times, and said imaging optical element has the function of changing a direction of emergence of the reference axis ray to a direction substantially perpendicular or opposite to the direction of incidence of the reference axis ray, and
wherein the apparatus has an angle of field, wherein the angle field is an angle defined between a principle ray of an off-axis light beam and a principle ray of an on-axis light beam.

22. An image reading apparatus according to claim 21 wherein the bending direction of the reference axis ray on each off-axial reflecting surface is in a cross section perpendicular to a line direction of said line sensor.

23. An image reading apparatus according to claim 21 further comprising at least two reflecting mirrors.

24. An image reading apparatus according to claim 21 wherein said imaging optical element is disposed on the side opposite to the surface of the original with respect to said reflecting mirror.

25. An image reading apparatus according to claim 21 wherein said imaging optical element is disposed in a housing along the surface of the original in parallel to said reflecting mirror.

26. An image reading apparatus comprising:
an original supporting table on which an original is placed;
an imaging optical element for imaging image information on the surface of the original on a line sensor, said imaging optical element including a plurality of off-axial reflecting surfaces including at least one set of reflecting surfaces intersecting with each other and a stop between the off-axial reflecting surfaces intersecting with each other; and
a line sensor for reading the image information.

27. An image reading apparatus according to claim 26, wherein the bending direction of a reference axis ray on each off-axial reflecting surface of said imaging optical element is in a cross section perpendicular to the line direction of said line sensor.

28. An image reading apparatus according to claim 27, wherein the stop in said imaging optical element is disposed near substantially the center of an optical path between the light incidence surface and the light exit surface of the imaging optical element.

29. An image reading apparatus according to claim 27, wherein the stop differs in an aperture width thereof in a cross section perpendicular to the line direction of the sensor line and an aperture width in a direction parallel to the line direction.

30. An image reading apparatus according to claim 29, wherein the stop is constructed integrally with the off-axial reflecting surfaces proximate thereto.

31. An image reading apparatus comprising:
an original supporting table on which an original is placed;
an imaging optical element for imaging image information on the surface of the original on a line sensor; and
a line sensor for reading the image information,
wherein said imaging optical element has a plurality of off-axial reflecting surfaces differing in the direction of incidence and the direction of emergence of a reference axis ray from one another and having curvatures,
wherein the bending direction of the reference axis ray on each off-axial reflecting surface of said imaging optical element is in a cross section perpendicular to the line direction of said line sensor, and
wherein the direction of the reference axis ray emerging from said imaging optical element is substantially orthogonal to the direction of the reference axis ray incident on said imaging optical element.

32. An image reading apparatus comprising:
an original supporting table on which an original is placed;
an imaging optical element for imaging image information on the surface of the original on a line sensor; and
a line sensor for reading the image information,
wherein said imaging optical element has a plurality of off-axial reflecting surfaces differing in the direction of incidence and the direction of emergence of a reference axis ray from one another and having curvatures,
wherein the bending direction of the reference axis ray on each off-axial reflecting surface of said imaging optical element is in a cross section perpendicular to the line direction of said line sensor, and
wherein the direction of the reference axis ray emerging from said imaging optical element is substantially the same direction as the direction of the reference axis ray incident on said imaging optical element.

33. An image reading apparatus comprising:

an original supporting table on which an original is placed;

an imaging optical element for imaging image information on the surface of the original on a line sensor; and a line sensor for reading the image information, wherein said imaging optical element has a plurality of off-axial reflecting surfaces differing in the direction of incidence and the direction of emergence of a reference axis ray from one another and having curvatures, wherein the bending direction of the reference axis ray on each off-axial reflecting surface of said imaging optical element is in a cross section perpendicular to the line direction of said line sensor, and wherein the direction of the reference axis ray incident on said imaging optical element and the direction of the reference axis ray emerging from said imaging optical element are substantially opposite directions.

34. An image reading apparatus comprising:

an original supporting table on which an original is placed;

an imaging optical element for imaging image information on the surface of the original on a line sensor; and a line sensor for reading the image information, wherein said imaging optical element has a plurality of off-axial reflecting surfaces differing in the directions of incidence and the direction of emergence of a reference axis ray from one another and having curvatures, and wherein said imaging optical element has a stop near substantially the center of the optical path between a light incidence surface and a light exit surface thereof.

35. An image reading apparatus according to claim 34, wherein the stop is formed by an effective surface of an off-axial reflecting surface located near substantially the center of the optical path between the light incidence surface and the light exit surface of said imaging optical element.

36. An image reading apparatus comprising:

an original supporting table on which an original is placed;

an imaging optical element for imaging image information on the surface of the original on a line sensor; and a line sensor for reading the image information, wherein said imaging optical element has a plurality of off-axial reflecting surfaces differing in the direction of incidence and the direction of emergence of a reference axis ray from one another and having curvatures, wherein the bending direction of the reference axis ray on each off-axial reflecting surface of said imaging optical element is in a cross section perpendicular to the line direction of said line sensor, and wherein said imaging optical element is comprised of six off-axial reflecting surfaces, and when an off-axial reflecting surface for counter-clockwisely deflecting the reference axis ray is defined as a plus deflecting surface, and an off-axial reflecting surface for clockwisely deflecting the reference axis ray is defined as a minus deflecting surface, said imaging optical element has the same number of plus deflecting surfaces and minus deflecting surfaces, and the off-axial reflecting surface most adjacent to the exit side is disposed on the original side on the incidence reference axis relative to the off-axial reflecting surface most adjacent to the incidence side.

37. An image reading apparatus according to claim 36, wherein the plus deflecting surfaces and the minus deflecting surfaces are disposed so as to be opposite deflecting surfaces relative to a stop.

38. An image reading apparatus according to claim 36, wherein an off-axial reflecting surface of said imaging optical element which is most adjacent to the incidence side is designed to have a converging action.

39. An image reading apparatus according to claim 36, wherein at least one off-axial reflecting surface of said imaging optical element cuts infrared light.

40. An image reading apparatus according to claim 36, wherein said imaging optical element is disposed in a housing along the surface of the original in parallel to a reflecting minor.

41. An image reading apparatus according to any one of claims 31 to 40, wherein said image information is a color image.

42. An image reading imaging optical system for imaging image information on a line sensor and reading the image information, the system comprising:

an image optical element including a plurality of off-axial reflecting surfaces differing in the direction of incidence and the direction of emergence of a reference axis ray from one another and having curvatures; and an angle of field, wherein the angle of field is an angle defined between a principle ray of an off-axis light beam and a principle ray of an on-axis light beam, wherein the bending direction of the reference axis ray on each off-axial reflecting surface of said imaging optical element is in a cross section perpendicular to the line direction of the line sensor.

* * * * *

UNITED STATES PATENT AND TRADEMARK OFFICE
CERTIFICATE OF CORRECTION

PATENT NO.         : 6,894,263 B2
APPLICATION NO. : 10/084928
DATED                  : May 17, 2005
INVENTOR(S)        : Kazuo Fujibayashi et al.

It is certified that error appears in the above-identified patent and that said Letters Patent is hereby corrected as shown below:

COLUMN 10
Line 56, "The is" should read --The--.

COLUMN 19
Line 18, "embodiment," should read --embodiments,--.

COLUMN 20
Line 58, "age" should be deleted.

COLUMN 22
Line 1, "-$C_{41}$-" should read --=$C_{41}$=--.
Line 3, "-$C_{42}$" should read --=$C_{42}$--.

COLUMN 27
Line 61, "$C_{20}$= -7.6579-3" should read --$C_{20}$= -7.6579e-3--.

COLUMN 33
Line 5, "$C_{04}$= 4.71e-6" should read --$C_{04}$=4.7126e-6--.
Line 12, "$C_{22}$= -1.395-5" should read --$C_{22}$= -1.3951e-5--.
Line 14, "$C_{60}$= -5.3341-8" should read --$C_{60}$= -5.3341e-8--.
Line 19, "$C_{22}$= 3.7445e-8" should read --$C_{24}$= 3.7445e-8-- and "$C_{41}$=2.1664e-6" should read --$C_{41}$=2.1664e-7--.
Line 67, "$C_{60}$= -9.6893e-" should read --$C_{60}$= -9.6893e-9--.

COLUMN 43
Line 18, "principle" should read --principal--.
Line 19, "principle" should read --principal--.
Line 37, "principle" should read --principal--.
Line 38, "principle" should read --principal--.
Line 55, "claim 3" should read --claim 3,--.

COLUMN 44
Line 56, "principle" should read --principal--.
Line 57, "principle" should read --principal--.

UNITED STATES PATENT AND TRADEMARK OFFICE
CERTIFICATE OF CORRECTION

PATENT NO.       : 6,894,263 B2
APPLICATION NO.  : 10/084928
DATED            : May 17, 2005
INVENTOR(S)      : Kazuo Fujibayashi et al.

It is certified that error appears in the above-identified patent and that said Letters Patent is hereby corrected as shown below:

COLUMN 45
Line 15, "principle" should read --principal--.
Line 16, "principle" should read --principal--.
Line 51, "principle" should read --principal--.
Line 52, "principle" should read --principal--.
Line 54, "claim 21" should read --claim 21,--.
Line 58, "claim 21" should read --claim 21,--.
Line 60, "claim 21" should read --claim 21,--.
Line 64, "claim 21" should read --claim 21,--.

COLUMN 48
Line 32, "minor" should read --mirror--.
Line 44, "principle" should read --principal--.
Lien 45, "principle" should read --principal--.

Signed and Sealed this

First Day of August, 2006

JON W. DUDAS
*Director of the United States Patent and Trademark Office*